United States Patent
Hirotsune et al.

(10) Patent No.: US 6,232,035 B1
(45) Date of Patent: *May 15, 2001

(54) INFORMATION RECORDING MEDIUM AND INFORMATION MEMORY APPARATUS

(75) Inventors: Akemi Hirotsune, Higashimurayama; Motoyasu Terao, Tokyo; Yasushi Miyauchi, Akishima, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/228,943

(22) Filed: Jan. 12, 1999

Related U.S. Application Data

(63) Continuation of application No. 08/621,881, filed on Mar. 26, 1996, now Pat. No. 5,958,649.

(30) Foreign Application Priority Data

Mar. 27, 1995 (JP) ..................................................... 7-067362

(51) Int. Cl.⁷ ..................................................... G11B 11/00
(52) U.S. Cl. ................. 430/270.13; 430/945; 430/273.1; 369/275.5; 369/275.2; 428/64.5; 428/64.6
(58) Field of Search ................. 430/273.1, 945, 430/19, 270.13; 369/275.2, 275.5; 428/64.5, 64.6

(56) References Cited

U.S. PATENT DOCUMENTS

| | | | |
|---|---|---|---|
| 5,254,382 | * 10/1993 | Ueno et al. | 428/64.1 |
| 5,637,372 | * 6/1997 | Tominaga et al. | 428/64.1 |
| 5,652,036 | * 7/1997 | Kobayashi et al. | 430/945 |
| 5,709,978 | * 1/1998 | Hirotsune et al. | 430/270.13 |
| 5,741,603 | * 4/1998 | Yasuda et al. | 430/945 |
| 5,882,759 | * 3/1999 | Hirotsune et al. | 430/270.13 |

FOREIGN PATENT DOCUMENTS

| | | | |
|---|---|---|---|
| 4421221 | * 12/1994 | (DE) | . |
| 4-313816 | * 11/1992 | (JP) | 430/270.13 |
| 6-060423 | * 3/1994 | (JP) | 430/270.13 |

OTHER PUBLICATIONS

CRC Handbook of Chemistry and Physics, 63rd Edition, CRC Pres, Inc., pp. F–76 and F–97, 1983.*

Japanese Journal of Applied Physics, vol. 32, 1993, Part 1, 11B, Nov. 1993, Premastered Optical Disk by Super-resolution, K. Yasuda et al, pp. 5210–5213.

Optical Data Storage '89 Proc. SPIE, 1078, 27 (1989), T. Ohta et al.

Phase Change Recording Film with High–Melting–Point Component Central Res. Lab., Hitachi, Ltd., A. Hirotsune et al 28p–L–11.

Relation Between Mark Edge Recording Characteristics and Thermal Properties of Phase Change Media Functional Devices Res. Labs. NEC Corporation, S. Ohkubo et al.

* cited by examiner

*Primary Examiner*—Martin Angebranndt
(74) *Attorney, Agent, or Firm*—Mattingly, Stanger & Malur

(57) ABSTRACT

An information storage medium includes a substrate, a thin film formed on the substrate and having a reflectance changed by a phase change caused by irradiation of an energy beam irradiated via the substrate and a first reflective layer and a second reflective layer on the film directly or via an intermediate layer. The thin film includes one of $In_3SbTe_2$, $In_{35}Sb_{32}Te_{33}$, $In_{31}Sb_{26}Te_{43}$ and Ag—In—Sb—Te. The first reflective layer and the second reflective layer are piled up in the recited order from a thin film side with the first reflective layer consisting of a material having an attenuation factor k of 2 or less and selected from a group of silicon based materials and the second reflective layer consisting of a material having an attenuation factor k of at least 3.

23 Claims, 22 Drawing Sheets

INFORMATION RECORDING MEDIUM AND INFORMATION MEMORY APPARATUS

This is a continuation application of U.S. Ser. No. 08/621,881, filed Mar. 26, 1996 now U.S. Pat. No. 5,958,649 filed Sep. 28 1999.

BACKGROUND OF THE INVENTION

The present invention relates to a thin film for recording information and its information recording medium and information recording/reproducing apparatus. In particular, the present invention relates to an information recording medium and an information memory apparatus capable of recording/reproducing on real time basis by using an energy beam such as laser light or an electron beam, information obtained by applying FM modulation to analog signals such as video signals or audio signals or digital information such as computer data, facsimile signals, or digital audio signals.

Various principles for recording information on a thin film (recording film) by exposing it to a laser beam are known. Among them, schemes using an atom configuration change caused by radiation of a laser beam, such as phase transition (also called phase change) of a film material or photodarkening, do not cause deformation of the thin film. Therefore, these schemes have the advantage that an information recording medium having a double side disk structure is obtained by sticking two sheets of disk member together directly. Furthermore, a GeSbTe recording film has the advantage of being capable of rewriting information.

In recording films of this kind, however, rewriting a large number of times exceeding $10^4$ times with a sample servo scheme or mark edge recording for attaining a higher density changes the thickness of the recording film due to a flow of the recording film and distorts the reproduced signal waveform. The flow of the recording film is caused as described below. Laser radiation in recording operation causes a flow of the recording film. By deformation caused by thermal expansion of a protective layer or an intermediate layer, the recording film is pushed little by little.

In "Optical Data Storage," by T. Ohta et al., '89 Proc. SPIE, 1078, 27 (1989), for example, there is disclosed a method of preventing the flow of a recording film by making the recording film thinner to reduce the heat capacity and increase the influence of adhesive power with respect to an adjacent layer. In 28P-L-11, 41st Joint Convention Record of Applied Physics, by Hirotsune, Terao, Miyauchi, Minemura, and Fushimi, p. 996, there is disclosed a method of preventing the flow of a recoridng film by adding a component having a high melting point to the recording film. Thereby, a great flow of the recording film can be suppressed. If rewriting is furthermore repeated a large number of times, however, a change in reflectance level is caused. Furthermore, in order to make the overwrite jitter characteristic in mark edge recording favorable, a disk increased in transmitted light is disclosed in "Relation between mark edge recording characteristics and thermal properties of phase change media," by Okubo, Murahata, Ide, Okada and Iwanaga, Convention Record of Fifth Meeting of Technical Group on Phase Change Recording, p.98. This disk structure is represented as PC substrate/ZnS—$SiO_2$ (250 nm)/$Ge_2Sb_2Te_5$ (15 nm)/ZnS—$SiO_2$ (18 nm)/Si (65 nm).

On some optical disks, digital information signals such as analog information signals obtained by applying FM modulation to video signals or audio signals or digital information signals such as computer data, facsimile signals or digital audio signals are transcribed as unevenness on the surface of the substrate. Some optical disks have information recording thin films capable of recording signals or data on the real time basis by using a recording beam such as a laser beam or an electron beam.. In these optical disks, the signal reproducing resolution is almost determined by the wavelength $\lambda$ of the light source of the reproducing optical system and the numerical aperture NA of the object lens, and the recording mark period $2NA/\lambda$ is a read limit.

As for the technique for attaining a higher recording density, a method and a medium for reproducing data recorded in the form of unevenness by using a medium having a reflectance changed by a phase change are described in "Premastered Optical Disk by Superresolution," by K. Yasuda,. M. Ono, K. Aritani, A. Fukumoto, M. Kaneko, Jpn. Appl. Phys., vol. 32 (1993), pp. 5210–5213. In this technique as well, reading a large number of times exceeding $10^4$ times causes a flow in a film for reading with superresolution and hence a change in reflectance level, the number of times of allowed reading operations being thus limited.

Herein, the term "phase change" includes not only a phase change between a crystalline state and an amorphous state, but also fusion (a change to a liquid phase), recrystallization, and a change between a crystalline state and another crystalline state.

Any information recording medium having a conventional recording film has a problem that increasing the number of times of allowed rewriting operations causes a change in reflectance level in the case where the medium is used as a rewritable information recording medium of phase transition type.

In the same way, any information recording medium having a conventional superresolution reading film has a problem that increasing the number of times of allowed reading operations with a superresolution causes a change in reflectance level in the case where the medium is used as a superresolution readable information recording medium of phase transition type.

SUMMARY OF THE INVENTION

Therefore, an object of the present invention is to provide an information storage or recording medium capable of maintaining favorable recording/reproducing characteristic even if rewriting or superresolution reading operation is conducted a large number of times and capable of being reduced in change of reflectance level as compared with the conventional technique.

In accordance with a first aspect of the present invention, (1) an information recording medium includes an information recording thin film formed on a substrate directly or via a foundation layer to record and/or reproduce information stored in the form of an atom configuration change caused by irradiation of an energy beam, the information recording thin film serving as a recording layer or a superresolution reading mask layer; a protective layer; and at least two reflective layers.

(2) Preferably, an information recording medium includes an information recording thin film formed on a substrate directly or via a foundation layer to record and/or reproduce information stored in the form of an atom configuration change caused by irradiation of an energy beam, the information recording thin film serving as a recording layer or a superresolution reading mask layer; and reflective layers including first and second reflective layers, the first and second reflective layers including materials differing in at least one of refractive index and attenuation factor, the protective layer, the recording layer or superresolution reading mask layer being piled up in cited order from a light incidence side and subsequently the first reflective layer and the second reflective layer being piled up in order directly or via an intermediate layer.

(3) Preferably, the first reflective layer and the second reflective layer include materials differing in refractive index at a reading laser wavelength by at least 1, and the material of the second reflective layer is larger by at least 2 in attenuation factor at the reading laser wavelength than the material of the first reflective layer.

(4) Preferably, in the information recording medium according to (1) or (3), the first reflective layer includes a material having an attenuation factor k of 2 or less,. and the second reflective layer includes a material having an attenuation factor k of at least 3.

(5) Preferably, the first reflective layer is formed directly on the recording film.

(6) Preferably, the material of the second reflective layer is smaller in attenuation factor at the reading laser wavelength than the material of the first reflective layer.

(7) Preferably, the second reflective layer includes at least one of Si, Ge, Si—Ge, Si—N, Si—O, Si—Sn, Si—In and Si—Au mixed materials or includes a composition close thereto, or the first reflective layer includes at least one of Mo, a Mo alloy, Ta, a Ta alloy, W and a W alloy or includes a composition close thereto, or the first reflective layer includes at least one of Co, a Co alloy, Ni, a Ni alloy, Mn, a Mn alloy, Al, an Al alloy, Au, a Au alloy, Ag, a Ag alloy, Cu, a Cu alloy, Pt, a Pt alloy, Pd, a Pd alloy, Sb—Bi solid solution, Fe, Cr, Ti, W, Ta, Mo, Sb, Bi, Dy, Cd, Mg, V, Ga, In, Sn, Pb and Te, or an alloy containing it as a main component, or has a composition close therto. More preferably, the first reflective layer includes at least one of Mo, a Mo alloy, W, a W alloy, Ta, and a Ta alloy, or an alloy containing it as a main component, or has a composition close therto.

(8) Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam; and a reflective layer, variation of reflectance of the recording film or superresolution reading mask layer in the amorphous state or variation of reflectance of the recording film or superresolution reading mask layer in the crystalline state being 10% or less in the range, in reading wavelength, of 600 to 850 nm.

(9) Preferably, in an information recording medium according to any one of (1) to (3) or hereafter mentioned, (22) and (23), and (31) to (40), an intermediate layer is provided between the recording layer or superresolution reading mask layer and the reflective layer or first reflective layer. (10) Preferably, in an information recording medium according to any one of (1) to (3) or hereafter mentioned, (22) and (23), and (31) to (40), the recording layer or superresolution reading mask layer includes a phase change component and a high melting point component, at least 95% of all atoms of the phase change component includes a combination of GeTe and $Sb_2Te_3$, and a content x (atomic %) of the high melting point component, a proportion x (%) of a GeTe quantity in the phase change component, and the protective layer thickness t (nm) satisfies the relation $$ax+by=c-t$$

where $5 \leq a \leq 11$, $25 \leq b \leq 35$, and $2500 \leq c \leq 3500$.

(11) Preferably, the protective layer has a thickness in the range of 110 to 140 nm.

(12) Preferably, denoting a phase change component by L and a high melting point component by H, at least 95% of all atoms of the recording layer or the superresolution reading mask layer has a composition represented as $$(L)_{1-s}(H)_s$$

where $0.05 \leq s \leq 0.20$.

(13) Preferably, the first reflective layer includes a material having an attenuation factor of 4 or less, and the second reflective layer includes a material having an attenuation factor larger than that of the first reflective layer and a thermal conductivity of at least 100 W/m·k.

(14) Preferably, an information recording medium includes an information recording thin film formed on a substrate directly or via a foundation layer to record and/or reproduce information stored in the form of an atom configuration change caused by irradiation of an energy beam, the information recording thin film serving as a recording layer or a superresolution reading mask layer; a reflective layer; and a protective layer and a light incidence side reflective layer located on a light incidence side with respect to the recording layer.

(15) Preferably, wherein when overwriting operation is conducted on the recording layer or superresolution reading mask layer, a region exposed to laser light having higher power becomes higher in reflectance than a region exposed to laser light having lower power.

(16) Preferably, the light incidence side reflective layer includes a material which is unity or less in refractive index n at a reading wavelength.

(17) Preferably, the light incidence side reflective layer includes a material which is at least 2 in refractive index n at a reading wavelength and 2 or less in attenuation factor at the reading wavelength.

(18) Preferably, an intermediate layer is provided between the recording layer or superresolution reading mask layer and the reflective layer.

(19) Preferably, in an information recording medium, the recording layer or superresolution reading mask layer including a phase change component and a high melting point component, at least 95% of all atoms of the phase change component including a combination of GeTe and $Sb_2Te_3$, and a content x (atomic %) of the high melting point component, a proportion y (%) of a GeTe quantity in the phase change component, and the protective layer thickness t (nm) satisfies the relation $$ax+by=c-t$$

where $5 \leq a \leq 11$, $25 \leq b \leq 35$, and $2500 \leq c \leq 3500$.

(20) Preferably, at least 95% of all atoms of the recording layer or superresolution reading mask layer have a composition represented as $$(L)_{1-s}(H)_s$$

where $0.05 \leq s \leq 0.20$, and L and H denote a phase change component and a high melting point component, respectively.

(21) Preferably, in the information recording medium, the protective layer has a thickness in the range of 90 to 110 nm.

A second aspect of the present invention will now be described.

(22) An information memory apparatus includes an information recording medium, the information recording medium including an information recording thin film formed as a recording layer or a superresolution reading mask layer on a substrate directly or via a foundation layer to record and/or reproduce information stored in the form of an atom configuration change caused by irradiation of an energy beam, and the information recording medium including reflective layers as well, a laser used for at least recording, the laser having a wavelength, a light absorptance of the recording layer or mask layer of the medium in a crystalline state at the wavelength being greater than or equal to a light absorptance of the recording layer or mask layer of the medium in an amorphous state at the wavelength, an optical head control circuit, tracking error detection means, an optical head moving driver, recording data modulation means, a laser driver, reproduced signal processing means, and reproduced data sending means.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, a light incidence side reflective layer, and reflective layers including first and second reflective layers, the first and second reflective layers including materials differing in at least one of refractive index and attenuation factor, the light incidence side reflective layer, the protective layer, the recording layer or superresolution reading mask layer being piled up in cited order from a light incidence side and subsequently the first reflective layer and the second reflective layer being piled up in order directly or via an intermediate layer.

Preferably, the first reflective layer contains at least one out of Si, Ge, Si—Ge, Si—N, Si—Sn, Si—In and Si—O compounds or has a composition close thereto, or the second reflective layer contains at least one out of Al, an Al alloy, Au, a Au alloy, Ag, a Ag alloy, Cu, a Cu alloy, Pt, a Pt alloy, Pd, a Pd alloy and a Sb—Bi solid solution, or has a composition close thereto.

Denoting the thickness of the first reflective layer by $d_f$ (nm), the refractive index of the first reflective layer at the reading laser wavelength by nf, and 0 or a positive integer by m, they can be represented as:

$d_f = zm/n_f + e$ $70 \leq e \leq 100$ and $380 \leq z \leq 400$

Denoting the thickness of the first reflective layer by $d_f$ (nm) and 0 or a positive integer by m, preferably they are represented as:

$d_f = 105m + e$ and $70 \leq e \leq 100$

Preferably, the film thickness of the first reflective layer is in the range of 70 to 100 nm.

Preferably, the absorptance difference in the recording film between the crystalline state and the amorphous state is in the range of 20% or less.

Preferably, the film thickness of the second reflective layer is in the range of 5 to 200 nm.

Preferably, an intermediate layer is provided between the recording film and the first reflective layer, and the thickness of the intermediate layer is in the range of 3 to 60 nm or in the range of 180 to 240 nm.

Preferably, the light incidence side reflective layer contains at least one of Au, Au—Co, Au—Ag, Au—Cu, Au—Si, Au—Ni, Au—Cr, Au—Ge and Au—Sb or has a composition close thereto.

Preferably, the thickness $d_p$ of the protective layer, reflectance $R_c$ in the crystalline state, and reflectance $R_a$ in the amorphous state satisfy $R_c - R_a \geq 0$ $dR_a/dd_p \leq 0$ and $dR_c/dd_p \leq 0$ Preferably, the light incidence side reflective layer contains at least one of Si, Ge, Si—Ge, Si—N, Si—Sn, Si—In and Si—Au compounds or has a composition thereto.

Preferably, the thickness $d_p$ (nm) of the protective layer and the thickness $d_a$ (nm) of the light incidence side reflective layer satisfy $d_p = f - 0.66(d_a - 105\ u) - 180\ j$ where $140 \leq f \leq 200$ and each of j and u is 0 or a positive integer.

Preferably, the thickness $d_p$ (nm) of the protective layer satisfies the relation $d_p = 1440 \times 10^{(6.26e - 3da) + g}$ where $10^{(6.26e - 3da)}$ means the $(-6.26e - 3d_a)$-th power of 10, and g is a constant represented by the following expression.

$-30 \leq g \leq 30$

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, a reflective layer containing at least one of Si, Ge, Si—Ge, Si—N, Si—Sn, and Si—In compounds or having a composition close thereto, and an intermediate layer disposed between the information recording thin film and the reflective layer.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, a reflective layer having a refractive index n of at least 2 and an attenuation factor k of 1 or less, and an intermediate layer disposed between the information recording thin film and the reflective layer.

Denoting the reflective layer thickness by $d_r$ (nm), the refractive index of the reflective layer at the reading laser wavelength by $n_r$, and 0 or a positive integer by m, they preferably satisfy the following relations.

$$d_r=(zm-v)/n_r+h$$

$$-65 \leq h \leq -5$$

$$380 \leq z \leq 400$$

and $$240 \leq v \leq 250$$

Preferably, the film thickness of the reflective layer is in the range of 120 to 180 nm.

Preferably, the first reflective layer includes a material having an attenuation factor k of at least 2.5, and the second reflective layer includes a material having an attenuation factor k of 2 or less.

Denoting the first reflective layer thickness by $d_f$(nm), the refractive index of the first reflective layer at the reading laser wavelength by nf, and the attenuation factor of the first reflective layer at the reading laser wavelength by $k_f$, they preferably satisfy the following relation.

$$0 \leq d_f \leq 30 \; /(k_f - n_f/2 - 1) + 5$$

Preferably, the sum of the film thickness of the first reflective layer and the film thickness of the second reflective layer is in the range of at least 50 nm.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and a reflective layer, and in the range of ±10 nm with respect to the film thickness of the recording film or superresolution reading mask layer, variation of the reflectance in the amorphous state or variation of the reflectance in the crystalline state is 10% or less.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and a reflective layer, and in the range of ±10 nm with respect to the film thickness of the recording film or superresolution reading mask layer, variation of the absorptance of the recording film or superresolution reading mask layer in the crystalline state is 10% or less.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and a reflective layer, and in the range of ±10 nm with respect to the film thickness of the recording film or superresolution reading mask layer, variation of the absorptance of the recording film or superresolution reading mask layer in the amorphous state is 10% or less.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and at least a first or second reflective layer, and the difference in absorptance of the recording film or superresolution reading mask layer between the crystalline state and the amorphous state is 20% or less.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and when the film thickness of the recording film or superresolution reading mask layer has been increased by 10 nm, the reflectance in the crystalline and/or amorphous state decreases by at least 7%.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and when the film thickness of the recording film or superresolution reading mask layer has been increased by 10 nm, the absorptance in the crystalline and/or amorphous state increases by at least 5%.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and a reflective layer, and in the range, in reading wavelength, of 600 to 850 nm, variation of the absorptance of the recording film or superresolution reading mask layer in the crystalline state is 10% or less.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and a reflective layer, and in the range, in reading wavelength, of 600 to 850 nm, variation of the absorptance of the recording film or superresolution reading mask layer in the amorphous state is 10% or less.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and at least a first or second reflective layer, and in the range, in reading wavelength, of 600 to 850 nm, the difference in absorptance of the recording film or superresolution reading mask layer between the crystalline state and the amorphous state is 20% or less.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and a reflective layer, and the reflectance of either the crystalline state or the amorphous state is at least 60%.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and a reflective layer, and the degree of modulation of the reflectance of the crystalline state and the amorphous state is at least 60%.

Preferably, an information recording medium includes an information recording thin film formed as a recording layer or a superresolution reading mask layer on a substrate directly or via a foundation layer to record and/or reproduce information stored in the form of an atom configuration change caused by irradiation of an energy beam, and a reflective layer, and the light absorptance in the crystalline state has a value greater than or equal to that of the light absorptance in the amorphous state.

Preferably, an intermediate layer is disposed. between the recording film or the superresolution reading mask layer and the reflective layer, and the thickness of the intermediate layer is in the range of 30 nm or less.

Preferably, the thickness of the recording film is in the range of 15 to 40 nm.

Preferably, the reflective layer includes at least one of Si, Ge, Si—Ge, Si—N, Si—Sn, Si—In, Si—Au Al, an Al alloy, Au, a Au alloy, Ag, a Ag alloy, Cu, a Cu alloy, Pt, a Pt alloy, and a Sb—Bi solid solution, or it has a composition close thereto. Or preferably, the reflective layer has a composition obtained by adding, to at least one of Si, Ge, Si—Ge and Si—N, at least one selected out of a group formed by Au, Ag, Cu, Al, Ni, Fe, Co, Cr, Ti, Pd, Pt, W, Ta, Mo, Sb, Bi, Dy, Cd, Mn, Mg, V, Ga, In, Sn, Pb and Te with a proportion between 1 and 30 at %, or a composition close thereto.

Preferably, the composition of at least 95% of all atoms of the high melting point component is at least one selected out of a group of compounds and mixtures formed by combinations of Cr—Te, Cr—Sb, Cr—Ge, Cr—Sb—Te, Cr—Sb—Ge, Cr—Ge—Te, Co—Te, Co—Sb, Co—Ge, Co—Sb—Te, Co—Sb—Ge, Co—Ge—Te, Cu—Te, Cu—Sb, Cu—Ge, Cu—Sb—Te, Cu—Sb—Ge, Cu—Ge—Te, Mn—Te, Mn—Sb, Mn—Ge, Mn—Sb—Te, Mn—Sb—Ge, Mn—Ge—Te, V—Te, V—Sb, V—Ge, V—Sb—Te, V—Sb—Ge, V—Ge—Te, Ni—Te, Ni—Sb, Ni—Ge, Ni—Sb—Te, Ni—Sb—Ge, Ni—Ge—Te, Mo—Te, Mo—Sb, Mo—Ge, Mo—Sb—Te, Mo—Sb—Ge, Mo—Ge—Te, W—Te, W—Sb, W—Ge, W—Sb —Te, W—Sb—Ge, W—Ge—Te, Ag—Te, Ag—Sb, Ag—Ge, Ag—Sb—Te, Ag—Sb—Ge and Ag—Ge—Te, or it is a composition similar thereto.

Denoting the thickness of the protective layer by $d_p'$ (nm), the thickness of the recording film by $d_r'$ (nm), the thickness of the intermediate layer by $d_m'$ (nm), the thickness of the first reflective layer by $d_{r1}'$ (nm), the thickness of the second reflective layer by $d_{r2}'$ (nm), the reproducing wavelength by $\lambda'$ (nm), a constant by $\delta$, an optimum thickness of the protective layer at the wavelength of 780 (nm) by $d_p'$ (nm), an optimum thickness of the recording film at the wavelength of 780 (nm) by $d_r'$ (nm), an optimum thickness of the intermediate layer at the wavelength of 780 (nm) by $d_m'$ (nm), an optimum thickness of the first reflective layer at the wavelength of 780 (nm) by $d_{r1}'$ (nm), an optimum thickness of the second reflective layer at the wavelength of 780 (nm) by $d_{r2}'$ (nm), they are preferably in the following ranges.

$$d_p'=(\lambda' \times d_p)/780+\delta$$

$$d_r'=(\lambda' \times d_r)/780+\delta$$

$$d_m'=(\lambda' \times d_m)/780+\delta$$

$$d_{r1}'=(\lambda' \times d_{r1})/780+\delta$$

$$d_{r2}'=(\lambda' \times d_{r2})/780+\delta$$

and $$-5 \leq \delta \leq 5$$

Preferably, the composition of at least 95% of all atoms of the recording layer or superresolution reading mask layer satisfies $$(Ge_\alpha Sb_\beta Te_\gamma)_{1-s}(H)_s$$

where $0.5 \leq s \leq 0.15$, $0.08 \leq \alpha \leq 0.33$, $0.44 \leq \gamma \leq 0.77$, and $\alpha+\beta+\gamma=1$, and H is at least one selected out of a group formed by compounds and mixtures formed by combinations of Cr—Te, Cr—Sb, Cr—Ge, Cr—Sb—Te, Cr—Sb—Ge, Cr—Ge—Te, Co—Te, Co—Sb, Co—Ge, Co—Sb—Te, Co—Sb —Ge, Co—Ge—Te, Cu—Te, Cu—Sb, Cu—Ge, Cu—Sb—Te, Cu—Sb—Ge, Cu—Ge—Te, Mn—Te, Mn—Sb, Mn—Ge, Mn—Sb—Te, Mn —Sb—Ge, Mn—Ge—Te, V—Te, V—Sb, V—Ge, V—Sb—Te, V—Sb—Ge, V—Ge—Te, Ni—Te, Ni—Sb, Ni—Ge, Ni—Sb—Te, Ni—Sb—Ge, Ni—Ge—Te, Mo—Te, Mo—Sb, Mo—Ge, Mo—Sb—Te, Mo—Sb—Ge, Mo—Ge—Te, W—Te, W—Sb, W—Ge, W—Sb—Te, W—Sb—Ge, W—Ge—Te, Ag—Te, Ag—Sb, Ag—Ge, Ag—Sb—Te, Ag—Sb—Ge and Ag—Ge—Te, or it is a composition similar thereto.

The protective layer may serve as the foundation layer as well.

In accordance with a third aspect of the present invention, a fabrication method of an information recording medium formed on a substrate directly or via a foundation layer to record and/or reproduce information stored in the form of an atom configuration change caused by irradiation of an energy beam includes the steps of forming, on the substrate, a protective layer, a recording film or superresolution reading film, an intermediate layer, and first and second reflective layers including materials differing in at least one of refractive index and attenuation factor, and sticking it to another substrate or another substrate having the above described respective layers formed thereon in the same way.

In accordance with a fourth aspect of the present invention, an information memory apparatus includes an information recording medium, the information recording medium including an information recording thin film formed as a recording layer or a superresolution reading mask layer on a substrate directly or via a foundation layer to record and/or reproduce information stored in the form of an atom configuration change caused by irradiation of an energy beam, and the information recording medium including reflective layers as well; a laser used for at least recording, the laser having a wavelength, an increase of 10 nm in the recording layer or mask layer decreasing the reflectance in the crystalline state by at least 7% at the wavelength; an optical head control circuit; tracking error detection means; an optical head. moving driver; recording data modulation means; a laser driver; reproduced signal processing means; and reproduced data sending means.

Preferably, an information memory apparatus includes an information recording medium, the information recording medium including an information recording thin film formed as a recording layer or a superresolution reading mask layer on a substrate directly or via a foundation layer to record and/or reproduce information stored in the form of an atom configuration change caused by irradiation of an energy beam, and the information recording medium including reflective layers as well; a laser used for at least recording, the laser having a wavelength, an increase of 10 nm in thickness of the recording layer or mask layer decreasing the reflectance in the amorphous state by at least 7% at the wavelength; an optical head control circuit; tracking error detection means; an optical head moving driver; recording data modulation means; a laser driver; reproduced signal processing means; and reproduced data sending means.

Preferably, an information memory apparatus includes an information recording medium, the information recording medium including an information recording thin film formed as a recording layer or a superresolution reading mask layer on a substrate directly or via a foundation layer to record and/or reproduce information stored in the form of an atom configuration change caused by irradiation of an energy beam, and the information recording medium including reflective layers as well; a laser used for at least recording, the laser having a wavelength, variation of the absorptance in the crystalline state being 10% or less at the wavelength in the range of ±10 nm with respect to the thickness of the recording layer or mask layer; an optical head control circuit; tracking error detection means; an optical head moving driver; recording data modulation means; a laser driver; reproduced signal processing means; and reproduced data sending means.

Preferably, an information memory apparatus includes an information recording medium, the information recording medium including an information recording thin film formed as a recording layer or a superresolution reading mask layer on a substrate directly or via a foundation layer to record and/or reproduce information stored in the form of an atom configuration change caused by irradiation of an energy beam, and the information recording medium including reflective layers as well; a laser used for at least recording, the laser having a wavelength, an increase of 10 nm in thickness of the recording layer or mask layer increasing the absorptance in the crystalline state by at least 5% at the wavelength; an optical head control circuit; tracking error detection means; an optical head moving driver; recording data modulation means; a laser driver; reproduced signal processing means; and reproduced data sending means.

Preferably, an information memory apparatus includes an information recording medium, the information recording medium including an information recording thin film formed as a recording layer or a superresolution reading mask layer on a substrate directly or via a foundation layer to record and/or reproduce information stored in the form of an atom configuration change caused by irradiation of an energy beam, and the information recording medium including reflective layers as well; a laser used for at least recording, the laser having a wavelength, variation of the absorptance in the amorphous state being 10% or less at the wavelength in the range of ±10 nm with respect to the thickness of the recording layer or mask layer; an optical head control circuit; tracking error detection means; an optical head moving driver; recording data modulation means; a laser driver; reproduced signal processing means; and reproduced data sending means.

Preferably, an information memory apparatus includes an information recording medium, the information recording medium including an information recording thin film formed as a recording layer or a superresolution reading mask layer on a substrate directly or via a foundation layer to record and/or reproduce information stored in the form of an atom configuration change caused by irradiation of an energy beam, and the information recording medium including reflective layers as well; a laser used for at least recording, the laser having a wavelength, an increase of 10 nm in thickness of the recording layer or mask layer increasing the absorptance in the amorphous state by at least 5% at the wavelength; an optical head control circuit; tracking error detection means; an optical head moving driver; recording data modulation means; a laser driver; reproduced signal processing means; and reproduced data sending means.

Preferably, the reflective layer or the second reflective layer has a thickness in the range of 30 to 80 nm.

Denoting a phase change component by L and a high melting point component by H, at least 95% of all atoms of the recording layer or the superresolution reading mask layer has a composition represented as $$(L)_{1-s}(H)_s$$

where $0.5 \leq s \leq 0.15$.

It is desirable that at least 95% of all atoms of the recording layer or the superresolution reading mask layer has a composition represented as $$\{(GeTe)_x(Sb_2Te_3)_{1-x}\}_{1-s}(H)_s$$

where $0.05 \leq s \leq 0.15$ and $0.3 \leq x \leq 0.66$.

When Si or a Si—Ge mixed material is used as the material of the first reflective layers, the light incidence side reflectance of the recording mark portion can be made less than the light incidence side reflectance of portions other than the recording mark. Therefore, erasing residue caused by light incidence side reflectance difference can be prevented, and the number of possible rewriting operations is not reduced. As for the Ge content, the number of possible rewriting operations does riot readily reduce when the Ge content is in the range of 10 to 80 at %.

Furthermore, if Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B or S is added to Si, the transmittance of the reflective layer is decreased and the absorptance of the reflective layer is increased, the sensitivity lowering being thus prevented. As for the additive element content in this case, the reflectance level variation which might be caused when rewriting operation has been conducted a large number of times does not readily occur if the additive element content is in the range of 1 to 25 at %.

Subsequently, when a Si—N, Si—Sn or Si—In mixed material, or a mixed material including two kinds among these mixed materials was used, a similar result was obtained. These reflective layer materials do not lower the number of possible rewriting operations as compared with conventional reflective layer materials, not only when they are used as reflective layer materials in the case where the phase change film of the present invention is employed but also when they are used as reflective layer materials in the case where another phase change film is employed. As for the content of the element added to Si, the number of possible rewriting operations does not readily reduce when the content of the element added to Si is in the range of 3 to 50 at %.

Furthermore, a layer including a mixed material containing Si or Ge other than the above described materials may also be used. A layer including a material having a large refractive index and a small attenuation factor may also be used. A multi-layer including these phases may also be used. A composite layer including another material such as these oxides may also be used. Ge may also be used. Besides, various nitrides, sulfides, and selenides may also be used.

The refractive index n and the attenuation factor k of the reflective layer material should be:
more preferably $n \geq 2$; and
especially preferably $n \geq 2$ and $2 \geq k$.

Furthermore, a multi-layer including those layers may also be used. A composite layer including them and another material, such as an oxide like $SiO2$ may also be used.

Preferably, the protective layer and the intermediate layer are formed by $(ZnS)_{80}(SiO2)_{20}$. Instead of this, the material changed in mixture ratio of ZnS and $SiO_2$, a Si—N material, Si—O—N material, an oxide such as $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $Sc_2O_3$ or $ZrO_2$, a nitride such as TaN, AlN, $Si_3N_4$ or an Al—Si—N material (like $AlSiN_2$), a sulfide such as ZnS, $Sb_2S_3$, CdS, $In_2S_3$, $Ga_2S_3$, GeS, $SnS_2$, PbS or $Bi_2S_3$, a selenide such as $SnSe_2$, $Sb_2Se_3$, CdSe, ZnSe, $In_2Se_3$, $Ga_2Se_3$, GeSe, $GeSe_2$, SnSe, PbSe or $Bi_2Se_3$, a fluoride such as $CeF_3$, $MgF_2$ or $CaF_2$, or Si, Ge, $TiB_2$, $B_4C$, B, C or a material having a composition similar to any one of the above described materials may also be used. A layer of a mixed material obtained from them or a multi-layer obtained from them may also be used.

As for the substrate, a polycarbonate substrate having unevenness such as a tracking guide formed directly on the surface, polyolefin, epoxy, acrylic resin, or chemical reinforced glass having a ultraviolet cured resin layer formed on the surface, for example, may be used.

Furthermore, not only a substrate having the sample servo format, but also a substrate using another format such as a substrate of continuous groove servo format having unevenness of a tracking guide formed by a continuous groove may also be used. The disk size is not limited to 13 cm, but may be a different size such as 12 cm, 3.5 inch or 2.5 inch. The disk thickness is not limited to 1.2 mm, but may be a different thickness such as 0.6 mm or 0.8 mm.

In the information recording medium, the intermediate layer may be omitted and the first reflective layer may be directly formed on the recording film. In this case, the number of layers is reduced by one and consequently fabrication of the disk is fabricated and the fabrication time can be shortened.

As for the information recording medium, two disk members are fabricated by using completely the same method and the reflective layers 5 and 5' respectively of the first and second disk members are stuck together via the bonding agent layer. Instead of the second disk member, however, a disk member having a different configuration or a protective substrate may also be used.

In the case where the transmittance, in the ultraviolet ray wavelength region, of the disk member or the protective substrate used for sticking is large, sticking may be conducted by using ultraviolet ray cured resin. Sticking may be conducted by using a different method.

As for a material of the second reflective layer, a material containing an Al alloy as its main component such as Al—Ti, Al—Ag or Al—Cu is desirable. Al can also be used. Materials other than Al alloys may also be used.

In the case of an Al alloy, when the Al content is in the range of 50 to 99.9 at %, the thermal conductivity can be made great and the possible number of rewriting operations is not readily lowered.

Furthermore, a layer including a single element of Sb—Bi, SUS, Ni—Cr, Au, Ag, Cu, Al, Ni, Fe, Co, Cr, Ti, Pd, Pt, W, Ta, Mo, Sb, Bi, Dy, Cd, Mn, Mg or V, an alloy containing them as its main component, or an alloy between them may also be used. A multi-layer containing these layers may also be used. A composite layer containing them and another material such as an oxide may also be used. So long as the material is different from the first reflective layer in refractive index and attenuation factor, a layer including an alloy containing Si, Ge, Sn or In as its main component, or an alloy between them and the above described elements may also be used. A multi-layer including these layers may also be used. A composite layer including them and another material such as an oxide may also be used.

Among them, a material having a great thermal conductivity such as a Cu alloy or Al alloy makes the disk structure a rapid cooling structure and suppresses variation of reflectance caused by conducting the rewriting operation a large number of times. Furthermore, a material having a small thermal conductivity such as Sb—Bi, Dy, SUS or Ni—Cr facilitates thermal insulation and consequently has an advantage of improved recording sensitivity.

In the case where Mo or a Mo compound is used., absorptance control is facilitated and consequently an advantage of improved rewriting characteristics is obtained.

The film thickness of the second reflective layer may be at least 0 nm, but it is desired to be at least 10 nm. More preferably, it should be at least 30 nm from the viewpoint of increasing the strength and it should be 200 nm or less from the viewpoint of shortening the fabrication time.

As for the material of the recording film, a Cr—Ge—Sb—Te material having a different composition ratio, such as $(CrTe)_{10}(Ge_2Sb_2Te_5)_{90}$ or $(Cr_4Te_5)_{20}(GeSb_4Te_7)_{80}$, is not readily lowered in number of possible rewriting operations.

Subsequently, similar results were obtained when Ag—Ge—Sb—Te, Co—Ge—Sb—Te and V—Ge—Sb—Te were used. A recording film obtained by adding a high melting component to a Cr—Ge—Sb—Te material is not readily lowered in number of possible rewriting operations.

Furthermore, even if at least one of $Ge_2Sb_2Te_5$, $GeSb_2Te_4$, $GeSb_4Te_7$, $In_3SbTe_2$, $In_{35}Sb_{32}Te_{33}In_{31}Sb_{26}Te_{43}$, GeTe Ag—In—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te and Bi—Ge—Sb—Te other than the above described materials, and materials having compositions close to those of them is used instead, similar characteristics are obtained. Even if a part of Ge is replaced by In, similar characteristics are obtained.

When Si or a Si—Ge mixed material is used as the material of the reflective layer, the light incidence side reflectance of the recording mark portion can be made less than the light incidence side reflectance of portions other than the recording mark. Therefore, erasing residue caused by light incidence side reflectance difference can be prevented, and the number of possible rewriting operations is not reduced. As for the Ge content, the number of possible rewriting operations does not readily reduce when the Ge content is in the range of 10 to 80 at %.

Furthermore, if Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B or S is added to Si, the transmittance of the reflective layer is decreased and the absorptance of the reflective layer is increased, the sensitivity lowering being thus prevented. As for the additive element content in this case, the reflectance level variation which might be caused when rewriting operation has been conducted a large number of times does not readily occur if the additive element content is in the range of 1 to 25 at %.

Subsequently, when a Si—N, Si—Sn or Si—In mixed material, or a mixed material including two kinds among these mixed materials was used, a similar result was obtained. These reflective layer materials do not lower the number of possible rewriting operations as compared with conventional reflective layer materials, not only when they are used as reflective layer materials in the case where the phase change film of the present invention is employed but also when they are used as reflective layer materials in the case where another phase change film is employed. As for the content of the element added to Si, the number of possible rewriting operations does not readily reduce when the content of the element added to Si is in the range of 3 to 50 at %.

Furthermore, a layer including a mixed material containing Si or Ge other than the above described materials may also be used. A layer including a material having a large refractive index and a small attenuation factor may also be used. A multi-layer including these phases may also be used. A composite layer including another material such as these oxides may also be used. Ge may also be used. Besides, various nitrides, sulfides, and selenides may also be used.

The refractive index n and the attenuation factor k of the reflective layer material at the reading laser wavelength should be:

preferably $n \geq 2$ more preferably $n \geq 2$ and $4 \geq k$ and especially preferably $n \geq 2$ and $1 \geq k$.

Furthermore, a multi-layer including those layers may also be used. A composite layer including them and another material such as an oxide may also be used.

When Si or a Si—Ge mixed material was used as the material of the light incidence side reflective layers, the light absorptance of the recording mark portion can be made less than the light absorptance of portions other than the recording mark. Therefore, erasing residue caused by light absorptance difference can be prevented, and the number of possible rewriting operations is not reduced. As for the Ge content, the number of possible rewriting operations does not readily reduce when the Ge content is in the range of 10 to 80 at %.

Subsequently, when a Si—N, Si—Sn or Si—In mixed material, or a mixed material including two kinds among these mixed materials was used, a similar result was obtained. These reflective layer materials do not lower the number of possible rewriting operations as compared with conventional reflective layer materials, not only when they are used as reflective layer materials in the case where the phase change film of the present invention is employed but also when they are used as reflective layer materials in the case where another phase change film is employed. As for the content of the element added to Si, the number of possible rewriting operations does not readily reduce when the content of the element added to Si is in the range of 3 to 50 at %.

Furthermore, a layer including a mixed material containing Si or Ge other than the above described materials may also be used. A layer including a material having a large refractive index and a small attenuation factor may also be used. A multi-layer including these phases may also be used. A composite layer including another material such as these oxides may also be used. Ge may also be used. Besides, various nitrides, sulfides, and selenides may also be used.

In order to facilitate control of the absorptance, the refractive index n and the attenuation factor k of the light incidence side reflective layer material should be:

more preferably $n \geq 2$ especially preferably $n \geq 2$ and $2 \geq k$.

Furthermore, a multi-layer including those layers may also be used. A composite layer including them and another material, such as an oxide like $SiO_2$, may also be used.

As for a material of the light incidence side reflective material, a Au—Ag and Au—Co mixed materials can make the adhesive strength between the substrate and the film large. As for the content of Co, the range of 1 to 10 at % makes it possible to transmit light and set the reflectance of the disk to a suitable value.

Subsequently, when a Au—Al, Au—Cu, Si—N, Si—Sn or Si—In mixed material, or a mixed material including two kinds among these mixed materials was used, a similar result was obtained. These light incidence side reflective layer materials are capable of controlling the absorptance and reducing the erasing residue, not only when they are used for the light incidence side reflective layer of the information recording medium of the present invention but also when they are used for a light incidence side reflective layer of another information recording medium using a phase change film. Furthermore, a layer including a mixed material containing Cu, Ag or Nd other than the above described materials may also be used. A layer including a material having a small attenuation factor may also be used. The refractive index at the readout laser wavelength at that time should be:

preferably $n \leq 1$ more preferably $n \leq 0.5$ and especially preferably $n \leq 0.2$.

Furthermore, a multi-layer including those layers may also be used. A composite layer including them and another material, such as an oxide, may also be used.

The first reflective layer has a material which has an attenuation factor k of 4 or less at the reading laser wavelength. And the second reflective layer has a material which has an attenuation factor greater than that of the first reflective layer and a thermal conductivity of at least 100 W/m·k.

As for the first reflective layer material, a layer including a single element of Mo, Ni, Fe, Cr, Ti, Pd, Pt, W, Ta, Co, Sb, Bi, Dy, Cd, Mn, Mg or V, an alloy containing them as its main component, or an alloy between them may also be used. A multi-layer containing these layers may also be used. A composite layer containing them and another material such as an oxide may also be used. By using a material having an attenuation factor of 4 or less, the absorptance difference could be made small and the erasing residue in the rewriting operation could be reduced in the case where the absorptance in the amorphous state was larger than that in the crystalline state.

Among them, Mo, W, Ta, a Mo alloy, W alloy, and Ta alloy have an advantage of good rewriting characteristics, because they are low in reactivity and there is no fear that they may react with the second reflective layer material and the characteristics may vary.

At least one selected out of a group of compounds and mixtures including combinations of $Cr_4Te_5$, Cr—Te, Cr—Sb, Cr—Ge, Co—Sb, Co—Te, Co—Ge, Cu—Te, Cu—Sb, Mn—Te, Mn—Sb, V—Ge, Ni—Ge, Mo—Ge, and W—Te may also be employed. Or a material having a composition close thereto may also be employed. These materials have an advantage of favorable rewriting characteristics because these materials have high melting points and there is no fear that these materials may react with the second reflective layer material and the characteristics may vary.

Setting the film thickness $d_f$ of the first reflective layer into a range of approximately 30 nm or less makes it possible to control the absorptance and it is favorable. Setting the film thickness $d_f$ into a range of approximately 15 nm or less which is thinner is more desirable.

As for the material of the second reflective layer, a material having a great thermal conductivity, such as Al, Cu, Au, a Cu alloy, Al alloy or Au alloy, is desirable because it makes the disk structure a rapid cooling structure and suppresses variation of reflectance caused by conducting the rewriting operation a large number of times. As for the thermal conductivity in this case, at least 100 W/m·k is desirable because the number of times of rewriting operation is increased and at least 230 W/m·k is more desirable because the number of times of rewriting operation is doubled. Furthermore, as compared with a simple substance of Au, a Au alloy such as Au—Ag, Au—Co or Au—Al has an advantage of large adhesive strength and is favorable.

Besides, so long as a material has an attenuation factor larger than that of the second reflective layer, a layer including a single element of Ag, Ni, Fe, Cr, Ti, Pd, Pt, W, Ta, Mo, Sb, Bi, Dy, Cd, Mn, Mg or V, an alloy containing them as its main component such as a Ag alloy, Cu alloy, Al alloy, Pd alloy, Pt alloy, Ni alloy, Mn alloy, or a Sb—Bi compound, or an alloy between them may also be used. A multi-layer containing these layers may also be used. A composite layer containing them and another material such as an oxide may also be used. A layer including an alloy containing Si, Ge, Sn or In as its main component, or an alloy between them and the above described elements may also be used. A multi-layer including these layers may also be used. A composite layer including them and another material such as an oxide may also be used.

As for the first reflective layer material and the second reflective layer material, materials described with reference to the present embodiment can be used. It was found that effecting selection out of combinations of them resulted in improved rewriting characteristics. As for a preferred combination, the second reflective layer should contain at least one out of W, Mo, Ta, a W alloy, Mo alloy and Ta alloy, or it should have a composition close thereto, and the first reflective layer should contain at least one out of Al, an Al alloy, Au, a Au alloy, Ag and a Ag alloy, or it should have a composition close thereto.

In this structure, the composition of the phase change component included in the above described recording film components may be $(Cr_4Te_5)_{10}(Ge_2Sb_2Te_5)_{90}$. However, the composition obtained by further adding Sb of 3 at % to the $Ge_2Sb_2Te_5$ composition, i.e., the composition of $(Cr_4Te_5)_{10}$ $(Ge_{21}Sb_{25}Te_{54})_{90}$ is more desirable.

In the case where a material having a large thermal conductivity value, such as Al, Au, Co or Cu, is used no matter whether the material is used for the first reflective layer or the second reflective layer, the composition of the phase change component could be adjusted in the same way by appropriately increasing the quantity of Sb from the $Ge_2Sb_2Te_5$ composition and making the crystallization speed slower. The quantity of Sb added to the $Ge_2Sb_2Te_5$ composition is approximately between 5 and 10 at % in the case of Au and Al, approximately between 3 and 8 at % in the case of Cu, and is approximately between 2 and 5 at % in the case of Mo and W, although the ranges vary slightly depending upon other structures.

Preferably, in the information recording medium according, a component occupying at least 90% of all atoms of said second reflective layer comprises at least one of Si, Ge, Si—Ge, Si—N, Si—O, Si—Sn, Si—In and Si—Au mixed materials or comprises a composition close thereto, or a component occupying at least 80% of all atoms of said first reflective layer comprises at least one of Mo, a Mo alloy, Ta, a Ta alloy, W and a W alloy or comprises a composition close thereto.

Preferably, in an information recording medium including an information recording thin film formed as a recording layer or a superresolution reading mask layer on a substrate directly or via a foundation layer to record and/or reproduce information stored in the form of an atom configuration change caused by irradiation of an energy beam, the recording layer or superresolution reading mask layer includes a phase change component and a high melting point component, at least 95% of all atoms of the phase change component includes a combination of GeTe and $Sb_2Te_3$, and a content y (at %) of the high melting point component, a proportion x (%) of a GeTe quantity in the phase change component, and the protective layer thickness t (nm) satisfies the relation $$ax+by=c-t$$

where $5 \leq a \leq 11$, $25 \leq b \leq 35$, and $2500 \leq c \leq 3500$.

Preferably, in an information recording medium including an information recording thin film serving as a recording layer or superresolution reading mask layer, the information recording thin film being formed on a substrate directly or via a foundation layer to record and/or reproduce information stored in the form of an atom configuration change caused by irradiation of an energy beam, at least 95% of all atoms of the recording layer or superresolution reading mask layer have a composition represented as $$(L)_{1-s}(H)_s$$

where $0.05 \leq s \leq 0.20$.

Preferably, in the information recording medium, a component occupying at least 95% of all atoms of the L includes Ge—Sb—Te, and a component occupying at least 95 atom % of the H includes at least one of Cr—Te, Cr—Sb, Cr—Ge, Cr—Sb—Te, Cr—Sb—Ge, Cr—Ge—Te, Co—Te, Co—Sb, Co—Ge, Co—Sb—Te, Co—Sb—Ge, Co—Ge—Te, Cu—Te, Cu—Sb, Cu—Ge, Cu—Sb—Te, Cu—Sb—Ge, Cu—Ge—Te, Mn—Te, Mn—Sb, Mn—Ge, Mn—Sb—Te, Mn—Sb—Ge, Mn—Ge—Te, V—Te, V—Sb, V—Ge, V—Sb—Te, V—Sb—Ge, V—Ge—Te, Ni—Te, Ni—Sb, Ni—Ge, Ni—Sb—Te, Ni—Sb—Ge, Ni—Ge—Te, Mo—Te, Mo—Sb, Mo—Ge, Mo—Sb—Te, Mo—Sb—Ge, Mo—Ge—Te, W—Te, W—Sb, W—Ge, W—Sb—Te, W—Sb—Ge, W—Ge—Te, Ag—Te, Ag—Sb, Ag—Ge, Ag—Sb—Te, Ag—Sb—Ge and Ag—Ge—Te.

Preferably, in the information recording medium, a component occupying at least 95% of all atoms of the L includes Ge—Sb—Te, and components occupying at least 95 atom % of the H are at least 780° C. in melting point.

Preferably, in the information recording medium, a component occupying at least 95% of all atoms of the L includes Ge—Sb—Te, and components occupying at least 95 at % of the H includes Ag and Te.

Preferably, in the information recording medium, a component occupying at least 95% of all atoms of the L includes Ge—Sb—Te, and components occupying at least 95 at % of the H includes Ag, Sb and Te.

Preferably, in the information recording medium, a component occupying at least 95% of all atoms of the L includes Ge—Sb—Te, and components occupying at least 95 at % of the H includes Cr and Te.

Preferably, in the information recording medium, the protective layer has a thickness in the range of 50 to 100 nm, and the first reflective layer includes Si or at least one of mixed materials in which at least 75% of all atoms includes Si.

Preferably, in the information recording medium, an intermediate layer is provided between the recording layer or superresolution reading mask layer and the first reflective layer, and a refractive index of the intermediate layer and a refractive index of the first reflective layer has an average value between 2 and 4.

Preferably, in the information recording medium, a component occupying at least 90% of all atoms of the first reflective layer includes at least one of Si and a Si mixed material, and a component occupying at least 80% of all atoms of the second reflective layer includes at least one of single elements of Sb—Bi, Au, Ag, Cu, Al, Ni, Fe, Co, Cr, Ti, Pd, Pt, W, Ta, Mo, Sb, Bi, Dy, Cd, Mn, Mg and V, and a Au alloy, Ag alloy, Cu alloy, Al alloy, Pd alloy and Pt alloy.

Preferably, in the information recording medium, a component occupying at least 90% of all atoms of the first reflective layer includes at least one of Si, Si—Au, Si—Ag, Si—Cu, Si—Al, Si—Ni, Si—Fe, Si—Co, Si—Cr, Si—Ti, Si—Pd, Si—Pt, Si—W, Si—Ta, Si—Mo, Si—Sb, Si—Bi, Si—Dy, Si—Cd, Si—Mn, Si—Mg, Si—V, Si—Zn, Si—Ga, Si—Tl, Si—Pb, Si—C, Si—B and Si—S mixed materials, and a component occupying at least 80% of all atoms of second first reflective layer includes Al—Ti, Al—Ag, Al—Cu, or Al—Cr.

Preferably, in the information recording medium, a component occupying at least 90% of all atoms of the first reflective layer includes at least one of Si and a Si mixed material, and a component occupying at least 80% of all atoms of the second reflective layer includes at least one of single elements of Sb—Bi, Au, Ag, Cu, Al, Ni, Fe, Co, Cr, Ti, Pd, Pt, W, Ta, Mo, Sb, Bi, Dy, Cd, Mn, Mg and V, and a Au alloy, Ag alloy, Cu alloy, Al alloy, Pd alloy and Pt alloy.

Preferably, in the information recording medium, the protective layer has a thickness in the range 50 to 100 nm, and the first reflective layer has a thickness in the range of 45 to 90 nm.

Preferably, in the information recording medium, the protective layer has a thickness in the range of 50 to 100 nm, the first reflective layer has a thickness in the range of 45 to 90 nm, and the second reflective layer has a thickness of 200 nm or less.

Preferably, in an information recording medium including an information recording thin film serving as a recording layer or superresolution reading mask layer, the information recording thin film being formed on a substrate directly or via a foundation layer to record and/or reproduce information stored in the form of an atom configuration change caused by irradiation of an energy beam, reflectance of the information recording medium has a minimum value in the wavelength range of 550 to 800 nm in an as-depo state or a crystalline state, or a maximum value is located at a wavelength in the range of 150 to 350 nm from a wavelength of a minimum value.

Preferably, in an information recording medium including an information recording thin film serving as a recording layer or superresolution reading mask layer, the information recording thin film being formed on a substrate directly or via a foundation layer to record and/or reproduce information stored in the form of an atom configuration change caused by irradiation of an energy beam, when a reflectance change of the information recording medium in the range of 400 to 850 nm is represented by a difference between a maximum value and a minimum value, a reflectance difference in an as-depo state is at least 20% and a reflectance difference in a crystalline state is at least 6.7%.

Preferably, in an information recording medium including an information recording thin film serving as a recording layer or superresolution reading mask layer, the information recording thin film being formed on a substrate directly or via a foundation layer to record and/or reproduce information stored in the form of an atom configuration change caused by irradiation of an energy beam, reflectance of the information recording medium with respect to light applied from an intermediate layer or a first reflective layer to an opposite side of a substrate has a maximum value or a minimum value in the wavelength range of 400 to 850 nm, or a reflectance difference is at least 13.3%.

Preferably, in the information recording medium, when overwriting operation is conducted on the recording layer or superresolution reading mask layer, a region exposed to laser light having higher power becomes lower in reflectance than a region exposed to laser light having lower power.

In order to make it possible to conduct rewriting or superresolution reading a larger number of times than the conventional technique while maintaining favorable recording/reproducing characteristics or superresolution reading characteristics, the present inventors considered to limit the variation of the reflectance level. The present inventors found that variation of the reflectance level caused when rewriting or superresolution reading operation was conducted a larger number of times could be limited by providing the reflective layer with a two-layer structure. This finding led us to the present invention which made it possible to conduct rewriting or superresolution reading a larger number of times.

By using the information recording medium of the present invention, therefore, it becomes possible to conduct the rewriting operation a larger number of times as compared with the conventional disk while maintaining favorable recording/reproducing characteristics or favorable superresolution reading characteristics. By using the information recording/reproducing apparatus using such an information recording medium, favorable recording/reproducing characteristics or favorable superresolution reading characteristics can be obtained even after the rewriting operation has been conducted on the information recording medium of the present invention a larger number of times as compared with the conventional disk.

DESCRIPTION OF THE PREFERRED EMBODIMENTS

Figure 1:
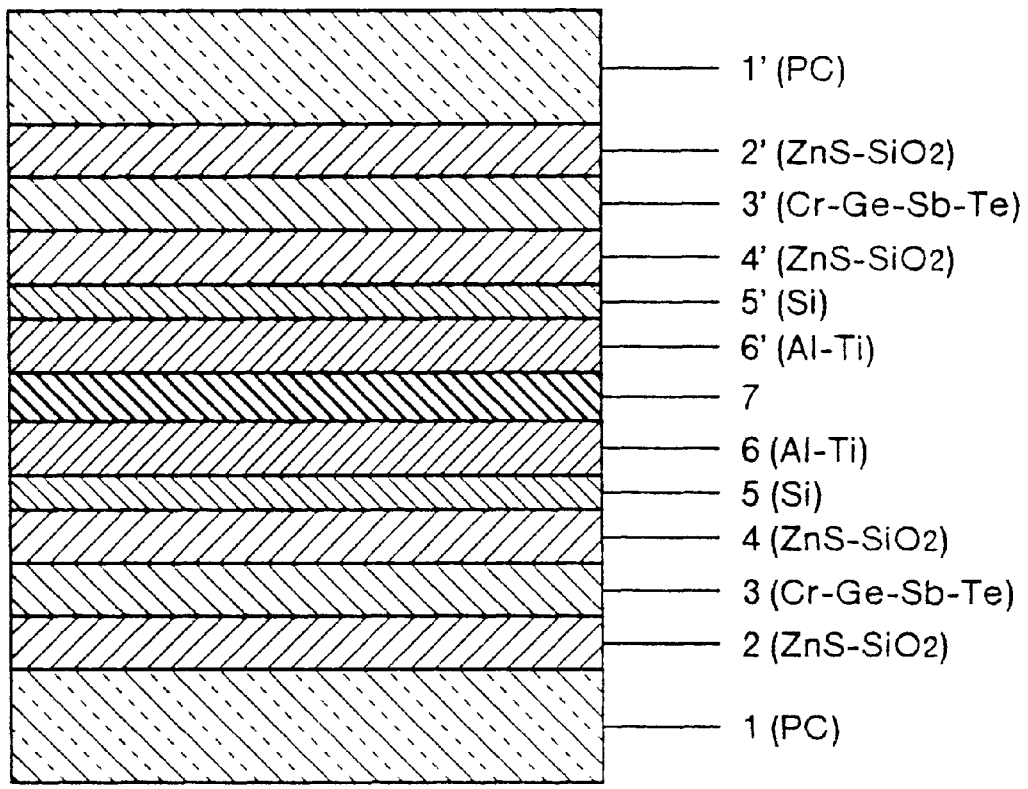
FIG. 1 is a sectional view of an information recording medium of a first embodiment according to the present invention.

Hereafter, the present invention will be described in detail by referring to embodiments.
First Embodiment
(Configuration and Fabrication Method)
FIG. 1 shows a sectional view of a disk-shaped information recording medium using an information recording thin film of a first embodiment according to the present invention. This medium was fabricated as described below.

First of all, a polycarbonate substrate 1 having a diameter of 13 cm and a thickness of 1.2 mm was formed. The polycarbonate substrate 1 had unevenness of the ISO-B format corresponding to the sample servo scheme of 5.25 inch optical disk on the surface thereof. In order to form thin films successively on this substrate 1, the substrate 1 was placed in a magnetron sputtering system. This system has a plurality of targets and is capable of forming stacked films successively. This system is excellent in uniformity and reproducibility of thickness of formed films.

By the magnetron sputtering system, a protective layer 2 containing a $(ZnS)_{80}(SiO_2)_{20}$ film was first formed on the substrate 1 so as to have a layer thickness of approximately 125 nm. Subsequently, a $(Cr_4Te_5)_{10}(Ge_2Sb_2Te_5)_{90}$ recording film 3 was formed on the protective layer 2 so as to have a layer thickness of approximately 35 nm. On the recording film 3, an intermediate layer 4 containing a $(ZnS)_{80}(SiO_2)_{20}$ film was then formed so as to have a layer thickness of approximately 20 nm. Thereafter, in the same sputtering system, a first reflective layer 5 containing a Si film was formed thereon so as to have a layer thickness of 80 nm. Subsequently, a second reflective layer 6 containing a $Al_{97}Ti_3$ film was formed so as to have a layer thickness of 100 nm. A first disk member was thus obtained.

On the other hand, a second disk member having the same configuration as that of the first disk member was obtained by using the completely same method. The second disk member has a protective layer 2' containing a $(ZnS)_{80}(SiO_2)_{20}$ film and having a layer thickness of approximately 20 nm, a $(Cr_4Te_5)_{10}(Ge_2Sb_2Te_5)_{90}$ recording film 3' having a layer thickness of approximately 35 nm. an intermediate layer 4' containing a $(ZnS)_{80}(SiO_2)_{20}$ and having a layer thickness of approximately 20 nm. a first reflective layer 5' containing a Si film and having a layer thickness of 80 nm, and a second reflective layer 6' containing a $Al_{97}Ti_3$ film and having a layer thickness of 100 nm. These layers are formed on a substrate 1' having a diameter of 13 cm and a thickness of 1.2 mm in cited order.

Thereafter, the second reflective layers 6 and 6' of the first and second disk members are stuck together by using a vinyl chloride-vinyl acetate hot melt bonding agent layer 7. The disk-shaped information recording medium as shown in FIG. 1 was thus obtained.
(Initial Crystallization)
The recording films 3 and 3' of the medium fabricate d as described above was subjected to initial crystallization as described below. In the following explanation, only the recording film 3 will be described because completely the same holds true for the recording film 3' as well.

The medium was rotated at 1800 rpm. Laser light power of a semiconductor laser (having a wavelength of 780 nm) was kept at a level (approximately 1 mW) preventing recording operation. The laser light was condensed by a lens having a numerical aperture (NA) of 0.55 included in a recording head and applied to the recording film 3 via the substrate 1. Reflected light from the recording film 3 was detected and tracking was conducted so as to make the center between pits of the substrate 1 coincident with the center of the laser light spot and make signal levels of the left and right pits equal to each other. A recording head was driven while conducting automatic focusing so as to focus the laser light on the recording film 3.

First of all, continuous laser light having power of 14 mW was applied on the same recording track of the recording film 3 respectively ten times for initial crystallization. Finally, continuous(DC) laser light having power of 7 mW was applied ten times. Irradiation time (light spot passage time) was approximately 0.1 μs each time.

By irradiation of laser beams having different power values as described above, initial crystallization can be sufficiently performed.

More preferably, laser light irradiation may be performed by using a semiconductor laser array, by using a plurality of beams obtained by dividing a laser beam from gas laser, or by using an optical beam supplied from a high-output gas laser or a semiconductor laser having an elliptical shape longer in the radial direction of the medium as the spot shape. In this case, it also becomes possible to complete initial crystallization by only rotating the medium a small number of times.

In the case where a plurality of laser light spots are used, disposing those laser light spots while displacing them each other little by little in the radial direction of the medium instead of disposing those laser light spots on the same recording track brings about some effects. For example, a wide area can be initialized by conducting irradiation a single time, and remaining unerased portions caused by incomplete erasing operation (hereafter referred to as erasing residue) can be reduced.

(Recording and Erasing)

Informtion was then recorded in the recording region of the recording film 3 completed in initial crystallization as heretofore described. At this time, the power of recording laser light was changed between an intermediate power level (7 mW) and a high power level (14 mW) while performing tracking and automatic focusing in the same way as the foregoing description. When the portion to be recorded was passed through, laser light power was lowered to a low power level (1 mW) of reproducing (reading) laser light. An amorphous portion or a nearly amorphous portion formed in the recording region by the recording laser light becomes a recording point.

The power ratio in the recording laser light between the high level and the intermediate level is especially desired to be in the range of 1:0.3 to 1:0.8. Other power levels may also be used respectively for short time intervals.

In such a recording method, directly recording new information on a portion having information already recorded causes rewriting yielding new information. Overwriting using a single circular light spot thus becomes possible.

In an alternative method, recorded information is erased once during one or more early revolutions of rewriting operation by irradiating continuous light having power (of 8 mW, for example) close to the intermediate power level (7 mW) of the above described power-modulated recording laser light. Thereafter, recording is conducted in one succeeding revolution by irradiating laser light modulated in power according to the information signal, with a power level between the low power level (1 mW) of the reproducing (reading) laser light and the high power level (14 mW) of the recording laser light or with a power level between the intermediate power level (7 mW) and the high power level (14 mW) of the recording laser light. By thus erasing information and thereafter conducting recording, previously witten information is erased more completely, resulting in a high carrier to noise (C/N) ratio.

This method is effective for not only the recording film of the present invention but also other recording films.

This information recording medium is also effective for the case where recording or reproducing is conducted with Ea number of revolutions other than 1,800 rpm.

Even when recording and erasing operation was repeated at least $10^5$ times under the severe condition that the power of laser light was raised by 15% as compared with the optimum value, variation of reflectance could be reduced in the information recording medium of the present embodiment as compared with a disk of the conventional structure.

In the case where the intermediate layer 4 was omitted in this disk, an increase in variation of reflectance was caused by rewriting operations less in times than the above described number of times by the order of one digit. As compared with the case where the intermediate layer 4 was omitted in the disk of the conventional structure, however, variation of reflectance was reduced.

(Relation Between Recording Film Thickness and Reflectance)

Figure 2:
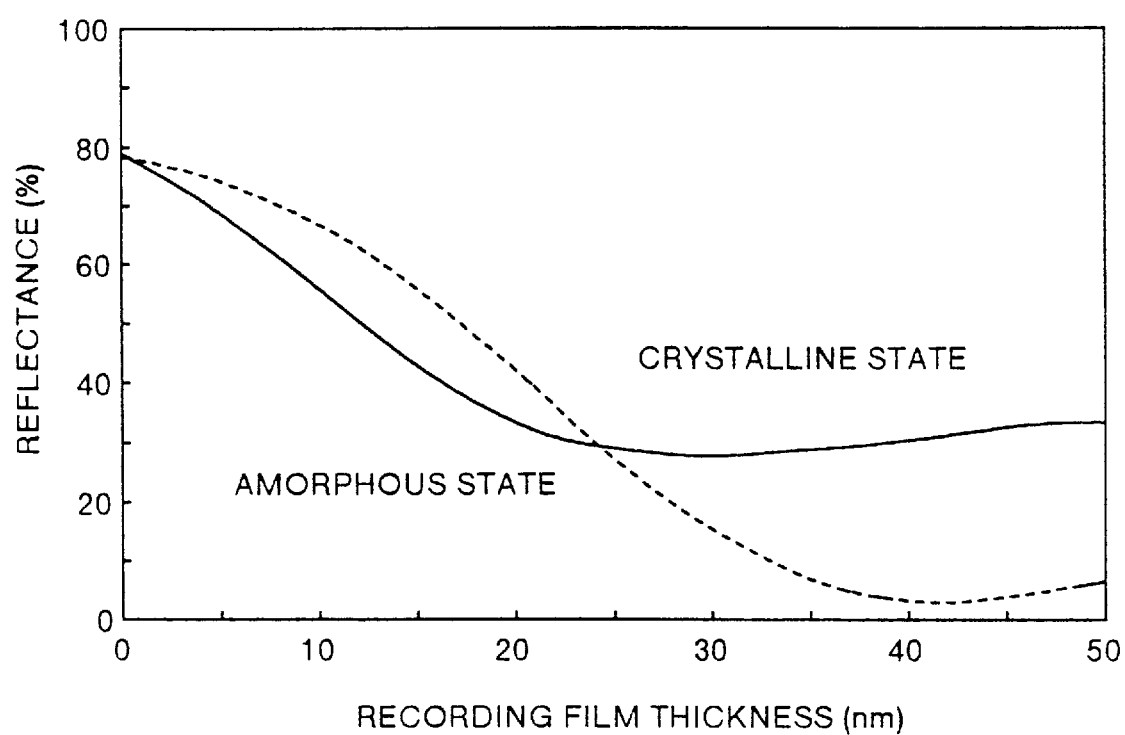
FIG. 2 is a diagram showing the relation between the recording film thickness and the reflectance of an information recording medium of the first embodiment including first reflective layers containing Si and second reflective layers containing Al—Ti.
Figure 3:
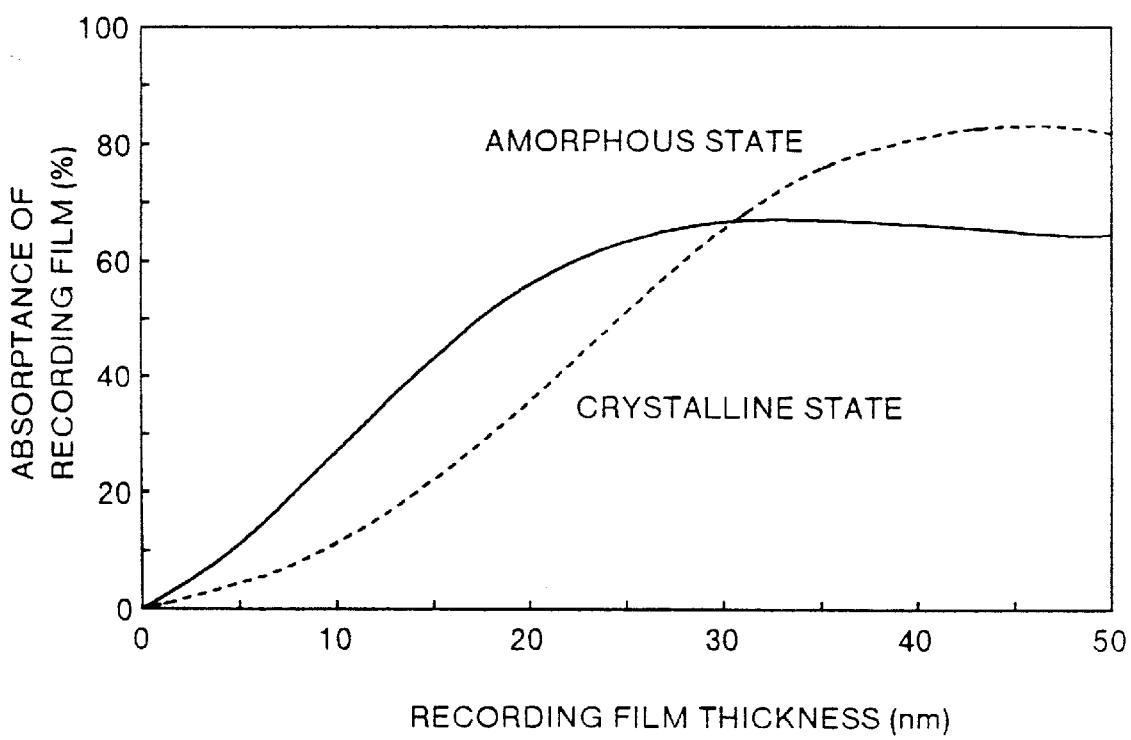
FIG. 3 is a diagram showing the relation between the recording film thickness and the recording film absorptance of an information recording medium of the first embodiment including first reflective layers containing Si and second reflective layers containing Al—Ti.
Figure 17:
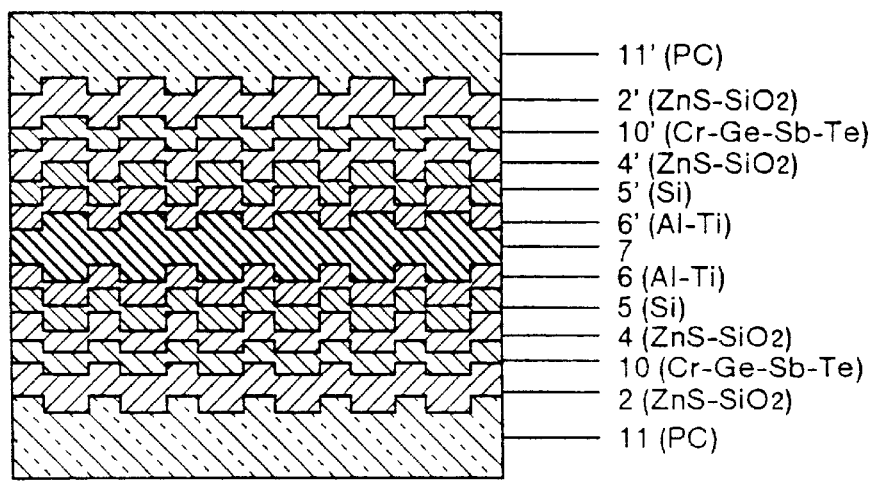
FIG. 17 is a sectional view of an information recording medium of a ninth embodiment including first reflective layers containing Si and second reflective layers containing Al—Ti.
Figure 18:
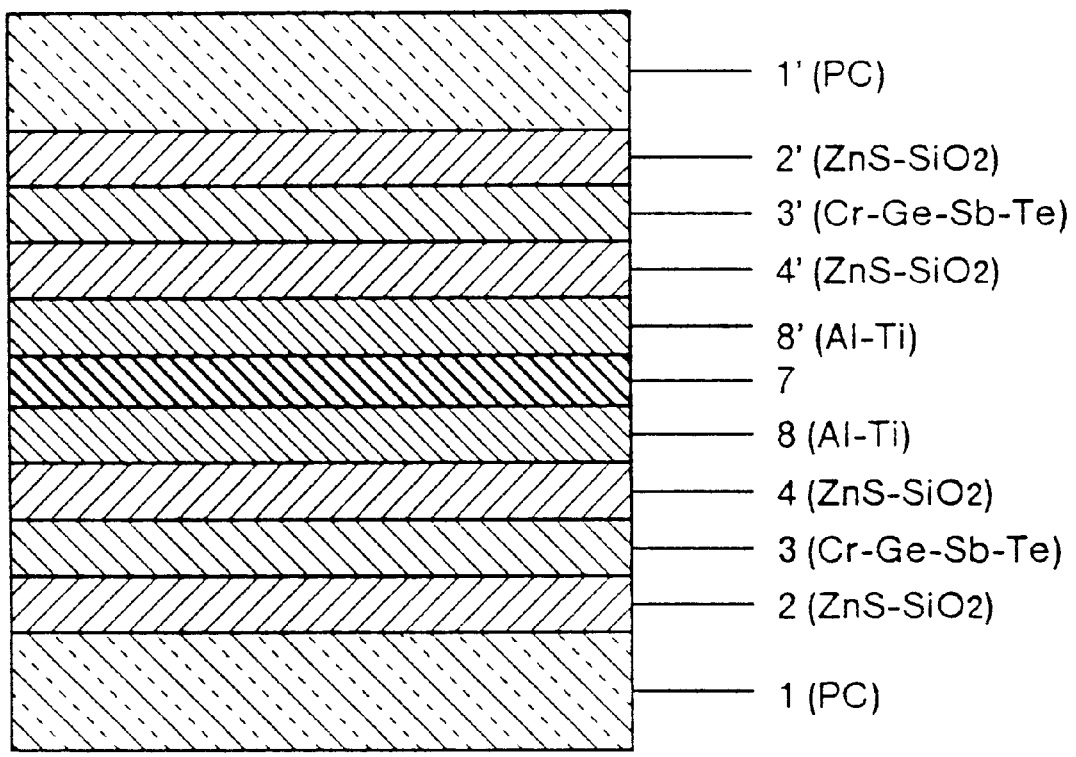
FIG. 18 is a structure diagram of an information recording medium of a tenth embodiment which is a conventional disk shown for the purpose of comparison.

FIG. 2 shows the relation between the recording film thickness and reflectance of a disk according to the present invention including reflective layers of Si and Al—Ti. For the purpose of comparison, FIGS. 17 and 18 show a conventional disk structure, and the relation between the recording film thickness and reflectance in the case of the conventional disk structure, respectively. In the above described disk including the Si/Al—Ti reflective layers, variation of the reflectance level in the crystalline state is as small as 5% or less in the wide range of 20 to 50 nm in recording film thickness. Variation of reflectance could be reduced as compared with a disk of the conventional structure by determining the recording film thickness in this range, even when recording and erasing operation was repeated at least $10^5$ times under the severe condition that the power of laser light was raised by 15% as compared with the optimum value. It can be considered that variation of the reflectance level was reduced even if a change of film thickness was caused more or less by rewriting a large number of times. FIG. 3 shows the relation between the recording film thickness and absorptance of a disk according to the present invention including reflective layers of Si and Al—Ti. In the disk of the present invention, variation of absorptance level with respect to the recording film thickness was also reduced. Therefore, erasing residue caused by variation of the absorptance level was reduced.

(Relation Between First Reflective Layer Thickness and Reflectance)

Figure 4:
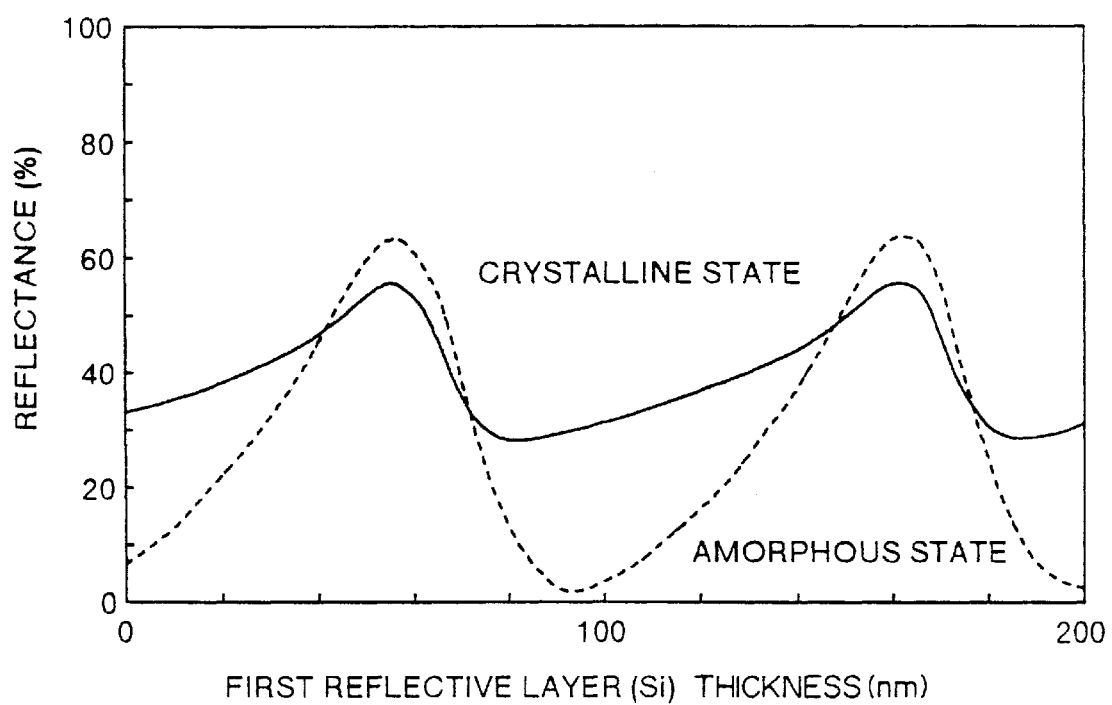
FIG. 4 is a diagram showing the relation between the first reflective layer (Si) film thickness and the reflectance of an information recording medium of the first embodiment including first reflective layers containing Si and second reflective layers containing Al—Ti.
Figure 5:
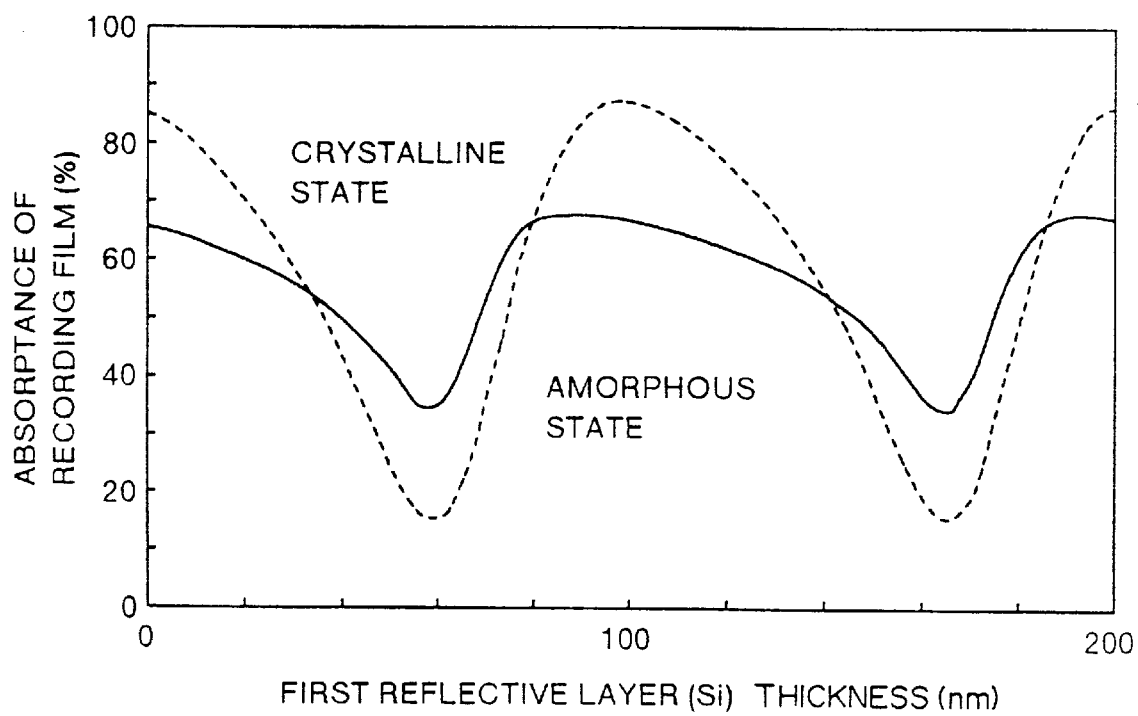
FIG. 5 is a diagram showing the relation between the first reflective layer (Si) film thickness and the recording film absorptance of an information recording medium of the first embodiment including first reflective layers containing Si and second reflective layers containing Al—Ti.

FIG. 4 shows the relation between the first reflective layer (Si) film thickness and the reflectance. FIG. 5 shows the relation between the first reflective layer (Si) film thickness and the recording film absorptance. When the first reflective layer (Si) film thickness was varied, the range of the recording film thickness for which variation of reflectance level in the crystalline state was 10% or less and the range of the recording film thickness for which the difference in reflectance between the crystalline state and the amorphous state was at least 10% varied as follows:

| Si reflective layer thickness (nm) | Recording film thickness (nm) for which variation of reflectance level is 10% or less | Recording film thickness (nm) for which reflectance difference is at least 10% |
| --- | --- | --- |
| 55 | 20 to 30 | none |
| 70 | at least 25 | at least 35 |
| 80 | at least 20 | at least 30 |
| 90 | 20 to 45 | 25 to 65, at least 85 |
| 100 | at least 25 | 20 to 55, at least 85 |
| 120 | at least 30 | 10 to 45, at least 80 |
| 140 | at least 30 | none |

Thereby, it was found that the first reflective layer (Si) film thickness ranging from 70 to 120 nm yielded small variation of reflectance level and great reflectance difference with respect to the recording film thickness. In the range for which the reflectance difference between the crystalline state and the amorphous state was at least 10%, the absorptance difference between the crystalline state and the amorphous state approached 0% when the Si film thickness was close to 80 nm. Especially in the range of 70 to 100 nm in the vicinity of this film thickness, variation of the reflectance level caused when rewriting operation was conducted a large number of times was small.

(First Reflective Layer Other Than Si)

When a Si—Ge mixed material was used as the material of the first reflective layers instead of Si used in the first reflective layer 5 of the present embodiment, the light absorptance of the recording mark portion can be made less than absorptance of portions other than the recording mark. Therefore, erasing residue caused by light absorptance difference can be prevented, and the number of possible rewriting operations is not reduced. As for the Ge content, the number of possible rewriting operations does not readily reduce when the Ge content is in the range of 10 to 80 atomic at %.

Furthermore, if Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B or S is added to Si, the transmittance of the reflective layer is decreased and the absorptance of the reflective layer is increased, the sensitivity lowering being thus prevented. As for the additive element content in this case, the reflectance level variation which might be caused when rewriting operation has been conducted a large number of times does not readily occur if the additive element content is in the range of 1 to 25 at %.

Subsequently, when a Si—N, Si—Sn or Si—In mixed material, or a mixed material including two kinds among these mixed materials was used, a similar result was obtained. These reflective layer materials do not lower the number of possible rewriting operations as compared with conventional reflective layer materials, not only when they are used as reflective layer materials in the case where the phase change film of the present invention is employed but also when they are used as reflective layer materials in the case where another phase change film is employed. As for the content of the element added to Si, the number of possible rewriting operations does not readily reduce when the content of the element added to Si is in the range of 3 to 50 at %.

Furthermore, a layer including a mixed material containing Si or Ge other than the above described materials may also be used. A layer including a material having a large refractive index and a small attenuation factor may also be used. A multi-layer including these phases may also be used. A composite layer including another material such as these oxides may also be used. Ge may also be used. Besides, various nitrides, sulfides, and selenides may also be used.

Si or the material of the first reflective layer used instead of Si is desired to have 90% of the number of all atoms of the first reflective layer. When impurities other than the above described material had 10 atomic % or more, degradation of the rewriting characteristic was observed.

Figure 6:
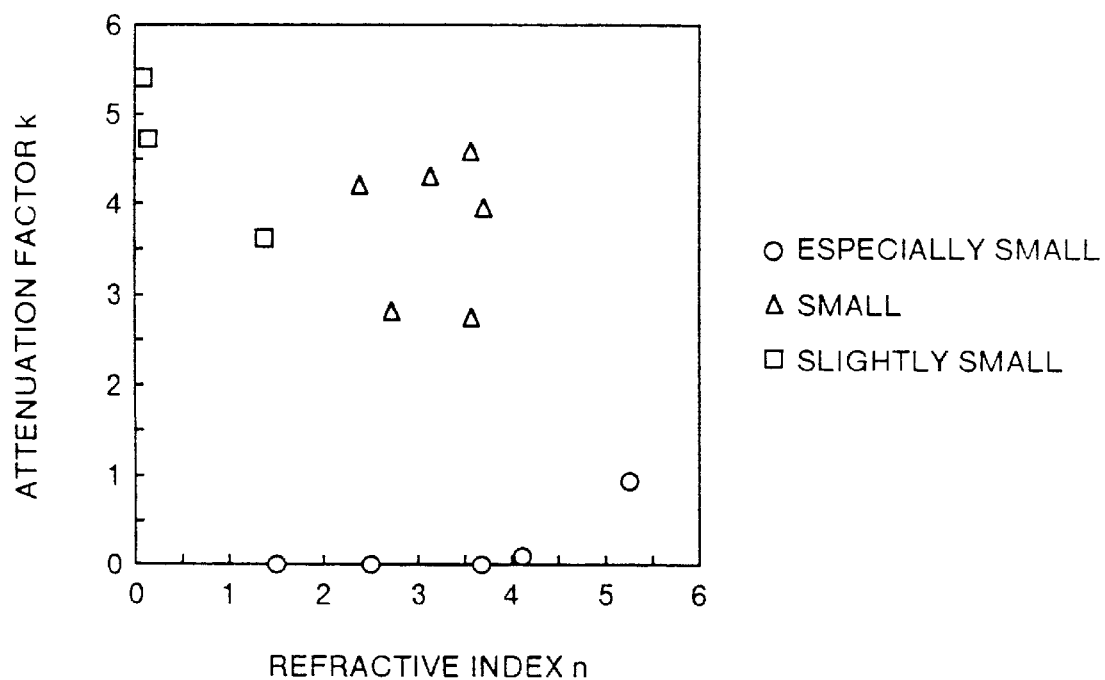
FIG. 6 is a diagram showing variations of the refractive index n, attenuation factor k and reflectance of the second reflective layers in the information recording medium of the first embodiment including first reflective layers containing Si.

FIG. 6 shows how the refractive index, attenuation factor and reflectance level of each material vary in the case where the first reflective layer material is varied. Mark o indicates that the variation of the reflectance level is especially small. Mark Δ indicates that the variation of the reflectance level is small. Mark □ indicates that the variation of the reflectance level is slightly small. The refractive index n of the Si film used in the first relective layer 5 shown in FIG. 1 was in the range of 3.7 to 4.1. The attenuation factor k was in the range of 0 to 0.3. It was thus found that the refractive index n and the attenuation factor k of the reflective layer material had to be:

preferably $n \geq 2$ and especially preferably $n \geq 2$ and $2 \geq k$.

Furthermore, a multi-layer including those layers may also be used. A composite layer including them and another material such as an oxide like $SiO_2$ may also be used. At this time, the difference in refractive index n between the first reflective layer and the second reflective layer is preferably at least 2. Unless otherwise stated, the refractive index n and the attenuation factor k of the material of each layer are represented by respective values measured at reading laser wavelength. Values of k shown in FIG. 6 are absolute values of the attenuation factor.

(Relation Between First Reflective Layer Thickness and Refractive Index of First Reflective Layer)

As apparent from the relation between the first reflective layer (Si) thickness and the reflectance shown in FIG. 5, the optimum thickness of the first reflective layer existed periodically in the case where a material having a small value of k was used in the first reflective layer. Therefrom, it was found that the optimum thickness $d_f$ of the first reflective layer could be represented as $$d_f = 105m + e \text{(nm)} \quad (1)$$

where e is in the range $70 \leq e \leq 100$, and m is 0 or a positive integer. Furthermore, it was found that, in the case where the material was changed to a material having a different refractive index, the refractive index nf of the first reflective layer and the period $t_f$ of the first reflective layer thickness satisfied the relation $$t_f = z/n_f \quad (2)$$

where z is in the range $380 \leq z \leq 400$. Therefrom, it was found that a film thickness represented by $$d_f = zm/n_f + e \text{(nm)} \quad (3)$$

was suitable for the first reflective layer.

(Protective Layer, Intermediate Layer, Substrate Material, etc.)

In the present embodiment, the protective layer 2 and the intermediate layer 4 are formed by $(ZnS)_{80}(SiO_2)_{20}$. Instead of this, the material changed in mixture ratio of ZnS and $SiO_2$, a Si—N material, Si—O—N material, an oxide such as $SiO_2$, SiO, $TiO_2$, $Al_2O_3$, $Y_2O_3$, CeO, $La_2O_3$, $In_2O_3$, GeO, $GeO_2$, PbO, SnO, $SnO_2$, $Bi_2O_3$, $TeO_2$, $WO_2$, $WO_3$, $SC_2O_3$ or $ZrO_2$, a nitride such as TaN, AlN, $Si_3N_4$ or an Al—Si—N material (like $AlSiN_2$), a sulfide such as ZnS, $Sb_2S_3$, CdS, $In_2S_3$, $Ga_2S_3$, GeS, $SnS_2$, PbS or $Bi_2S_3$, a selenide such as $SnSe_2$, $Sb_2Se_3$, CdSe, ZnSe, $In_2Se_3$, $Ga_2Se_3$, GeSe, $GeSe_2$, SnSe, PbSe or $Bi_2Se_3$, a fluoride such as $CeF_3$, $MgF_2$ or $CaF_2$, or Si, Ge, $TiB_2$, $B_4C$, B, C or a material having a composition similar to any one of the above described materials may also be used. A layer of a mixed material obtained from them or a multi-layer obtained from them may also be used.

The film thicness of the intermediate layer is desired to be 60 nm or less, or in the range of 180 to 240 nm. The thickness may be 0 nm, i.e., the intermediate layer may be omitted. Since in this case the number of layers can be reduced by one, fabrication of the information recording medium is facilitated. In the range of 180 to 240 nm, the recording sensitivity is advantageously improved, but the flow of the recording film tends to take place more frequently as compared with a thin intermediate layer. For preventing the flow of the recording film, the thickness is desired to be 60 nm or less. A thickness of 20 nm or less is preferred because the degree of modulation advantageously becomes great in the case where the absorptance of the crystalline state is made equal to at least the absoptance of the amorphous state.

In the present embodiment, the polycarbonate substrate 1 having unevenness of sample servo format formed directly on the surface is used. Instead of this, polyolefin, epoxy, acrylic resin, or chemical reinforced glass having a ultraviolet cured resin layer formed on the surface, for example, may also be used. Furthermore, not only a substrate having the sample servo format, but also a substrate using another format such as a substrate of continuous groove servo format having unevenness of a tracking guide formed by a continuous groove may also be used.

In the present embodiment, similar characteristics can be obtained even if the intermediate layers 4 and 4' are omitted and the first reflective layers 5 and 5' are directly formed on the recording films 3 and 3'. In this case, the number of layers is reduced by one and consequently fabrication of the disk is facilitated and the fabrication time can be shortened. In the peresent embodiment, two disk members are fabricated by using completely the same method and the reflective layers 5 and 5' respectively of the first and second disk members are stuck together via the bonding agent layer. Instead of the second disk member, however, a disk member having a different configuration or a protective substrate may also be used.

(Dependence of Reflectance on Wavelength)

Figure 7:
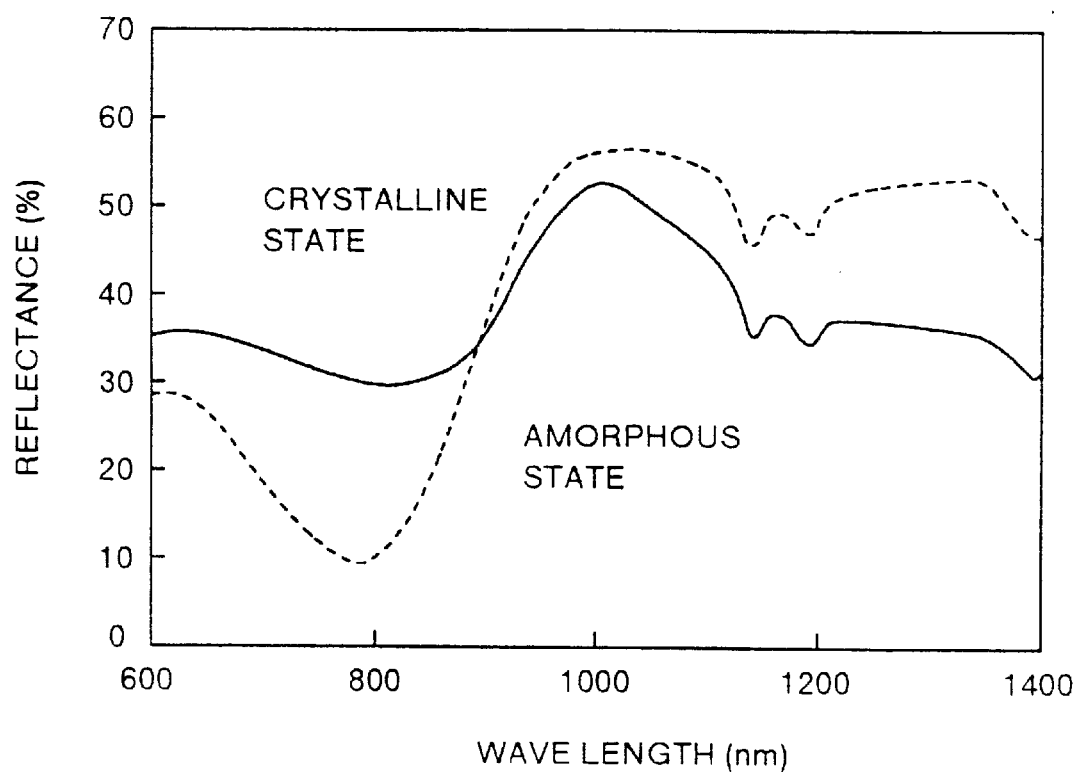
FIG. 7 is a diagram showing dependence, upon wavelength, of the reflectance of the information recording medium of the first embodiment including first reflective layers containing Si and second reflective layers containing Al—Ti.

FIG. 7 shows dependence of reflectance of a disk according to the present invention including Si/Al—Ti reflective layers on wavelength. It is understood that at 780 nm the reflectance of the amorphous state is minimized and the difference in reflectance between the two states becomes the greatest and consequently great reproduced signals can be obtained. Variation of reflectance in the crystalline state obtained at each wavelength when the film thickness of the recording layer was changed by ±10 nm was examined and the following results were obtained.

| Wavelength (nm) | Variation (%) of reflectance for recording film thickness of 25 to 40 nm |
|---|---|
| 600 | 9 |
| 700 | 10 |
| 750 | 7 |
| 760 | 5 |
| 780 | 2 |
| 800 | 3 |
| 820 | 6 |
| 830 | 10 |
| 850 | 20 |

Variation of absorptance of the recording film in the crystalline state obtained at each wavelength when the film thickness of the recording layer was changed by ±10 nm was examined and the following results were obtained.

| Wavelength (nm) | Absorptance difference (%) for recording film thickness of 25 to 40 nm |
|---|---|
| 600 | 5 |
| 700 | 10 |
| 750 | 9 |
| 780 | 3 |
| 800 | 4 |
| 830 | 10 |
| 850 | 16 |

Therefrom, it was found that variation of the reflectance level and the absorptance level with respect to the recording film thickness was small when the wavelength was in the range of 600 to 830 nm. Therefrom, the optimum wavelength is in the vicinity of 780 nm.

Furthermore, since the information memory apparatus of this disk has a light source of such a wavelength that the reflectance or absorptance becomes 10% or less in the range of the recording film thickness ±10 nm, variation of the reflectance level and the absorptance level is small.

Furthermore, dependence of the reflectance upon wavelength with the film thickness of the first reflective layer (Si) changed was examined. In the case where the film thickness of Si was made thinner by 10 nm, the wavelength minimizing the reflectance was shifted to the shorter wavelength side by 100 nm. A disk reduced in reflectance level variation can also be obtained by thus changing the disk structure according to the laser wavelength.

In the case where recording and reproducing operation is conducted with laser light having a different light source wavelength, it is desired to use a structure suited to the wavelength. As for how to determine the structure, it is desired to adopt a method of fixing the film thickness of the protective layer and determining the film thickness of the recording film or the first reflective layer so as to make the reflectance difference great, a method of fixing the film thickness of the first reflective layer and determining the film thickness of the recording film or the protective layer so as to make the reflectance difference great, or a method of calculating the film thickness of each layer from the refractive index and the wavelength as $$d'=(n\times\lambda'\times d)/(n'\times\lambda)$$

where d' is an optimum film thickness for a changed wavelength, n is a refractive index for a wavelength of 780 nm, $\lambda'$ is a wavelength after a change, d is a film thickness for the wavelength of 780 nm, n' is a refractive index for the changed wavelength, and $\lambda$ is 780 nm. In the case where $\lambda'$ is close to $\lambda$, a change of the refractive index is small and consequently calculation is simplified by assuming n=n'. In the case where a disk having characteristics similar to those of the disk shown in FIG. 1 was provided with an optimum structure for the wavelength of 680 nm by changing the film thickness alone according to the latter cited method, 109 nm for the protective layer, 30 nm for the recording film, 17 nm for the intermediate layer, 70 nm for the first reflective layer, and 87 nm for the second reflective layer were obtained. In the case where the disk was provided with an optimum structure for a wavelength of 500 nm, 75 nm for the protective layer, 30 nm for the recording film, 12 nm for the intermediate layer, 45 nm for the first reflective layer, and 155 nm for the second reflective layer were obtained. By thus adopting an optimum structure according to the wavelength, the degree of modulation became great and the C/N ratio of the reproduced signal also became great.

(Second Reflective Layer Other Than Al—Ti)

As a material of the second reflective layer usable instead of Al—Ti used in the second reflective layer 6 in the present embodiment, a material containing an Al alloy as its main component such as Al—Ti, Al—Ag, Al—Cu or Al—Cr is desirable. Al can also be used. Materials other than Al alloys may also be used and description thereof will be provided with reference to a second embodiment.

In the case of an Al alloy, when the Al content is in the range of 50 atomic to 99.9 at %, the thermal conductivity can be made great and the possible number of rewriting operations is not readily lowered.

It is desirable that Al—Ti or the material of the second reflective layer used instead of Al—Ti occupies at least 80% of all atoms of the second reflective layer. When impurities other than the above sdescribed material occupied 20 atomic at % or more, degradation of rewriting characteristics was observed.

The film thickness of the second reflective layer may be 0 nm, but preferably it should be at least 5 nm. More preferably, it should be at least 30 nm from the viewpoint of increasing the strength, and it should be 200 nm or less from the viewpoint of shortening the fabrication time.

Second Embodiment (Configuration and Fabrication Method)

An information recording medium was fabricated in the same way as the first embodiment except that Al—Ti in the second reflective layers 6 and 6' of the first embodiment was replaced by Sb—Bi. Furthermore, initialization of the recording film and susequent information recording and reproducing method were made identical to those of the first embodiment.

(Relation Between Recording Film Thickness and Reflectance)

Figure 8:
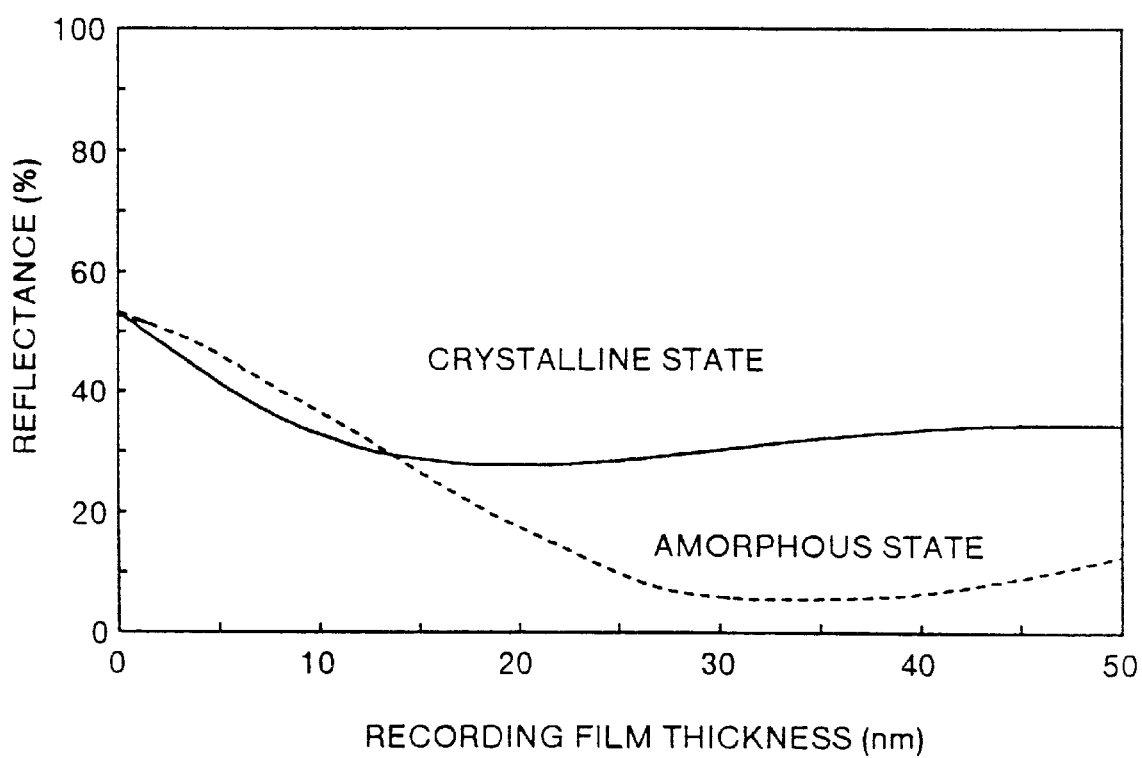
FIG. 8 is a diagram showing the relation between the recording film thickness and the reflectance of an information recording medium of a second embodiment including first reflective layers containing Si and second reflective layers containing Sb—Bi.

FIG. 8 shows the relation between the recording film thickness and the reflectance of a disk according to the present invention including Si reflective layers and Sb—Bi reflective layers. In the case of the Si/Sb—Bi reflective layer disk, the reflectance level variation of the crystalline state is small in the wide range, in recording film thickness, of 10 nm or more. Furthermore, variation of the reflectance level of the amorphous state as well becomes small in the range of 25 to 50 nm.

The relation between the first reflective layer (Si) thickness and variation of the reflectance level was examined. As a result, the range for which the reflectance difference between the crystalline state and the amorphous state of the recording film was at least 10% and the range for which variation of the reflectance level of the crystalline state with respect to the recording film thickness was 10% or less varied as shown in the following table.

| Si reflective layer thickness (nm) | Recording film thickness (nm) for which variation of reflectance level is 10% or less | Recording film thickness (nm) for which reflectance difference is at least 10% |
|---|---|---|
| 60 | 10 to 30, at least 25 | at least 45 |
| 65 | at least 25 | at least 25 |
| 70 | at least 15 | at least 25 |
| 85 | at least 10 | at least 20 |
| 100 | at least 15 | at least 30 |
| 120 | at least 25 | 10 to 35 |
| 130 | at least 25 | 10 to 30 |

In the range of 65 to 120 nm, therefore, the width of the recording film thickness for which variation of the reflectance level variation was small was wide and the reflectance difference was great. In this range, the Si layer thickness at which the difference in absorptance of the recording film between the crystalline state and the amorphous state approached 0% was in the vicinity of 85 nm. Especially in the range of 70 to 100 nm near this layer thickness, variation of the reflectance level observed when rewriting operation was conducted a large number of times was small.

(Material of Second Reflective Layer Other Than Al Alloy and Sb—Bi)

Instead of Sb—Bi used in the second reflective layers 6 and 6' in the present embodiment, a layer including a single element of SUS, Ni—Cr, Au, Ag, Cu, Al, Ni, Fe, Co, Cr, Ti, Pd, Pt, W, Ta, Mo, Sb, Bi, Dy, Cd, Mn, Mg or V, an alloy containing them as its main component such as a Au alloy, Ag alloy, Cu alloy, Al alloy, Pd alloy or Pt alloy, or an alloy between them may also be used. A multi-layer containing these layers may also be used. A composite layer containing them and another material such as an oxide may also be used. So long as the material is different from the first reflective layer in refractive index and attenuation factor, a layer including an alloy containing Si, Ge, Sn or In as its main component, or an alloy between them and the above described elements may also be used. A multi-layer including these layers may also be used. A composite layer including them and another material such as an oxide may also be used. Furthermore, the attenuation factor k of the material is desired to be at least 3.

Among them, a material having a great thermal conductivity such as Cu, Al, Au, an Cu alloy, Al alloy or Au alloy makes the disk structure a rapid cooling structure and suppresses variation of reflectance caused by conducting the rewriting operation a large number of times. Furthermore, a material having a small thermal conductivity such as Sb—Bi, Dy, SUS or Ni—Cr facilitates thermal insulation and consequently has an advantage of improved recording sensitivity.

In the case where Mo or a Mo compound is used, absorptance control is facilitated and consequently an advantage of improved rewriting characteristics is obtained.

As compared with a simple substance of Au, an alloy such as Au—Ag, Au—Co or Au—Al has an advantage of increased adhesive strength and is favorable.

Sb—Bi and the material of the second reflective layer used instead of Sb—Bi are desired to have at least 80% of all atoms of the second reflective layer. If impurities other than the above described materials reached at least 20 atomic %, degradation of rewriting characteristics was observed.

The film thickness of the second reflective layer may be at least 0 nm, but it is desired to be at least 5 nm. More preferably, it should be at least 30 nm from the viewpoint of increasing the strength and it should be 200 nm or less from the viewpoint of shortening the fabrication time.

(Combination of First Reflective Layer Material and Second Reflective Layer Material)

As for the first reflective layer material, materials described with reference to the first embodiment can be used. As for the second reflective layer material, materials descibed with reference to the first embodiment and the present embodiment can be used. However, it was found that the rewriting characteristics could be improved by effecting selection out of these combinations. As for a preferred combination, the first reflective layer should contain at least one out of Si, Ge, Si—Ge and Si—N compounds or have a composition close thereto, and the second reflective layer should contain at least one out of Al, an Al alloy, Au, a Au alloy, Ag, a Ag alloy, Cu, a Cu alloy, Pt, a Pt alloy, Pd, a Pd alloy and a Sb—Bi solid solution, or it should have a composition close thereto.

Matters described in the present embodiment are the same as those of the first embodiment.

Third Embodiment (Configuration and Fabrication Method)

The following information recording medium was fabricated in the same way as the first embodiment except that the composition ratio of $(Cr_4Te_5)_{10}(Ge_2Sb_2Te_5)_{90}$, i.e., $(Cr_4Te_5)_{0.1}\{(GeTe)_{0.33}(Sb_2Te_3)_{0.67}\}_{0.9}$ was replaced. Furthermore, initialization of the recording film and subsequent information recording and reproducing method were made identical to those of the first embodiment.

(Relation Between Recording Film Component and Protective Layer Thickness)

When the above described recording film components were reprented as $(Cr_4Te_5)_x\{(GeTe)_y(Sb_2Te_3)_{100-y}\}_{100-x}$, relations among the content x (at %) of the high melting point, the proportion y(%) of the GeTe quantity in the phase change component, and optimum (light incidence side) protective layer thickness t (represented with the unit of nm) were examined.

| Content x (at %) of high melting point | Preportion y (%) of GeTe quantity in phase change quantity | Composition of phase change component | Optimum protective layer thickness t (nm) |
|---|---|---|---|
| 10 ± 5 | 0.67 | $Ge_2Sb_2Te_5$ | 100 to 170 |
| 22.5 ± 7.5 | 0.33 | $Ge_1Sb_4Te_7$ | 100 to 170 |
| 0 | 0.67 | $Ge_2Sb_2Te_5$ | 180 to 250 |
| 0 | 1.0 | GeTe | 100 to 170 |

From the foregoing description, the following expression was satisfied between them.

$$ax+by=c-t \quad (4)$$

In the case where the high melting point was $Cr_4Te_5$, however, relations $5 \leq a \leq 11$, $25 \leq b \leq 35$, and $2500 \leq c \leq 3500$ were met. In the case where another material is used as the high melting point component, the above described expression (4) is satisfied, but the value range of "a" slightly changes. However, most values of "a" are in the range of $3 \leq a \leq 15$. Even if the contents of respective elements included in the recording film was moved in the range of approximately ±5 atomic % from the above described values, a favorable result was obtained. A composition with Cr—Te added is favorable in the viewpoint of recording sensitivity and oxidation resistance because the protective layer can be made thin and Sb can be contained in the recording film. Since the number of elements is increased, however, film fabrication becomes slightly difficult. The material and the favorable range of the film thickness of each of layers which are not included in the expression (4) are the same as those in the first embodiment.

In this way, selection of film thickness and components of the protective layer, the recording film, the first reflective layer, the second reflective layer and the intermediate layer is not only effective singly, but also dependent totally on the disk characteristics. Therefore, it is most desirable to satisfy respective favorable ranges, and if possible, to satisfy all of the more preferred ranges. Even if all ranges are not satisfied, however, the recording and reproducing characteristics of the disk are kept in a very favorable state so long as all ranges except one or two are satisfied. If at least half of all ranges are satisfied, the recording and reproducing characteristics of the disk are kept in a favorable state.

(Recording Film Material)

As for the material of the recording film used in the recording films 3 and 3' in the present embodiment instead of $(Cr_4Te_5)_{10}(Ge_2Sb_2Te_5)_{90}$, a Cr—Ge—Sb—Te material having a different composition ratio, such as $(Cr_4Te_5)_{20}(GeSb_4Te_7)_{80}$, is not readily lowered in possible number of rewriting operations.

Subsequently, similar results were obtained when Ag—Ge—Sb—Te, Co—Ge—Sb—Te and V—Ge—Sb—Te were used.

Furthermore, even if at least one of $Ge_2Sb_2Te_5$, $GeSb_2Te_4$, $GeSb_4Te_7$, $In_3SbTe_2$, $In_{35}Sb_{32}Te_{33}$, $In_{31}Sb_{26}Te_{43}$, GeTe, Ag—In—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te and Bi—Ge—Sb—Te other than the above described materials, and materials having compositions close to those of them is used instead, similar characteristics are obtained. Even if a part of Ge is replaced by In, similar characteristics are obtained.

Furthermore, a recording film having a phase change component containing Ge—Sb—Te as its main component and a high melting point component having a higher melting point added thereto is not readily lowered in possible number of rewriting operations. If at least 95% of all atoms of the phase change component are formed by combinations of GeTe and Sb2Te3, and at least 95% of all atoms of the high melting point component are formed by at least one of Cr—Te, Cr—Sb, Cr—Ge, Cr—Sb—Te, Cr—Sb—Ge, Cr—Ge—Te, Co—Te, Co—Sb, Co—Ge, Co—Sb—Te, Co—Sb—Ge, Co—Ge—Te, Cu—Te, Cu—Sb, Cu—Ge, Cu—Sb—Te, Cu—Sb—Ge, Cu—Ge—Te, Mn—Te, Mn—Sb, Mn—Ge, Mn—Sb—Te, Mn—Sb—Ge, Mn—Ge—Te, V—Te, V—Sb, V—Ge, V—Sb—Te, V—Sb—Ge, V—Ge—Te, Ni—Te, Ni—Sb, Ni—Ge, Ni—Sb—Te, Ni—Sb—Ge, Ni—Ge—Te, Mo—Te, Mo—Sb, Mo—Ge, Mo—Sb—Te, Mo—Sb—Ge, Mo—Ge—Te, W—Te, W—Sb, W—Ge, W—Sb—Te, W—Sb—Ge, W—Ge—Te, Ag—Te, Ag—Sb, Ag—Ge, Ag—Sb—Te, Ag—Sb—Ge and Ag—Ge—Te, or a substance having a composition similar thereto, then the possible number of rewriting operations is not readily lowered. It was found that Cr—Te such as $Cr_4Te_5$, $Cr_2Te_3$, $Cr_3Te_4$ and $Cr_5Te_8$ was especially good. Furthermore, it was found that $Ag_2Te$, $AgSbTe_2$ or the like was great in signal strength even if the wavelength of the light source became short. It was found that Ag—Te and Ag—Sb—Te was especially good.

In the case where at least 95% of all atoms of the phase change component have a composition of $Ge_2Sb_2Te_5$, then a proportion of high melting point component atoms in all atoms of the recording film being in the range of 5 to 20 atomic % produces good rewriting characteristics. A range of 5 to 15 atomic % produces better rewriting characteristics because of good erasing characteristics.

As for the recording film thickness, a range of 15 to 50 nm is preferred because the degree of modulation is great and the flow is not readily caused. If the recording film thickness is in the range of 15 to 40 nm, there is obtained an advantage that the reflectance of the crystalline state is liable to become at least the reflectance of the amorphous state. If the recording film thickness is in the range of 25 to 50 nm, the change of the reflectance is small with respect to a change of recording film thickness. Or there is obtained an advantage that the absorptance is increased when the recording film thickness become thicker.

Matters which are not described with reference to the present embodiment are the same as those of the first or second embodiments.

Fourth Embodiment (Configuration and Fabrication Method)

Figure 9:
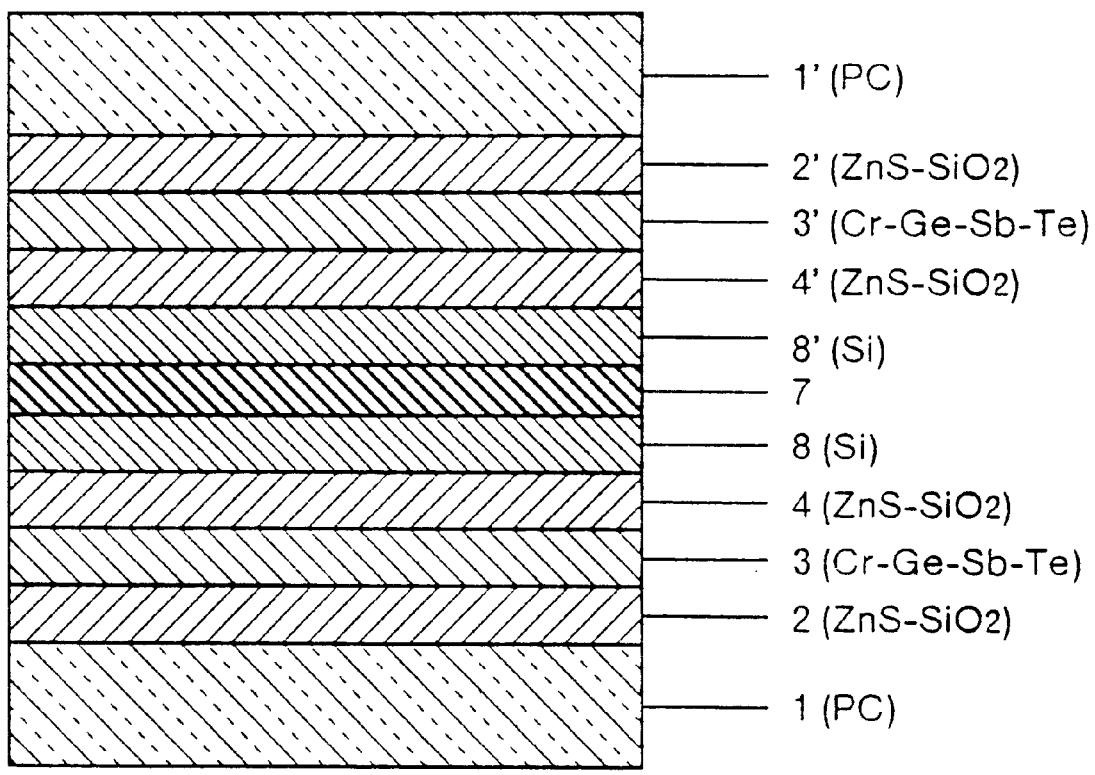
FIG. 9 is a sectional view of an information recording medium of a fourth embodiment according to the present invention.

FIG. 9 shows a sectional view of a disk-shaped information recording medium using an information recording thin film of a fourth embodiment according to the present invention. This medium was fabricated as described below.

First of all, a polycarbonate substrate 1 having a diameter of 13 cm and a thickness of 1.2 mm and having an ISO-B format on its surface was formed. Subsequently, a protective layer 2 containing a $(ZnS)_{80}(SiO_2)_{20}$ film was formed so as to have a film thickness of approximately 125 nm. Subsequently, a recording film 3 having a composition of $(Cr_4Te_5)_{10}(Ge_2Sb_2Te5)_{90}$ was formed so as to have a thickness of approximately 35 nm. Subsequently, an intermediate layer 4 containing a $(ZnS)_{80}(SiO_2)_{20}$ film was formed so as to have a film thickness of approximately 35 nm. Subsequently, a reflective layer 8 containing a Si film was formed so as to have a film thickness of 160 nm. A first disk member was thus obtained. Formation of these films was conducted by using the magnetron sputtering system described with reference to the first embodiment.

On the other hand, a second disk member having the same configuration as the first disk member was obtained by using completely the same method. The second disk member includes a protective layer 2' containing a $(ZnS)_{80}(SiO_2)_{20}$ film with a film thickness of approximately 125 nm, a recording film 3' having a composition of $(Cr_4Te_5)_{10}(Ge_2Sb_2Te_5)_{90}$ with a thickness of approximately 35 nm, an intermediate layer 4' containing a $(ZnS)_{80}(SiO_2)_{20}$ film with a film thickness of approximately 20 nm, and a reflective layer 8' containing a Si film with a film thickness of 160 nm. These layers are formed in order on a substrate 1' having a diameter of 13 cm and a thickness of 1.2 mm.

Thereafter, the reflective layers 8 and 8' respectively of the first and second disk members were stuck together by using a vinyl chloride-vinyl acetate hot melt bonding agent layer 7. The disk-shaped information recording medium shown in FIG. 9 was thus obtained.

Furthermore, initialization of the recording film and the subsequent information recording and reproducing method were made identical to those of the first embodiment.

(Relation Between Recording Film Thickness and Reflectance Level)

Figure 10:
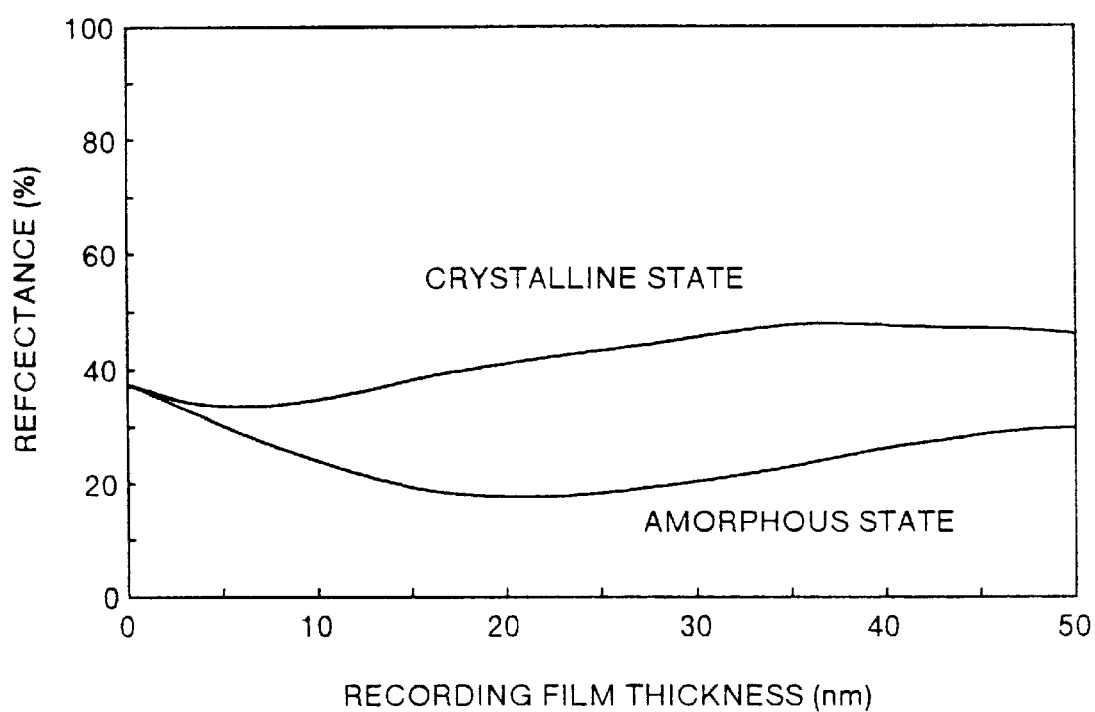
FIG. 10 is a diagram showing the relation between the recording film thickness and the reflectance of an information recording medium of the fourth embodiment including reflective layers containing Si.

FIG. 10 shows the relation between the recording film thickness and the reflectance level of the disk of the fourth embodiment including the Si reflective layers. In the case of the disk including the Si reflctive layers, variation of the reflectance level is small in a wide range, in recording film thickness, of 15 to 50 nm.

(Relation Between Reflective Layer Thickness and Reflectance Level Variation)

When the thickness of the reflective layer (Si) was varied, variation of the reflectance level with respect to the recording film thickness varied as shown in the following table.

| Reflective layer thickness (nm) | Recording film thickness (nm) for which variation of reflectance level is 10% or less | Recording film thickness (nm) for which reflectance difference is at least 10% |
| --- | --- | --- |
| 80 | at least 30 | 15 to 50 |
| 100 | at least 25 | 10 to 40 |
| 120 | 20 to 45 | 10 to 35 |
| 140 | 10 to 30, at least 35 | at least 15 |
| 160 | at least 20 | at least 20 |
| 180 | at least 30 | at least 15 |
| 200 | at least 25 | 15 to 45 |
| 220 | 25 to 45 | 10 to 35 |

Therefrom, it will be understood that a range of 100 to 200 nm is desirable and a range of 120 to 180 nm is more desirable.

In this range, a reflective layer thickness at which the absorptance difference between the crytalline state and the amorphous state approaches 0% is in the vicinity of 160 nm. Especially in the range of this film thickness ±10 nm or less, variation of the reflectance level caused when rewriting operation was conducted a large number of times was small. This range was thus optimum.

If materials or film thickness values of the protective layer, intermediate layer and recording film are varied, the optimum Si reflective layer thickness varies. When respective layers of the disk of the fourth embodiment were replaced by protective layers 2 and 2' each including a $(ZnS)_{80}(SiO_2)_{20}$ film with a film thickness of approximately 150 nm, recording films 3 and 3' each including a $(Cr_4Te_5)_{10}(Ge_2Sb_2Te_5)_{90}$ with a film thickness of approximately 25 nm, and intermediate layers 4 and 4' each including a $(ZnS)_{80}(SiO_2)_{20}$ film with a film thickness of approximately 30 nm, the optimum Si reflective layer thickness was 150 nm. It is thus desirable to set to the reflective layer thickness at which the absorptance difference approaches 0% ±10 nm.

(Reflective Layer Material Other Than Si)

When Ge or a Si—Ge mixed material was used as the material of the reflective layers instead of Si used in the reflective layers 8 and 8' of the present embodiment, the light absorptance of the recording mark portion can be made less than light absorptance of portions other than the recording mark. Therefore, erasing residue caused by light absorptance difference can be prevented, and the number of possible rewriting operations is not reduced. As for the Ge content, the number of possible rewriting operations does not readily reduce when the Ge content is in the range of 10 to 80 atomic %.

Furthermore, if Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B or S is added to Si, the transmittance of the reflective layer is decreased and the absorptance of the reflective layer is increased, the sensitivity lowering being thus prevented. As for the additive element content in this case, the reflectance level variation which might be caused when rewriting operation has been conducted a large number of times does not readily occur if the additive element content is in the range of 1 to 25 atomic %.

Furthermore, if Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B or S is added to Si, the transmittance of the reflective layer is decreased and the absorptance of the reflective layer is increased, the sensitivity lowering being thus prevented. As for the additive element content in this case, the reflectance level variation which might be caused when rewriting operation has been conducted a large number of times does not readily occur if the additive element content is in the range of 1 to 25 atomic %.

Subsequently, when a Si—N, Si—Sn or Si—In mixed material, or a mixed material including two kinds among these mixed materials was used, a similar result was obtained. These reflective layer materials do not lower the number of possible rewriting operations as compared with conventional reflective layer materials, not only when they are used as reflective layer materials in the case where the phase change film of the present invention is employed but also when they are used as reflective layer materials in the case where another phase change film is employed. As for the content of the element added to Si, the number of possible rewriting operations does not readily reduce when the content of the element added to Si is in the range of 3 to 50 atomic %.

Furthermore, a layer including a mixed material containing Si or Ge other than the above described materials may also be used. A layer including a material having a large refractive index and a small attenuation factor may also be used. A multi-layer including these phases may also be used. A composite layer including another material such as these oxides may also be used. Ge may also be used. Besides, various nitrides, sulfides, and selenides may also be used.

Figure 11:
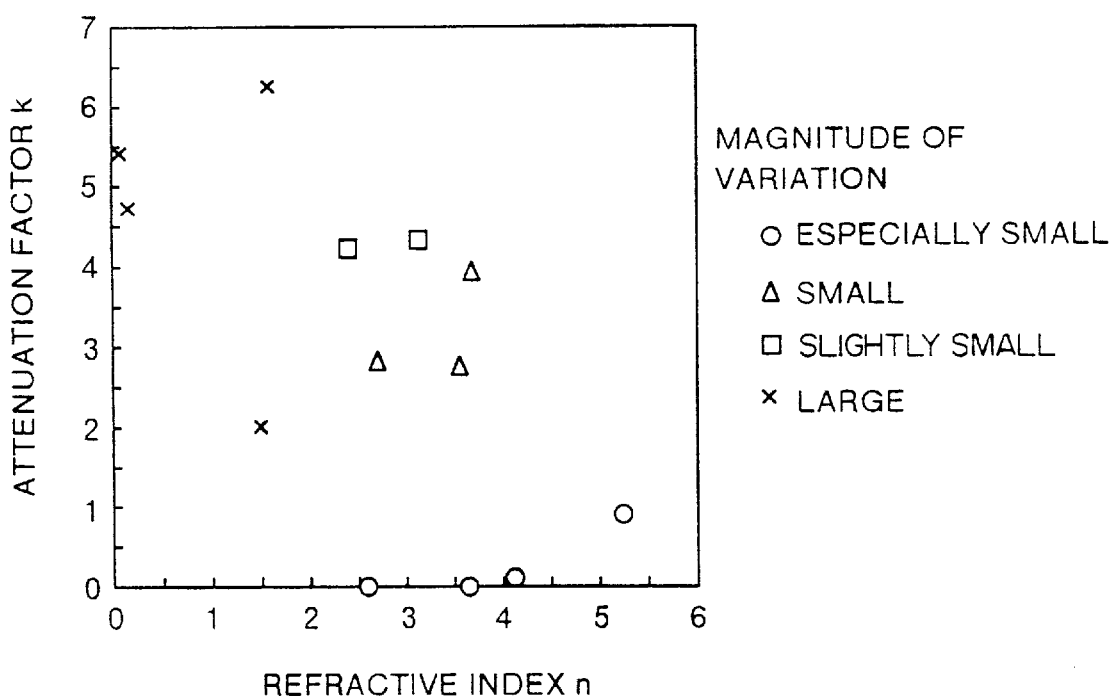
FIG. 11 is a diagram showing variations of the refractive index n, attenuation factor k and reflectance of the reflective layers in the information recording medium of the fourth embodiment including reflective layers containing Si.

FIG. 11 shows how the reflectance level varies in the case where the reflective layer material is varied. Mark o indicates that the variation of the reflectance level is especially small. Mark Δ indicates that the variation of the reflectance level is small. Mark □ indicates that the variation of the reflectance level is slightly small. Mark X indicates that the variation of the reflectance level is large. It was thus found that the refractive index n and the attenuation factor k of the reflective layer material had to be:

preferably $n \geq 2$
more preferably $n \geq 2$ and $4 \geq k$ and
especially preferably $n \geq 2$ and $1 \geq k$.

Furthermore, a multi-layer including those layers may also be used. A composite layer including them and another material such as an oxide may also be used.

(Relation Between Reflective Layer Material and Reflective Layer Thickness)

With respect to reflective layer materials having different refractive indices and attenuation factors, such as the Si reflective layer and Si—Ge reflective layer, the relation between the refractive index nr of the reflective layer material and the reflective layer thickness dr was examined.

$$d_r = (zm-v)/n_r + h(nm) \quad (5)$$

Ranges of h, z and v are respectively represented as $-65 \leq h \leq -5$, $380 \leq z \leq 400$ and $240 \leq v \leq 250$, and m is 0 or a positive integer. When the reflective layer thickness $d_r$ satisfies the expression (5), variation of the reflectance level becomes small. It was found that variation of the reflectance level became smaller when the range of h in the expression (5) satisfied the relation $-45 \leq h \leq -25$. However, a film thickness of 50 nm yielded better rewriting characteristics. The reason is considered to be that the strength is decreased when the film thickness is less than 50 nm.

Matters which are not described with reference to the present embodiment are the same as those of the first through third embodiments. For example, the initialization, recording and reproducing method, protective layer, intermediate layer, and substrate material are identical to those of the first and second embodiments. The recording film material is identical to that of the third embodiment.

Fifth Embodiment
(Configuration and Fabrication Method)

Figure 12:
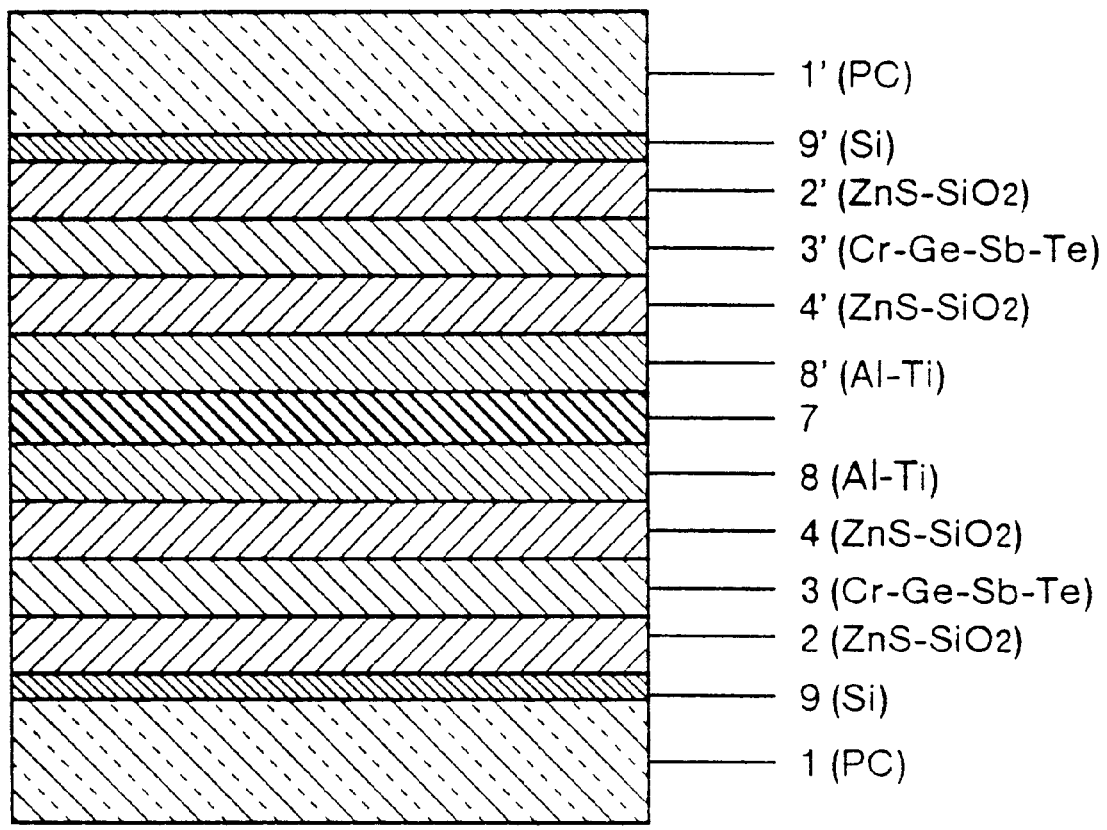
FIG. 12 is a sectional view of an information recording medium of a fifth embodiment including light incidence side reflective layers.

FIG. 12 shows a sectional view of a disk-shaped information recording medium using an information recording thin film of a fifth embodiment according to the present invention. This medium was fabricated as described below.

First of all, on a polycarbonate substrate 1 having a diameter of 13 cm and a thickness of 1.2 mm and having unevenness of the ISO-B (sample servo) format on its surface, a light incidence side reflective layer 9 containing Si and having a film thickness of approximately 50 nm, a protective layer 2 including a $(ZnS)_{80}(SiO_2)_{20}$ film and having a film thickness of approximately 235 nm, a recording film 3 having a composition of $(Ge_2Sb_2Te_5)_{85}(Cr_4Te_5)_{15}$ and having a film thickness of approximately 25 nm, an intermediate layer 4 including a $(ZnS)_{80}(SiO_2)_{20}$ film and having a film thickness of approximately 20 nm, and a reflective layer 8 including a $Al_{97}Ti_3$ film and having a film thickness of 100 nm were formed in order. Formation of these films was conducted by using the sputtering system described with reference to the first embodiment. The first disk member was thus obtained.

On the other hand, a second disk member having the same configuration as the first disk member was obtained by using completely the same method. The second disk member includes a light incidence side reflective layer 9' containing Si and having a film thickness of approximately 50 nm, a protective layer 2' including a $(ZnS)_{80}(SiO_2)_{20}$ film and having a film thickness of approximately 235 nm, a recording film 3' having a composition of $(Ge_2Sb_2Te_5)_{85}(Cr_4Te_5)_{15}$ and having a film thickness of approximately 25 nm, an intermediate layer 4' including a $(ZnS)_{80}(SiO_2)_{20}$ film and having a film thickness of approximately 20 nm, and a reflective layer 8' including a $Al_{97}Ti_3$ film and having a film thickness of 100 nm. These layers are formed in order on a substrate 1' having a diameter of 13 cm and a thickness of 1.2 mm.

Thereafter, the reflective layers 8 and 8' respectively of the first and second disk members were stuck together by using a vinyl chloride-vinyl acetate hot melt bonding agent layer 7. The disk-shaped information recording medium shown in FIG. 13 was thus obtained.

Furthermore, initialization of the recording film and the subsequent information recording and reproducing method were made identical to those of the first embodiment.

(Reflectance of Crystalline State and Amorphous State)

Reflectance $R_c$ in the crystalline state and reflectance $R_a$ in the amorphous state of the disk of the present invention having a Si light incidence side reflective layer were examined and the following results were obtained.

$R_c = 60$ (%)

$R_a = 24$ (%)

Therefrom, it is appreciated that the degree of modulation $M = (R_c - R_a)/R_c$ (where $R_c > R_a$) is 60%. A disk having a high reflectance value and a high degree of modulation was thus obtained.

(First Relations Among Protective Layer Thickness, Si Light Incidence Side Reflective Layer Thickness and Absorptance)

When the protetive layer thickness in the disk of the present invention was varied in the range of 125 to 305 nm, the film thickness of the Si light incidence side reflective layer for which the absorptance $A_c$ in the crystalline state became equal to or greater than the absorptance $A_a$ in the amorphous state $(A_c \geq A_a)$ was examined in the range of 200 nm or less. It was found that in the following range the erasing residue in the overwriting operation was reduced as compared with the conventional disk. This is because the relation of absorptance is reversed as compared with the conventional disk, i.e., $A_c \geq A_a$ and consequently in recording in a place having a recording mark the mark width is prevented from becoming too large.

| Lower protective layer thickness (nm) | Si light incidence side reflective layer thickness (nm) causing $A_c \geq A_a$ to be satisfied |
|---|---|
| 125 | 70 to 100, 175 to 205 |
| 150 | 40 to 95, 145 to 200 |
| 180 | 20 to 75, 125 to 185 |
| 210 | 10 to 45, 115 to 150 |
| 235 | 5 to 20, 110 to 125 |

Therefrom, the relation $A_c \geq A_a$ is satisfied. The relation between a desirable protective layer thickness $d_p$ and the range of the Si light incidence side reflective layer thickness $d_a$ is represented as $$d_p = f - 0.66 \, d_a \text{ (nm)} \tag{6}$$

where the range of f is $140 \leq f \leq 200$. At this time, the Si light incidence side reflective layer thickness is desired to be in the range of 10 to 50 nm because the degree of modulation becomes great.

In a material having a small attenuation factor k, the absorptance A had the same values at fixed periods of the film thickness. In this case, the protective layer thickness $d_p$ is approximately 180 nm, and the Si light incidence side reflective layer thickness $d_a$ has a period of approximately 105 nm. Assuming j and u are integers, therefore, the relation is represented by the following expression.

$$d_p = f - 0.66 \, (d_a - 105 \, u) - 180 \, j \text{ (nm)} \tag{7}$$

However, the relation holds true in the range represented as $10 \leq d_p$ and $0 < d_a$. Since the layer thickness period d and the refractive index n are related by d=z/n, the expression (7) can be rewritten as $$d_p = f - 0.66 \, (d_a - zu/na) - zj/n_p \text{ (nm)} \tag{8}$$

where $n_p$ is the refractive index of the protective layer, $n_a$ is the refractive index of the light incidence side reflective layer, and the range of z is $380 \leq z \leq 400$.

(Second Relations Among Protective Layer Thickness, Si Light Incidence Side Reflective Layer Thickness and Absorptance)

When the protetive layer thikness in the disk of the present invention was varied in the range of 150 to 330 nm, the film thickness of the Si light incidence side reflective layer for which the reflectance $R_c$ in the crystalline state became at least 60% in the amorphous state and the degree of modulation $M=(R_c-R_a)/R_c$ (where $R_c>R_a$) was examined in the range of 200 nm or less. In the following range, the reflectance and the degree of modulation are greater than those of the conventional disk.

| Protective layer thickness (nm) | Si light incident side reflective layer thickness (nm) causing relations $R_c \geq 60\%$ and $M \geq 60\%$ to be satisfied |
|---|---|
| 150 | none |
| 180 | none |
| 220 | 70, 80, 175, 185 |
| 235 | 45, 150 |
| 250 | 35, 140 |
| 260 | 30, 135 |
| 280 | 25, 130 |
| 320 | 20, 125 |

Therfrom, the relation between the protective layer thickness $d_p$ and the Si light incidence side reflective layer thickness $d_a$ causing the relations $R_c \geq 60\%$ and $M \geq 60\%$ to be satisfied is represented as $$d_p = 1440 \times 10^{(-6.26e-3da)+g} \tag{9}$$

where the range of g is $-30 \leq g \leq 30$. In a material having a small attenuation factor k, the reflectance R indicates the same values at fixed periods of the film thickness. In this case, the protective layer thickness $d_p$ is approximately 180 nm, and the Si light incidence side reflective layer thickness $d_a$ has a period of approximately 105 nm. Assuming j and u are positive integers, therefore, the relation is represented by the following expression.

$$d_p = 1440 \times 10^{\{-6.26e-3(da-105u)\}+g+180j} \tag{10}$$

Since the layer thickness period d and the refractive index n are related by d=z/n, the expression (10) can be rewritten as $$d_p = 1440 \times 10^{\{-6.26e-3(da-zu/na)\}+g:zj/np} \tag{11}$$

where $n_p$ is the refractive index of the protective layer, $n_a$ is the refractive index of the light incidence side reflective layer, and the range of z is $380 \leq z \leq 400$.

(Light Incidence Side Reflective Layer Material Other than Si)

When a Si—Ge mixed material was used as the material of the light incidence side reflective layers instead of Si used in the reflective layers 9 and 9' of the present embodiment, the light incidence side reflectance of the recording mark portion can be made less than the light incidence side reflectance of portions other than the recording mark. Therefore, erasing residue caused by light incidence side reflectance difference can be prevented, and the number of possible rewriting operations is not reduced. As for the Ge content, the number of possible rewriting operations does not readily reduce when the Ge content is in the range of 10 to 80 atomic %.

Furthermore, if Au, Ag, Cu, Al, Ni, Fe, Co, Cr, Ti, Pd, Pt, W, Ta, Mo, Sb, Bi, Dy, Cd, Mn, Mg, V, Zn, Ga, Tl, Pb, C, B or S is added to Si, the transmittance of the reflective layer is decreased and the absorptance of the reflective layer is increased, the sensitivity lowering being thus prevented. As for the additive element content in this case, the reflectance level variation which might be caused when rewriting operation has been conducted a large number of times does not readily occur if the additive element content is in the range of 1 to 25 atomic %.

Subsequently, when a Si—N, Si—Sn, Si—In or Si—Au mixed material, or a mixed material including two kinds among these mixed materials was used, a similar result was obtained. These reflective layer materials do not lower the number of possible rewriting operations as compared with conventional reflective layer materials, not only when they are used as reflective layer materials in the case where the phase change film of the present invention is employed but also when they are used as reflective layer materials in the case where another phase change film is employed. As for the content of the element added to Si, the number of possible rewriting operations does not readily reduce when the content of the element added to Si is in the range of 3 to 50 atomic %.

Furthermore, a layer including a mixed material containing Si or Ge other than the above described materials may also be used. A layer including a material having a large refractive index and a small attenuation factor may also be used. A multi-layer including these phases may also be used. A composite layer including another material such as these oxides may also be used. Ge may also be used. Besides, various nitrides, sulfides, and selenides may also be used.

It was thus found that in order to facilitate control of the absorptance, the refractive index n and the attenuation factor k of the light incidence side reflective layer material had to be:

preferably $n \geq 2$ more preferably $n \geq 2$ and $2 \geq k$.

Furthermore, a multi-layer including those layers may also be used. A composite layer including them and another material, such as an oxide like $SiO_2$, may also be used.
(Reflective Layer Material Other than Al—Ti in Disk having Light Incidence Side Reflective Layer)

Instead of Al—Ti used in each of the reflective layers 8 and 8' in the present embodiment, a layer including a single element of Au, Ag, Cu, Al, Ni, Fe, Co, Cr, Ti, Pd, Pt, W, Ta, Mo, Sb, Bi, Dy, Cd, Mn, Mg or V, an alloy containing them as its main component such as a Au alloy, Ag alloy, Cu alloy, Al alloy, Pd alloy or Pt alloy, or an alloy between them may also be used. A multi-layer containing these layers may also be used. A composite layer containing them and another material such as an oxide may also be used.

Among them, a material having a great thermal conductivity such as Cu, Al, Au, Ag, an Cu alloy, Al alloy, Au alloy or Ag alloy makes the disk structure a rapid cooling structure and suppresses variation of reflectance caused by conducting the rewriting operation a large number of times. Furthermore, a material having a small thermal conductivity such as Sb—Bi, Dy, SUS or Ni—Cr facilitates thermal insulation and consequently has an advantage of improved recording sensitivity. As compared with a simple substance of Au, a AU alloy such as Au—Ag, Au—Co or Au—Al has an advantage of increased adhesive strength and is favorable.

Furthermore, a layer containing at least one of Si, Ge, Si—Ge, Si—N, Si—Sn, Si—In and Si—Au, a layer including an alloy which contains Si, Ge, Sn or In as its main component, or a layer including an alloy between them and the above described elements may also be used. A multi-layer including those layers may also be used. A composite layer including them and another material such as an oxide may also be used. A composition obtained by adding, to at least one of Si, Ge, Si—Ge and Si—N, at least one selected out of a group formed by Au, Ag, Cu, Al, Ni, Fe, Co, Cr, Ti, Pd, Pt, W, Ta, Mo, Sb, Bi, Dy, Cd, Mn, Mg, V, Ga, In, Sn, Pb and Te with a proportion between 1 and 30 atomic %, or a composition close thereto has an advantage of facilitating the absorptance control.

The film thickness of the reflective layer is desired to be at least 5 nm. More preferably, it should be at least 30 nm from the viewpoint of increasing the strength and it should be 200 nm or less from the viewpoint of shortening the fabrication time. Especially in the case of materials having an attenuation factor of at least unity, such as Al, Au, an AL alloy, Au alloy, or Sb—Bi, absorptance control is facilitated if the film thickness of the reflective layer is set to 30 nm or less. For making the absorptance of the crystalline state equivalent to at least the absorptance of the amorphous state, the thickness is desired to be in the range of 5 to 30 nm.

If the film thickness of the reflective layer is set between 5 and 10 nm, the difference in absorptance between the crystalline state and the amorphous state can be kept at a suitable value of 10% or less. Therefore, this range is desirable.

In this way, selection of film thickness and components of the protective layer, the recording film, the light incidence side reflective layer, the reflective layer and the intermediate layer is not only effective singly, but also dependent totally on the disk characteristics. Therefore, it is most desirable to satisfy respective favorable ranges, and if possible, to satisfy all of the more preferred ranges. Even if all ranges are not satisfied, however, the recording and reproducing characteristics of the disk are kept in a very favorable state so long as all ranges except one or two are satisfied. If at least half of all ranges are satisfied, the recording and reproducing characteristics of the disk are kept in a favorable state.

Matters which are not described are identical to those of the first to third embodiments.

Sixth Embodiment
(Configuration and Fabrication Method)

An information recording medium was fabricated in the same way as the fifth embodiment except that Si in the light incidence side reflective layers 9 and 9' of the fifth embodiment was replaced by Au—Ag. The disk member includes light incidence side reflective layers 9 and 9' each containing $Au_{50}Ag_{50}$ and having a film thickness of approximately 10 nm, protective layers 2 and 2' each including a $(ZnS)_{80}(SiO_2)_{20}$ film and having a film thickness of approximately 185 nm, recording films 3 and 3' each having a composition of $(Ge_2Sb_2Te_5)_{90}(Cr_4Te_5)_{10}$ and having a film thickness of approximately 30 nm, intermediate layers 4 and 4' each including a $(ZnS)_{80}(SiO_2)_{20}$ film and having a film thickness of approximately 20 nm, and reflective layers 8 and 8' each including a $Al_{97}Ti_3$ film and having a film thickness of 100 nm, and a vinyl chloride-vinyl acetate hot melt bonding agent layer 20. These layers of this disk member are respectively formed in order on substrates 1 and 1' each having a diameter of 13 cm and a thickness of 1.2 mm.

Furthermore, initialization of the recording film and the subsequent information recording and reproducing method were made identical to those of the first embodiment.
(Reflectance of Crystalline State and Amorphous State)

Reflectance $R_c$ in the crystalline state and reflectance $R_a$ in the amorphous state of the disk of the present invention having a Au—Ag light incidence side reflective layer were examined and the following results were obtained.

$R_c$=60 (%)

$R_a$=24 (%)

Therefrom, it is; appreciated that the degree of modulation $M=(R_c-R_a)/R_c$ (where $R_c>R_a$) is 60%. A disk having a high reflectance value and a high degree of modulation was thus obtained.
(First Relation Between Protective Layer Thickness and Absorptance)

When the protetive layer thickness in the disk of the present invention was varied in the range of 50 to 230 nm, the thickness for which the absorptance $A_c$ in the crystalline state became equal to or greater than the absorptance $A_a$ in the amorphous state ($A_c \geq A_a$) was examined and it was found to be 100 to 170 nm. It was found that in this range the erasing residue in the overwriting operation was reduced as compared with the conventional disk. This is because the relation of absorptance is reversed as compared with the conventional disk, i.e., $A_c \geq A_a$ and consequently in recording in a place having a recording mark the mark width is prevented from becoming too large.

In the case where the reflective layers 8 and 8' were changed to Si layers of 100 nm, the range for which the absorptance $A_c$ in the crystalline state became greater then the absorptance $A_a$ in the amorphous state ($A_c \geq A_a$) were between 60 and 170 nm. Therefrom it was found that the protective layer thickness was desired to be in the range of 60 to 170 nm, and it was more desired to be in the range of 100 to 170 mm.

Furthermore, in a material having a small attenuation factor k, suvh as $ZnS$—$SiO_2$, the absorptance had the same value A at fixed periods of the film thickness. In this case, the refractive index n of the $(ZnS)_{80}(SiO_2)_{20}$ is in the range of 1.9 to 2.2, and its attenuation factor k is 0. The protective layer thickness dp has a period of approximately 180 nm, and its desirable range is represented as $$d_p = i + 180j \text{ (nm)} \tag{12}$$

where j is 0 or a positive integer, and the range of i is $60 \leq i \leq 170$. A desirable range of i is $100 \leq i \leq 170$.

In the case of a different material, the layer thickness period d and the refractive index n are related by the following expression.

$$d = z/n$$

Representing the refractive index of the protective layer by $n_p$, the expression (12) can be rewritten as $$d_p = i + zj/n_p \text{ (nm)} \tag{13}$$

where the range of z is $380 \leq z \leq 400$.

(Relations Among Recording Film Thickness, Reflectance Level and Absorptance Level)

Figure 13:
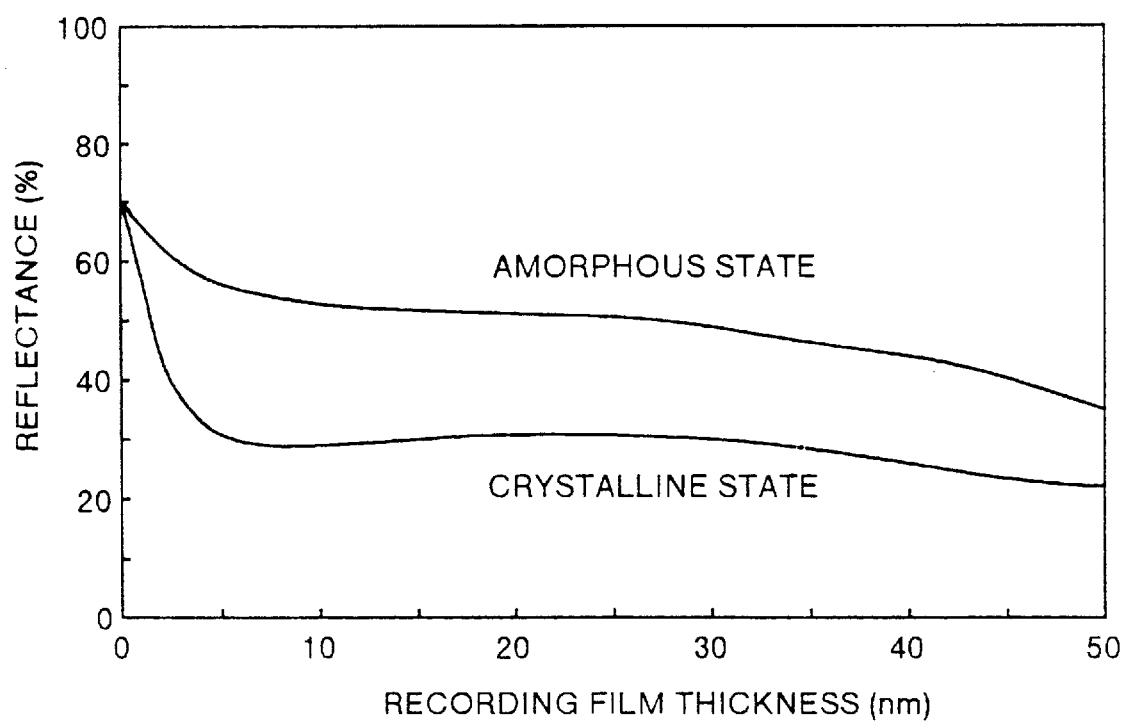
FIG. 13 is a diagram showing the relation between the recording film thickness and the reflectance of an information recording medium of a sixth embodiment including light incidence side reflective layers.
Figure 14:
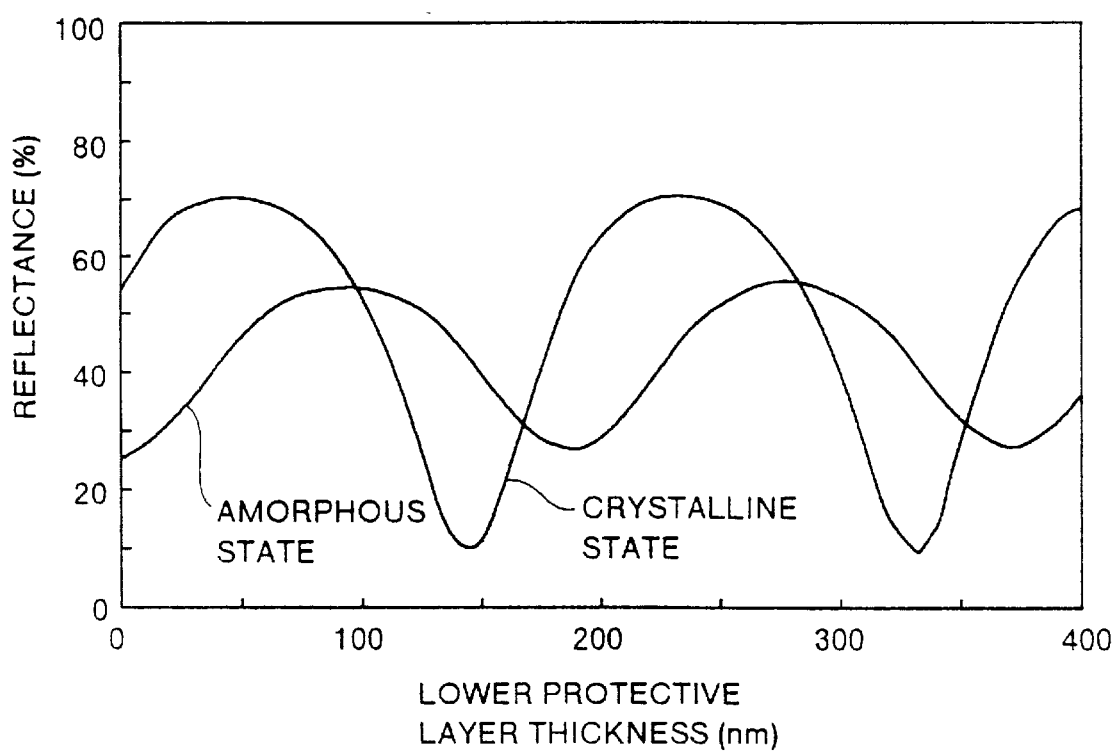
FIG. 14 is a diagram showing the relation between the protective layer film thickness and the reflectance of an information recording medium of the sixth embodiment including light incidence side reflective layers.

In the case where film thickness values of the protective layers 2 and 2', the recording films 3 and 3', and the intermediate layers 4 and 4' were varied without changing the material, the relation between the recording film thickness and the reflectance level as shown in FIG. 13 was obtained. The disk member includes light incidence side reflective layers 9 and 9' each containing $Au_{50}Ag_{50}$ and having a film thickness of approximately 10 nm, protective layers 2 and 2' each including a (ZnS)80(SiO2)20 film and having a film thickness of approximately 115 nm, recording films 3 and 3' each having a composition of $(Ge_2Sb_2Te_5)_{90}(Cr_4Te_5)_{10}$ and having a film thickness of approximately 20 nm, intermediate layers 4 and 4' each including a $(ZnS)_{80}(SiO_2)_{20}$ film and having a film thickness of approximately 30 nm, and reflective layers 8 and 8' each including a $Al_{97}Ti_3$ film and having a film thickness of 100 nm. These layers of this disk member are respectively formed in order on substrates 1 and 1' each having a diameter of 13 cm and a thickness of 1.2 mm. In this disk, the reflectance in the amorphous state is higher than the reflectance level in the crystalline state, unlike the conventional disk shown in FIG. 18. Furthermore, when the recording film thickness is in the range of 10 to 40 nm, variation of the reflectance level is small. How the reflectance level varies depends on the film thickness of the protective layer. When the recording film had a thickness of 20 nm, the reflectance of the disk was measured as shown in FIG. 14. Variation of the reflectance level was measured when the film thickness $d_p$ of the protective layer was changed. If a film thickness in the range satisfying the reflectance conditions of (14) to (16) was selected, reflectance variation when the recording film thickness was changed became small. Reflectance in the crystalline state is denoted by $R_c$ and reflectance in the amorphous state is denoted by $R_a$.

$$R_c - R_a \geq 0 \tag{14}$$

$$dR_a/dd_p \leq 0 \tag{15}$$

$$dR_c/dd_p \leq 0 \tag{16}$$

In the range satisfying the reflectance conditions of (14') to (16'), variation of the reflectance caused when the recording film thickness changed became small and the degree of modulation became further great.

$$R_c - R_a \geq 10 \tag{14'}$$

$$dR_a/dd_p \leq 0.01 \tag{15'}$$

$$dR_c/dd_p \leq 0.01 \tag{16'}$$

Especially when $110 \leq i \leq 130$ in the expressions (12) and (13), variation of the reflectance was small.

Furthermore, without changing the materials, a disk increased in film thickness of the protective layers 2 and 2', the recording films 3 and 3', and the intermediate layers 4, 4', and reflective layers 8 and 8' was fabricated. The disk member includes light incidence side reflective layers 9 and 9' each containing $Au_{50}Ag_{50}$ and having a film thickness of approximately 10 nm, protective layers 2 and 2' each including a $(ZnS)_{80}(SiO_2)_{20}$ film and having a film thickness of approximately 110 nm, recording films 3 and 3' each having a composition of $(Ge_2Sb_2Te_5)_{90}(Cr_4Te_5)_{10}$ and having a film thickness of approximately 25 nm, intermediate layers 4 and 4' each including a $(ZnS)_{80}(SiO_2)_{20}$ film and having a film thickness of approximately 50 nm, and reflective layers 8 and 8' each including a $Al_{97}Ti_3$ film and having a film thickness of 50 nm. These layers of this disk member are respectively formed in order on substrates 1 and 1' each having a diameter of 13 cm and a thickness of 1.2 mm. This disk has a feature that the reflectance is high when the recording film is made amorphous by irradiation of laser light with high power while the reflectance is low when the recording film is crystallized by irradiation of laser light with lower power. As the recording film thickness becomes greater, the absorptance becomes slightly greater. In the conventional disk shown in FIGS. 18 and 19, the absorptance becomes smaller as the recording film thickness is increased. In the case where a flow of the recording film occurs, a portion of increased recording film thickness becomes further thicker or remains as it is if the rewriting operation is repeated. In this disk, however, the absorptance becomes great as the recording film thickness becomes thicker. When the rewriting operation is repeated, however, the film thickness conversely becomes thinner or does not become thicker, resulting in an effect.

Furthermore, it was found that characteristics at the time of rewriting operation differed largely depending upon film thickness values of respective layers and combination of materials. What are effective to the improvement of characteristics are: Au—Ag is used as the light incidence side reflective layer material; the content of the high melting point component is in the range of 5 to 15 atomic %; the reflective layer thickness is in the range of 30 to 80 nm; and the protective layer thickness is in the range of 70 to 110 nm.

It is most desirable that all of these conditions are satisfied, but it is also sufficiently effective even if a part of these conditions is satisfied. Especially as for the protective layer thickness, the refletance difference tends to become small if the protective layer is too thin, but making the protective layer thin tends to suppress the flow at the time of rewriting. Therefore, the range of 70 to 100 nm is more desirable, and the range of 70 to 90 nm is especailly desirable. As for the quantity of the element added to Au contained in the light incidence side reflective layer material, the range is wide in the case of Ag and the range of 1 to 80 at % is desirable.

As for the light incidence side reflective layer of a material having a great attenuation factor, such as Au—Ag, 20 nm or less is desirable because light is not transmitted if it is too thick.

(Light Incidence Side Reflective Layer Material Other than Au—Ag )

As for a material of the light incidence side reflective material used instead of Au—Ag used in the light incidence side reflective layer 9 of this embodiment, a Au—Co mixed material can make the adhesive strength between the substrate and the film large. As for the content of Co, the range of 1 to 30 atomic % makes it possible to transmit light and set the reflectance of the disk to a suitable value.

Subsequently, when a Au—Al, Au—Cu, Au—Cr, Au—Ni, Au—Ti or Au—Si mixed material, or a mixed material including two kinds among these mixed materials was used, a similar result was obtained. These light incidence side reflective layer materials are capable of controlling the absorptance and reducing the erasing residue, not only when they are used for the light incidence side reflective layer of the information recording medium of the present invention but also when they are used for a light incidence side reflective layer of another information recording medium using a phase change film. Since Au is small in n and has a large possible film thickness range, single substnce use thereof is optically good, but is inferior to a mixed material such as Au—Ag or Au—Co in that its adhesive strength is small.

Furthermore, a layer including a mixed material containing Cu, Ag or Nd other than the above described materials may also be used. A layer including a mixed material of Au—Ge or Au—Sb may also be used. A layer including a material having a small attenuation factor may also be used. It was found that the refractive index of the material had to be:

preferably $n \leq 1$ more preferably $n \leq 0.5$ and especially preferably $n \leq 0.2$.

Furthermore, a multi-layer including those layers may also be used. A composite layer including them and another material, such as an oxide, may also be used.

In this way, selection of film thickness and components of the protective layer, the recording film, the light incidence side reflective layer, the reflective layer and the intermediate layer is not only effective singly, but also dependent totally on the disk characteristics. Therefore, it is most desirable to satisfy respective favorable ranges, and if possible, to satisfy all of the more preferred ranges. Even if all ranges are not satisfied, however, the recording and reproducing characteristics of the disk are kept in a very favorable state so long as all ranges except one or two are satisfied. If at least half of all ranges are satisfied, the recording and reproducing characteristics of the disk are kept in a favorable state.

Matters which are not described here are identical to those of the first to fourth embodiments.

Seventh Embodiment
(Configuration and Fabrication Method)

Figure 15:
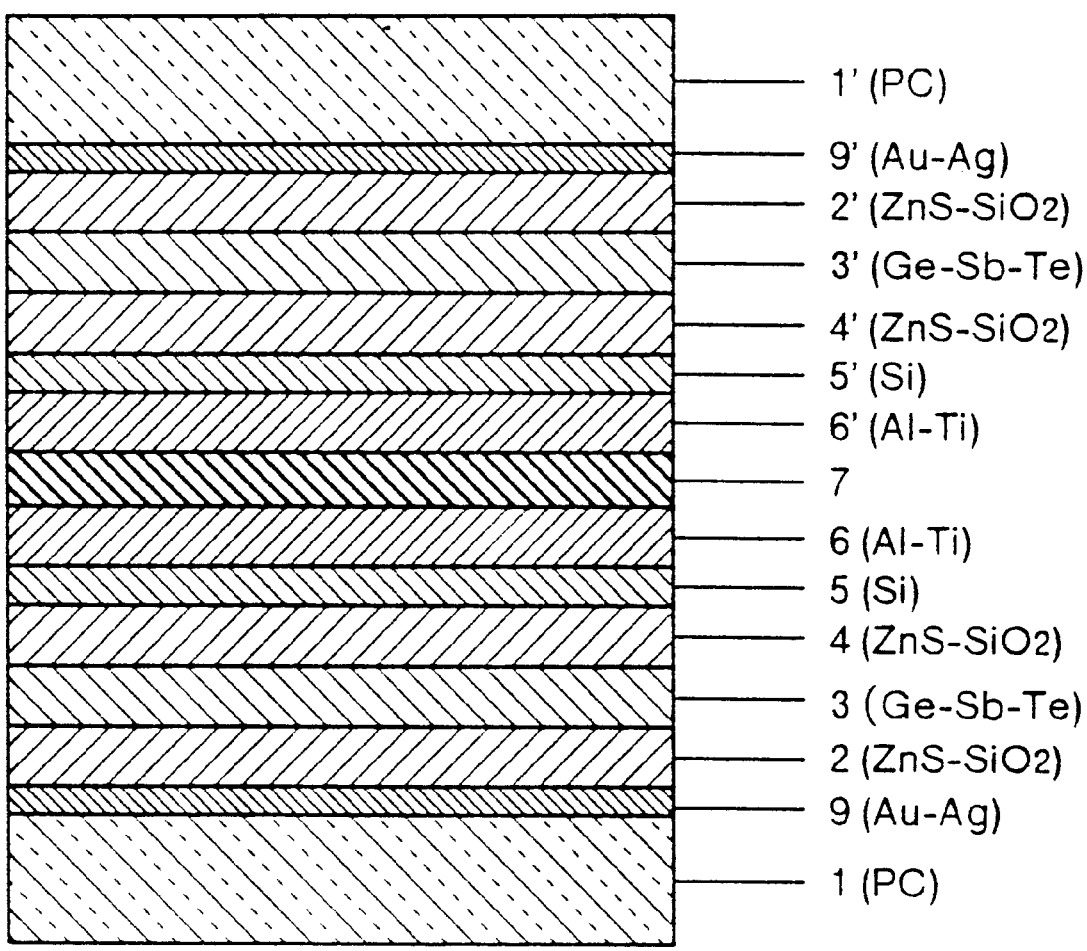
FIG. 15 is a sectional view of an information recording medium of a seventh embodiment including light incidence side reflective layers, first reflective layers containing Si, and second reflective layers containing Al—Ti.

FIG. 15 shows a sectional view of a disk-shaped information recording medium using an information recording thin film of a seventh embodiment according to the present invention. This medium was fabricated as described below.

First of all, on a polycarbonate substrate 1 having a diameter of 13 cm and a thickness of 1.2 mm and having an ISO-B format on its surface, a light incidence side reflective layer 9 containing $Au_{50}Ag_{50}$ and having a film thickness of approximately 10 nm, a protective layer 2 including a $(ZnS)_{80}(SiO_2)_{20}$ film and having a film thickness of approximately 180 nm, a recording film 3 having a composition of $(Cr_4Te_5)_{10}(Ge_2Sb_2Te_5)_{90}$ and having a film thickness of approximately 40 nm, an intermediate layer 4 including a $(ZnS)_{80}(SiO_2)_{20}$ film and having a film thickness of approximately 20 nm, and a first reflective layer 5 including a Si film and having a film thickness of 80 nm, and a second reflective layer 6 including a $Al_{97}Ti_3$ film and having a film thickness of 100 nm were formed in order. The first disk member was thus obtained. Formation of these films was conducted by using a sputtering system similar to that described with reference to the first embodiment.

On the other hand, a second disk member having the same configuration as the first disk member was obtained by using completely the same method. The second disk member includes a light incidence side reflective layer 9' containing $Au_{50}Ag_{50}$ and having a film thickness of approximately 10 nm, a protective layer 2' including a $(ZnS)_{80}(SiO_2)_{20}$ film and having a film thickness of approximately 180 nm, a recording film 3' having a composition of $(Cr_4Te_5)_{10}(Ge_2Sb_2Te_5)_{90}$ and having a film thickness of approximately 40 nm, an intermediate layer 4' including a $(ZnS)_{80}(SiO_2)_{20}$ film and having a film thickness of approximately 20 nm, a first reflective layer 5' including a Si film and having a film thickness of 80 nm, and a second reflective layer 6' including a $Al_{97}Ti_3$ film and having a film thickness of 100 nm. These layers are formed in order on a substrate 1' having a diameter of 13 cm and a thickness of 1.2 mm.

Thereafter, the second reflective layers 6 and 6' respectively of the first and second disk members were stuck together by using a vinyl chloride-vinyl acetate hot melt bonding agent layer 7. The disk-shaped information recording medium shown in FIG. 1 was thus obtained.

Furthermore, initialization of the recording film and the subsequent information recording and reproducing method were made identical to those of the first embodiment.

(Relation Between Recording Film Thickness and Reflectance)

Figure 16:
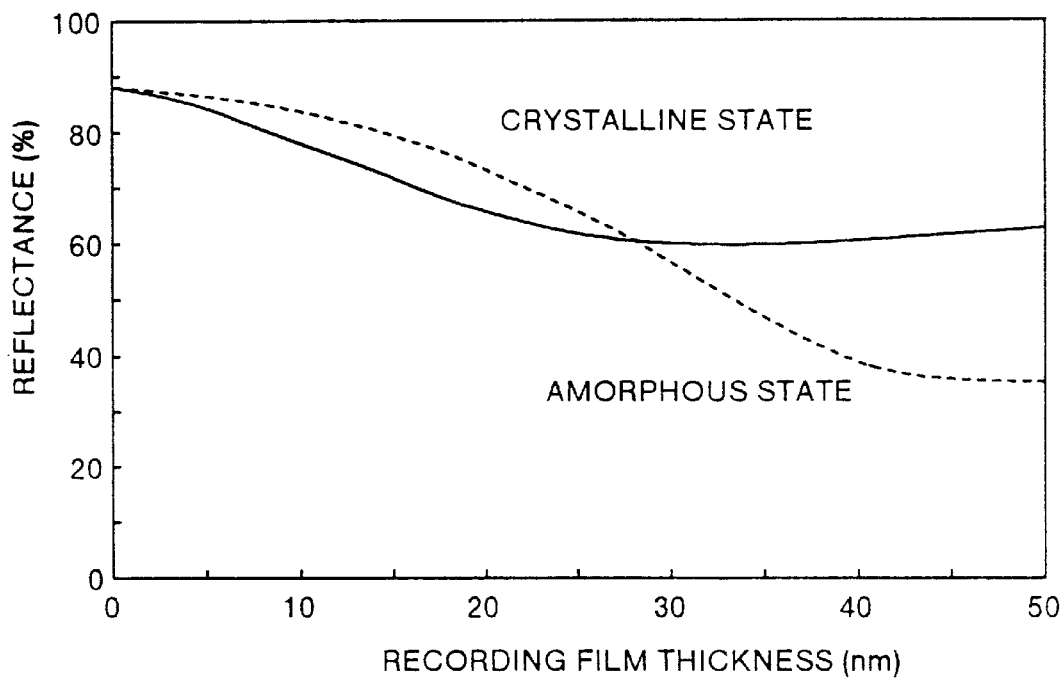
FIG. 16 is a diagram showing the relation between the recording film thickness and the reflectance of an information recording medium of the seventh embodiment including light incidence side reflective layers, first reflective layers containing Si, and second reflective layers containing Al—Ti.
Figure 19:
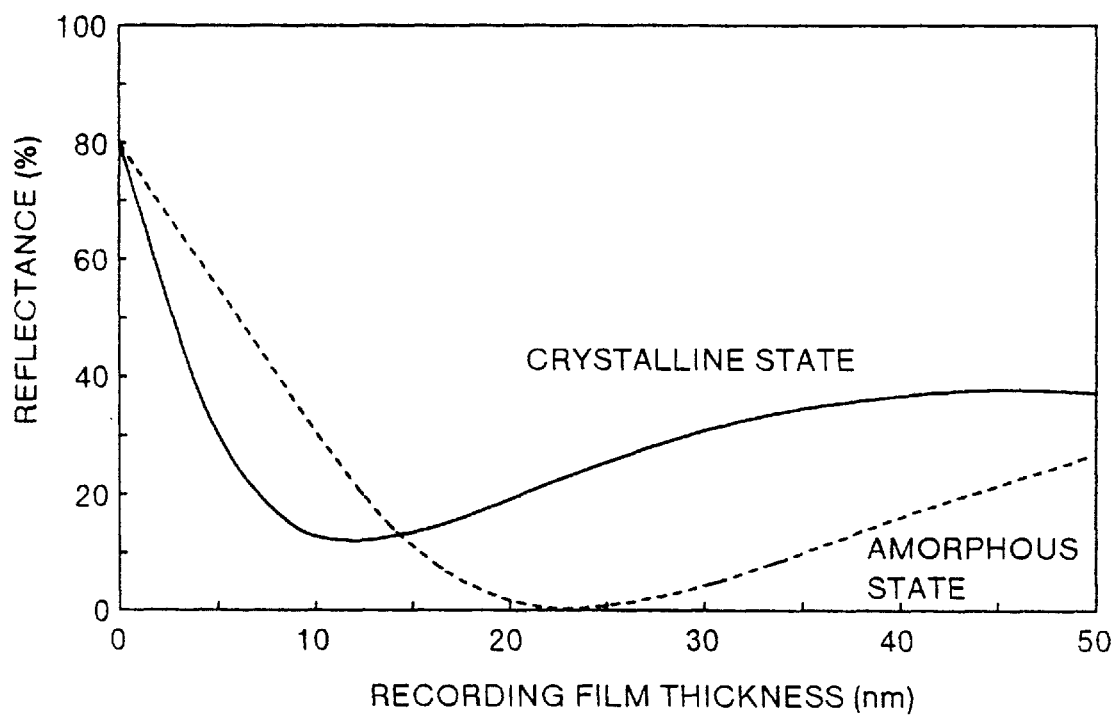
FIG. 19 is a diagram showing the relation between the recording film thickness and the reflectance of the conventional disk of the tenth embodiment.

FIG. 16 shows the relation between the recording film thickness and reflectance of a disk according to the present invention including light incidence side reflective layers of Au—Ag, reflective layers of Si, and reflective layers of Al—Ti. For the purpose of comparison, FIGS. 18 and 19 show a conventional disk structure, and the relation between the recording film thickness and reflectance in the case of the conventional disk structure, respectively. In the above described disk including the Si/Al—Ti reflective layers, variation of the reflectance level in the crystalline state is as very small as 5% or less in the wide range of 20 to 50 nm in recording film thickness. Variation of reflectance could be reduced as compared with a disk of the conventional structure by determining the recording film thickness in this range, even when recording and erasing operation was repeated at least $10^5$ times under the severe condition that the power of laser light was raised by 15% as compared with the optimum value. It can be considered that variation of the reflectance level was reduced even if a change of film thickness was caused more or less by rewriting a large number of times.
(Relation Between First Reflective Layer Thickness and Reflectance)

When the first reflective layer (Si) film thickness was varied, the range of the recording film thickness for which variation of reflectance level of the crystalline state was 10% or less and the range of the recording film thickness for which the difference in reflectance between the crystalline state and the amorphous state was at least 10% varied as follows:

| Si reflective layer thickness (nm) | Recording film thickness (nm) for which variation of reflectance level is 10% or less | Recording film thickness (nm) for which reflectance difference is at least 10% |
| --- | --- | --- |
| 55 | 20 to 30 | none |
| 70 | at least 25 | at least 40 |
| 80 | at least 20 | at least 35 |
| 90 | 20 to 45 | 30 to 65, at least 85 |
| 100 | at least 25 | 25 to 55, at least 85 |
| 120 | at least 30 | 15 to 45, at least 80 |
| 140 | at least 30 | none |

Thereby, it was found that the first reflective layer (Si) film thickness ranging from 70 to 120 nm yielded small variation of reflectance level and great reflectance difference with respect to the recording film thickness. In the range for which the reflectance difference between the crystalline state and the amorphous state was at least 10%, the absorptance difference between the crystalline state and the amorphous state approached 0% when the Si film thickness was close to 80 nm. Especially in the range of ±10 nm of this film thickness, variation of the reflectance level caused when rewriting operation was conducted a large number of times was small.

In this way, selection of film thickness and components of the light incidence side reflective layer, the protective layer, the recording film, the first reflective layer, the second reflective layer, and the intermediate layer is not only effective singly, but also dependent totally on the disk characteristics. Therefore, it is most desirable to satisfy respective favorable ranges, and if possible, to satisfy all of the more preferred ranges. Even if all ranges are not satisfied, however, the recording and reproducing characteristics of the disk are kept in a very favorable state so long as all ranges except one or two are satisfied. If at least half of all ranges are satisfied, the recording and reproducing characteristics of the disk are kept in a favorable state.

Matters which are not described with reference to the present embodiment are the same as those of the first to third embodiments and the sixth embodiment. For example, the initialization, recording and reproducing method, protective layer, intermediate layer, substrate material, and the first reflective layer are identical to those of the first embodiment. The second reflective layer material is identical to that of the second embodiment. The recording film material is identical to that of the third embodiment. The light incidence side reflective layer material is identical to that of the sixth embodiment.

Eighth Embodiment
(Configuration and Fabrication Method)

An information recording medium was fabricated in the same way as the seventh embodiment of FIG. 15 except that the material of the light incidence side reflective layers 9 and 9' was replaced by Si.

The disk member includes light incidence side reflective layers 9 and 9' each containing Si and having a film thickness of approximately 50 nm, protective layers 2 and 2' each including a $(ZnS)_{80}(SiO_2)_{20}$ film and having a film thickness of approximately 235 nm, recording films 3 and 3' each having a composition of $(Cr_4Te_5)_{15}(Ge_2Sb_2Te_5)_{85}$ and having a film thickness of approximately 35 nm, intermediate layers 4 and 4' each including a $(ZnS)_{80}(SiO_2)_{20}$ film and having a film thickness of approximately 50 nm, first reflective layers 5 and 5' each including a Si film and having a film thickness of 80 nm, and second reflective layers 6 and 6' each including a $Al_{97}Ti_3$ film and having a film thickness of 100 nm. These layers of this disk member are respectively formed in order on polycarbonate substrates 1 and 1' each having a diameter of 13 cm and a thickness of 1.2 mm and having the ISO-B format on the surface thereof. A first disk member was thus derived. For forming the layers, a magnetron sputtering system similar to that of the first embodiment was used.

On the other hand, a second disk member having the same configuration as the first disk member was obtained by using completely the same method. Thereafter, the second reflective layers 6 and 6' respectively of the first and second disk members were stuck together by using a vinyl chloride-vinyl acetate hot melt bonding agent layer 7. The disk-shaped information recording medium shown in FIG. 16 was thus obtained.

Furthermore, initialization of the recording film and the subsequent information recording and reproducing method were made identical to those of the first embodiment.
(First Relation Between First Reflective Layer (Si) Thickness and Protective Layer Thickness)

When the first reflective layer (Si) thickness was varied, the film thickness range of the protective layer causing absorptance reversal was examined in the range of 50 to 230 nm. The following results were obtained.

| First reflective layer thickness (nm) | Protective layer thickness (nm) causing absorptance reversal |
| --- | --- |
| 20 | 80 to 180 |
| 40 | 50 to 230 |
| 50 | 50 to 230 |
| 60 | 140 to 210 |
| 80 | 130 to 190 |
| 100 | 125 to 190 |
| 125 | 80 to 180 |
| 145 | 50 to 230 |

Therefrom, it is understood that the range of 120 to 180 nm is more desirable for the first reflective layer thickness. As for the protective layer thickness, the range of 80 to 210 nm is desirable and the range of 140 to 180 nm is more desirable.

In a material having a small value of k, the absorptance A had the same values at fixed periods of the film thickness. In this case, therefore, the protective layer thickness $d_p$ has a period of approximately 180 nm, and the first reflective layer (Si) thickness $d_f$ has a period of approximately 105 nm. Assuming j and u are 0 or positive integers, therefore, the above described ranges are respectively represented as $$d_f = 1 + 105\,u \qquad (17)$$

$$d_p = o + 180\,j \qquad (18)$$

where ranges of l and o are $120 \leq l \leq 180$ and $80 \leq o \leq 210$. A more desirable range of the expression (18) is obtained when $140 \leq 1 \leq 180$. Since the layer thickness period d and the refractive index n are related by $$d=z/n,$$

the expressions (17) and (18) can be rewritten as $$d_f=1+zu/n_f \tag{19}$$

$$d_p=o+zj/n_p \tag{20}$$

where $n_p$ is the refractive index of the protective layer, $n_f$ is the refractive index of the first reflective layer, and the range of z is $380 \leq z \leq 400$.

(Second Relation Between First Reflective Layer (Si) Thickness and Protective Layer Thickness)

When the first reflective layer (Si) thikness was varied, the film thickness range of the protective layer for which the reflectance difference became at keast 10% was examined between 50 and 230 nm. The following results were obtained.

| First reflective layer thickness (nm) | Protective layer thickness (nm) for which reflectance difference becomes at least 10% |
|---|---|
| 20 | 10 to 40, 140 to 180 |
| 40 | 170 to 175 |
| 50 | 100 to 165, 175 to 200 |
| 60 | 20 to 130, 170 to 190 |
| 80 | 15 to 110, 160 to 190 |
| 100 | 10 to 70, 140 to 190 |
| 125 | 10 to 40, 140 to 180 |
| 145 | 170 to 175 |

Therefrom, it is understood that the range of 20 to 60 nm is desirable, and the range of 40 to 50 nm is more desirable for the first reflective layer thickness. As for the protective layer thickness, the range of 130 to 170 nm is desirable.

In a material having a small value of k, the absorptance A had the same values at fixed periods of the film thickness. In this case, therefore, the protective layer thickness $d_p$ has a period of approximately 180 nm, and the first reflective layer (Si) thickness $d_f$ has a period of approximately 105 nm. Assuming j and u are 0 or positive integers, therefore, the above described desirable range and more desirable range are respectively represented as $$d_f=p+105\,u \tag{21}$$

$$d_p=q+180\,j \tag{22}$$

where ranges of p and q are $20 \leq p \leq 60$ and $-10 \leq q \leq 130$. A more desirable range of the expression (22) is obtained when $40 \leq p \leq 50$. Since the layer thickness period d and the refractive index n are related by $$d=z/n,$$

the expressions (21) and (22) can be rewritten as $$d_f=p+zu/n_f \tag{23}$$

$$d_p=q+zj/n_p \tag{24}$$

where $n_p$ is the refractive index of the protective layer, $n_f$ is the refractive index of the first reflective layer, and the range of z is $380 \leq z \leq 400$.

(Reflectance of Crystalline State and Amorphous State)

A disk having the information recording medium of the fifth embodiment with the recording films 3 and 3' were changed to approximately 22 nm and the first reflective layers 5 and 5' were changed to 100 nm was fabricated. Reflectance $R_c$ in the crystalline state and reflectance $R_a$ in the amorphous state of the disk were examined and the following results were obtained.

$$R_c=60\ (\%)$$

$$R_a=23\ (\%)$$

Therefrom, it is appreciated that the degree of modulation $M=(R_c-R_a)/R_c$ (where $R_c \geq R_a$) is 61%. A disk having a reflectance value and a degree of modulation which are as high as at least 60%, respectively, was thus obtained.

(First Relation Between First Reflective Layer (Si) Thickness and Light Incidece Side Reflective Layer Thickness)

When the light incidence side reflective layer thickness was varied, the film thickness range of the first reflective layer (Si) causing absorptance reversal was examined in the range of 10 to 160 nm. The following results were obtained.

| Light incidence side reflective layer thickness (nm) | First reflective layer (nm) causing absorptance reversal |
|---|---|
| 20 | 55 to 70, 160 |
| 40 | 10 to 125 |
| 60 | 10 to 125 |
| 80 | 35 to 80, 140 to 160 |
| 100 | 35 to 70, 140 to 160 |
| 120 | 15 to 70, 120 to 160 |

Therefrom, it is understood that the range of 15 to 80 nm is desirable and the range of 55 to 70 nm is more desirable for the first reflective layer thickness. As for the light incidence side reflective layer thickness, the range of 40 to 120 nm is desirable and the range of 40 to 60 nm is more desirable.

In a material having a small value of k, the absorptance A had the same values at fixed periods of the film thickness. In this case, therefore, the light incidence side reflective layer thickness $d_a$ and the first reflective layer (Si) thickness $d_f$ have a period of approximately 105 nm. Assuming j and u are 0 or positive integers, therefore, the above described desirable ranges are respectively represented as $$d_f=r+105\,u \tag{25}$$

$$d_a=s+105\,j \tag{26}$$

where ranges of r and s are $15 \leq r \leq 80$ and $40 \leq s \leq 120$. More desirable ranges of the expressions (25) and (26) are obtained when the ranges of r and s are $55 \leq r \leq 70$ and $40 \leq s \leq 60$.

Since the layer thickness period d and the refractive index n are related by $$d=z/n,$$

the expressions (25) and (26) can be rewritten as $$d_f=r+zu/n_f \tag{27}$$

$$d_a=s+zj/n_a \tag{28}$$

where the range of z is $380 \leq z \leq 400$, $n_a$ is the refractive index of the light incidence side reflective layer, and $n_f$ is the refractive index of the first reflective layer.

In this way, selection of film thickness and components of the light incidence side reflective layer, the protective layer, the recording film, the first reflective layer, the second reflective layer, and the intermediate layer is not only effective singly, but also dependent totally on the disk characteristics. Therefore, it is most desirable to satisfy respective favorable ranges, and if possible, to satisfy all of the more preferred ranges. Even if all ranges are not satisfied, however, the recording and reproducing characteristics of the disk are kept in a very favorable state so long as all ranges except one or two are satisfied. If at least half of all ranges are satisfied, the recording and reproducing characteristics of the disk are kept in a favorable state.

Matters which are not described with reference to the present embodiment are the same as those of the first to third embodiments and the fifth embodiment. For example, the initialization, recording and reproducing method, protective layer, intermediate layer, substrate material, and the first reflective layer are identical to those of the first embodiment. The second reflective layer material is identical to that of the second embodiment. The recording film material is identical to that of the third embodiment. The light incidence side reflective layer material is identical to that of the fifth embodiment.

Ninth Embodiment (Configuration and Fabrication Method)

FIG. 17 shows a sectional view of a disk-shaped information recording medium using an information recording thin film which in turn uses a superresolution reading mask layer of the present embodiment. This medium was fabricated as described below.

First of all, a polycarbonate substrate 11 having a diameter of 13 cm and a thickness of 1.2 mm and having information recorded on its surface in the form of unevenness was formed. By using a magnetron sputtering system similar to that described with reference to the first embodiment, a protective layer 2 including a $(ZnS)_{80}(SiO_2)_{20}$ film and having a film thickness of approximately 125 nm, a superresolution reading mask layer 10 having a composition of $(Cr_4Te5)_{10}(Ge_2Sb_2Te_5)_{90}$ and having a film thickness of approximately 35 nm, an intermediate layer 4 including a $(ZnS)_{80}(SiO_2)_{20}$ film and having a film thickness of approximately 20 nm, and a first reflective layer 5 including a Si film and having a film thickness of 80 nm, and a second reflective layer 6 including a $Al_{97}Ti_3$ film and having a film thickness of 100 nm were formed in order on the substrate 11. The first disk member was thus obtained.

On the other hand, a second disk member having the same configuration as the first disk member was obtained by using completely the same method. The second disk member includes a protective layer 2' including a $(ZnS)_{80}(SiO_2)_{20}$ film and having a film thickness of approximately 125 nm, a superresolution reading mask layer 10' having a composition of $(Cr_4Te_5)_{10}(Ge_2Sb_2Te_5)_{90}$ and having a film thickness of approximately 35 nm, an intermediate layer 4' including a $(ZnS)_{80}(SiO_2)_{20}$ film and having a film thickness of approximately 20 nm, a first reflective layer 5' including a Si film and having a film thickness of 80 nm, and a second reflective layer 6' including a $Al_{97}Ti_3$ film and having a film thickness of 100 nm. These layers are formed in order on a substrate 11' having a diameter of 13 cm and a thickness of 1.2 mm.

Thereafter, the second reflective layers 6 and 6' respectively of the first and second disk members were stuck together by using a vinyl chloride-vinyl acetate hot melt bonding agent layer 7. The disk-shaped information recording medium shown in FIG. 17 was thus obtained.

(Initial Crystallization)

The superresolution reading mask layer 10 of the medium fabricated as described above was subjected to initial crystallization as described below. In the following explanation, only the mask layer 10 for superresolution reading will be described because completely the same holds true for the superresolution reading mask layer 10'.

The medium was rotated at 1800 rpm. Laser light power of a semiconductor laser (having a wavelength of 780 nm) was kept at a level (approximately 1 mW) preventing recording operation. The laser light was condensed by a lens having a numerical aperture (NA) of 0.55 included in a recording head and applied to the superresolution reading mask layer 10 via the substrate 1. Reflected light from the superresolution reading mask layer 10 was detected and tracking was conducted so as to make always the center of the laser light spot coincident with the center of the tracking groove. A recording head was driven while conducting automatic focusing so as to focus the laser light on the superresolution reading mask layer 10.

First of all, continuous laser light having power of 14 mW was applied on the same recording track of the superresolution reading mask layer 10 respectively ten times for initial crystallization. Finally, continuous (DC) laser light having power of 7 mW was applied ten times. Radiation time (light spot passage time) was approximately 0.1 µs each time. By irradiation of laser beams having different power values as described above, initial crystallization can be sufficiently performed.

More preferably, laser light irradiation may be performed by using a semiconductor laser array, by using a plurality of beams obtained by dividing a laser beam from gas laser, or by using an optical beam supplied from a high-output gas laser or a semiconductor laser having an elliptical shape longer in the radial direction of the medium as the spot shape. In this case, it also becomes possible to complete initial crystallization by only rotating the medium a small number of times.

In the case where a plurality of laser light spots are used, disposing those laser light spots while displacing them each other little by little in the radial direction of the medium instead of disposing those laser light spots on the same recording track brings about some effects. For example, a wide area can be initialized by conducting irradiation a single time, and remaining unerased portions caused by incomplete erasing operation (hereafter referred to as erasing residue) can be reduced.

(Superresolution Reading)

Superresolution information reading was then conducted by applying a reading laser beam with power of 14 mW to a recording region of the superresolution reading mask layer 10 thus completed in initial crystallization while performing tracking and automatic focusing in the same way as the foregoing description. When the portion to be subjected to reading was passed through, laser light power was lowered to a low power level (1 mW) of tracking laser light. Reduction of laser beam power was effective in preventing degradation of the superresolution reading mask layer.

In the case of a disk in which the film remained amorphous after superresolution reading operation had been performed, irradiation was conducted with power (7 mW) of crystallization level a single time to perform crystallization. In the case of a disk in which the film remained crystalline after superresolution reading operation had been performed, this crystallization was unnecessary.

This method is effective for not only the recording film of the present invention but also other recording films.

Even when the superresolution reading operation was repeated at least $10^3$ times under the severe condition that the power of laser light was raised by 15% as compared with the optimum value, variation of reflectance could be reduced in the information recording medium of the present embodiment as compared with a disk of the conventional structure. The number of possible superresolution reading operations could be reduced to $10^4$ times.

(Relation Between Superresolution Reading Mask Layer Thickness and Reflectance)

The relation between the film thickness and reflectance of the superresolution reading mask layer of the disk according to the present invention including reflective layers of Si and Al—Ti is similar to FIG. 2. In the above described disk including the Si/Al—Ti reflective layers, variation of the reflectance level in the crystalline state is as small as 5% or less in the wide range, in superresolution reading mask layer thickness, of 20 to 50 nm. Variation of reflectance could be reduced and the reading characteristics were improved as compared with a disk of the conventional structure by determining the superresolution reading mask layer thickness in this range, even when recording and erasing operation was repeated at least $10^4$ times under the severe condition that the power of laser light was raised by 15% as compared with the optimum value. It can be considered that variation of the reflectance level was reduced even if a change of film thickness was caused more or less by conducting the reading operation a large number of times.

(Superresolution Reading Mask Layer Material)

As for the material of the recording films used in the superresolution reading mask layers 10 and 10' in the present embodiment instead of $(Cr_4Te_5)_{10}(Ge_2Sb_2Te_5)_{90}$, a Cr—Ge—Sb—Te material having a different composition ratio, such as $(Cr_4Te_5)_{20}(GeSb_4Te_7)_{80}$, is not readily lowered in possible number of rewriting operations.

Subsequently, similar results were obtained when Ag—Ge—Sb—Te, Co—Ge—Sb—Te and V—Ge—Sb—Te were used. A film obtained by adding a high melting point component is not readily lowered in number of possible reading operations.

Furthermore, even if at least one of $Ge_2Sb_2Te_5$, $GeSb_2Te_4$, $GeSb_4Te_2$, $In_3SbTe_2$, $In_{35}Sb_{32}Te_{33}$, $In_{31}Sb_{26}Te_{43}$, GeTe, Ag—In—Sb—Te, Ni—Ge—Sb—Te, Pt—Ge—Sb—Te, Si—Ge—Sb—Te, Au—Ge—Sb—Te, Cu—Ge—Sb—Te, Mo—Ge—Sb—Te, Mn—Ge—Sb—Te, Fe—Ge—Sb—Te, Ti—Ge—Sb—Te and Bi—Ge—Sb—Te other than the above described materials, and materials having compositions close to those of them is used instead, similar characteristics are obtained. Even if a part of Ge is replaced by In, similar characteristics are obtained.

(Superresolution Reading Disk of Different Structure)

In the peresent embodiment, the disk has the same structure as the first embodiment has except that the substrate 1 shown in FIG. 1 is replaced by the substrate 11 and the recording film 3 is replaced by the superresolution reading film 10. Even if, in the disk of the fourth embodiment shown in FIG. 9, the substrate 1 is replaced by the substrate 11 and the recording film 3 is replaced by the superresolution reading film 10 in the same way, a disk reduced in reflectance level variation caused when the reading operation has been conducted a large number of times is obtained. Even if, in FIG. 12 of the fifth and sixth embodiments, the substrate 1 is replaced by the substrate 11 and the recording film 3 is replaced by the superresolution reading film 10, or even if, in FIG. 15 of the seventh and eighth embodiments, the substrate 1 is replaced by the substrate 11 and the recording film 3 is replaced by the superresolution reading film 10, a superresolution reading disk having better reading characteristics than the conventional disk is obtained.

In the peresent embodiment, two disk members are fabricated by using completely the same method and the reflective layers 5 and 5' respectively of the first and second disk members are stuck together via the bonding agent layer. Instead of the second disk member, however, a disk member having a different configuration or a protective substrate may also be used. A recording and reproducing disk other than the superresolution disk may also be used. Furthermore, if, in FIG. 17, the substrate 11 is replaced by the substrate 1 of the first embodiment, and the superresolution reading mask layer is replaced by three layers, i.e., a superresolution reading mask layer, an intermediate layer and a recording film, or a recording film, an intermediate layer and a superresolution reading mask layer, then an information recording medium capable of reading and recording information with a superresolution is obtained.

Furthermore, selection of film thickness and components of the protective layer, the recording film, the first reflective layer, the second reflective layer, and the intermediate layer is not only effective singly, but also dependent totally on the disk characteristics. Therefore, it is most desirable to satisfy respective favorable ranges, and if possible, to satisfy all of the more preferred ranges. Even if all ranges are not satisfied, however, the recording and reproducing characteristics of the disk are kept in a very favorable state so long as all ranges except one or two are satisfied. If at least half of all ranges are satisfied, the recording and reproducing characteristics of the disk are kept in a favorable state.

The same holds true for the disk members which will be described with reference to eleventh, twelfth, fourteenth and fifteenth embodiments.

Matters which are not described with reference to the present embodiment are the same as those of the first to eighth embodiments.

Tenth Embodiment (Configuration and Fabrication Method)

As an example for comparison, FIG. 18 shows a sectional view of a disk-shaped information recording medium having a conventional structure. This medium was fabricated as described below.

First of all, a polycarbonate substrate 1 having a diameter of 13 cm and a thickness of 1.2 mm and having the ISO-B format corresponding to the sample servo scheme of 5.25 inch optical disk on its surface was formed. Formation of thin films on this substrate 1 was; conducted by using the same magnetron sputtering system described with reference to the first embodiment. On the substrate 1, a protective layer 2 including a $(ZnS)_{80}(SiO_2)_{20}$ film and having a film thickness of approximately 125 nm, a recording film 3 having a composition of $(Cr_4Te_5)_{10}(Ge_2Sb_2Te_5)_{90}$ and having a film thichness of approximately 30 nm, an intermediate layer 4 including a $(ZnS)_{80}(SiO_2)_{20}$ film and having a film thickness of approximately 20 nm, and a reflective layer 8 including a $Al_{97}Ti_3$ film and having a film thickness of 100 nm were formed in order by the magnetron sputtering system. The first disk member was thus obtained.

On the other hand, a second disk member having the same configuration as the first disk member was obtained by using completely the same method. The second disk member includes a protective layer 2' including a $(ZnS)_{80}(SiO_2)_{20}$ film and having a film thickness of approximately 125 nm, a recording film 3' having a composition of $(Cr_4Te_5)_{10}(Ge_2Sb_2Te_5)_{90}$ and having a film thickness of approximately 30 nm, an intermediate layer 4' including a $(ZnS)_{80}(SiO_2)_{20}$ film and having a film thickness of approximately 20 nm, and a reflective layer 8' including a $Al_{97}Ti_3$ film and having a film thickness of 100 nm. These layers are formed in order on a substrate 1' having a diameter of 13 cm and a thickness of 1.2 mm.

Thereafter, the reflective layers 8 and 8' respectively of the first and second disk members were stuck together by using a vinyl chloride-vinyl acetate hot melt bonding agent layer 7. The disk-shaped information recording medium shown in FIG. 18 was thus obtained.

(Reflectance and Absorptance)

The reflectance and absorptance in the crystalline state and the amorphous state of the disk for comparison were examined. The following results were obtained.

Reflectance in the crystalline state: $R_c=31\%$
Reflectance in the amorphous state: $R_a=4\%$
Absorptance in the crystalline state: $A_c=66\%$
Absorptance in the amorphous state: $A_a=87\%$ Initialization and the recording and reproducing method which were not described with reference to the present embodiment are identical to those of the first embodiment.

Eleventh Embodiment (Configuration and Fabrication Method)

Figure 20:
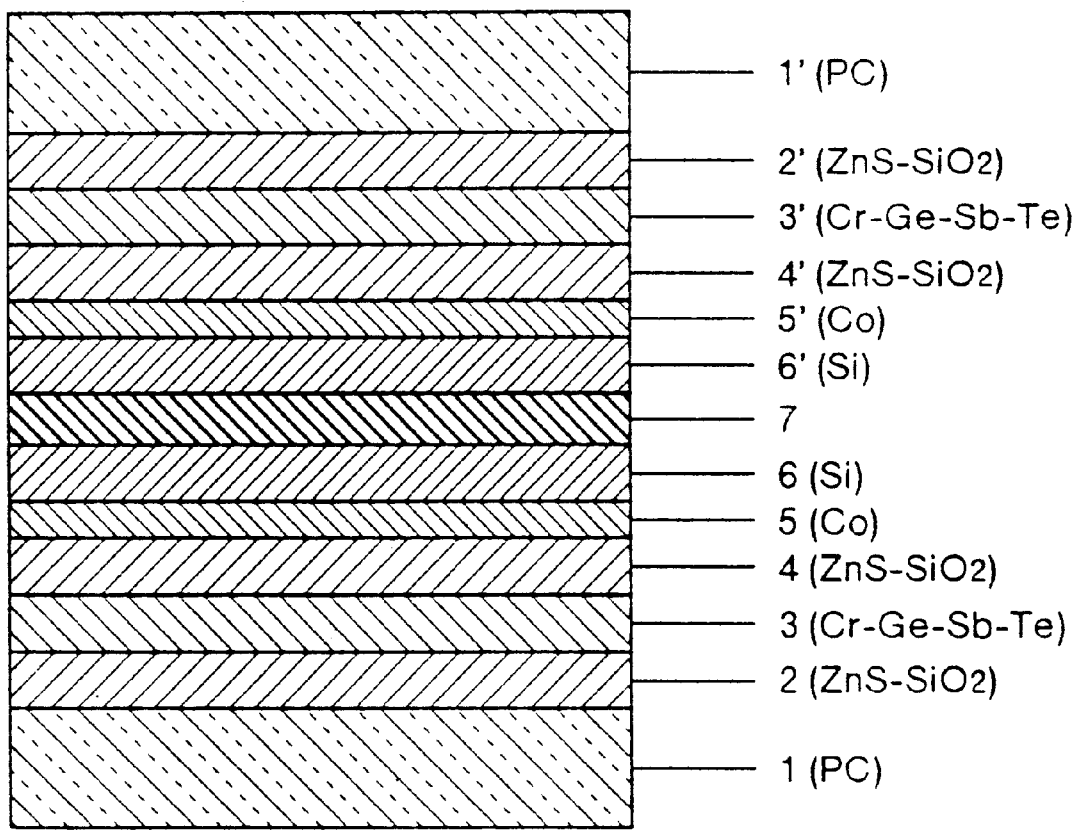
FIG. 20 is a sectional view of an information recording medium of an eleventh embodiment.

FIG. 20 shows a sectional view of a disk-shaped information recording medium using an information recording thin film of an eleventh embodiment according to the present invention. This medium was fabricated as described below.

First of all, on a polycarbonate substrate 1 having a diameter of 13 cm and a thickness of 1.2 mm and having an ISO-B format on its surface, a protective layer 2 including a $(ZnS)_{80}(SiO_2)_{20}$ film and having a film thickness of approximately 125 nm, a recording film 3 having a composition of $(Cr_4Te_5)_{10}(Ge_{21}Sb_{25}Te_{54})_{90}$ and having a film thickness of approximately 25 nm, an intermediate layer 4 including a $(ZnS)_{80}(SiO_2)_{20}$ film and having a film thickness of approximately 20 nm, and a first reflective layer 5 including a Co film and having a film thickness of 15 nm, and a second reflective layer 6 including a Si film and having a film thickness of 120 nm were formed in order. The first disk member was thus obtained. Formation of these films was conducted by using a magnetron sputtering system similar to that described with reference to the first embodiment.

On the other hand, a second disk member having the same configuration as the first disk member was obtained by using completely the same method. The second disk member includes a protective layer 2' including a $(ZnS)_{80}(SiO_2)_{20}$ film and having a film thickness of approximately 125 nm, a recording film 3' having a composition of $(Cr_4Te_5)_{10}(Ge_{21}Sb_{25}Te_{54})_{90}$ and having a film thickness of approximately 25 nm, an intermediate layer 4' including a $(ZnS)_{80}(SiO_2)_{20}$ film and having a film thickness of approximately 20 nm, a first reflective layer 5' including a Co film and having a film thickness of 15 nm, and a second reflective layer 6' including a Si film and having a film thickness of 120 nm. These layers are formed in order on a substrate 1' having a diameter of 13 cm and a thickness of 1.2 mm.

Thereafter, the second reflective layers 6 and 6' respectively of the first and second disk members were stuck together by using a vinyl chloride-vinyl acetate hot melt bonding agent layer 7. The disk-shaped information recording medium shown in FIG. 20 was thus obtained.

Furthermore, initialization of the recording film and the subsequent information recording and reproducing method were made identical to those of the first embodiment.

(Relation Between Recording Film Thickness and Reflectance)

Figure 21:
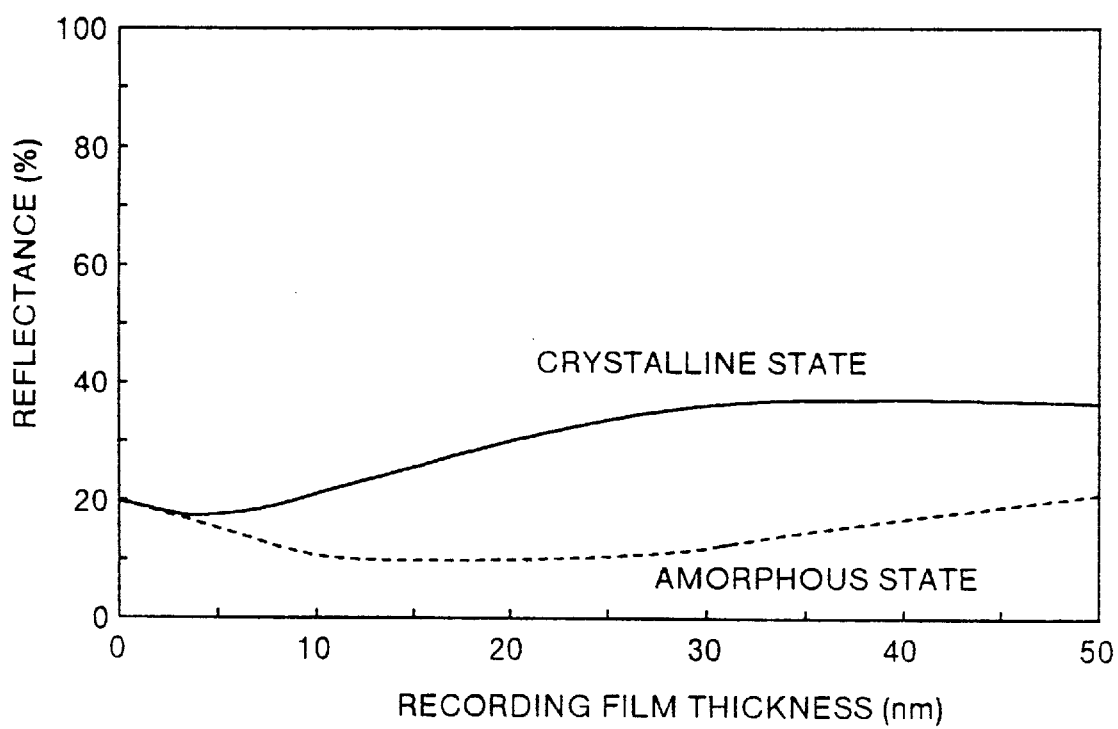
FIG. 21 is a diagram showing the relation between the recording film thickness and the reflectance of an information recording medium of the eleventh embodiment including first reflective layers containing Co and second reflective layers containing Si.
Figure 22:
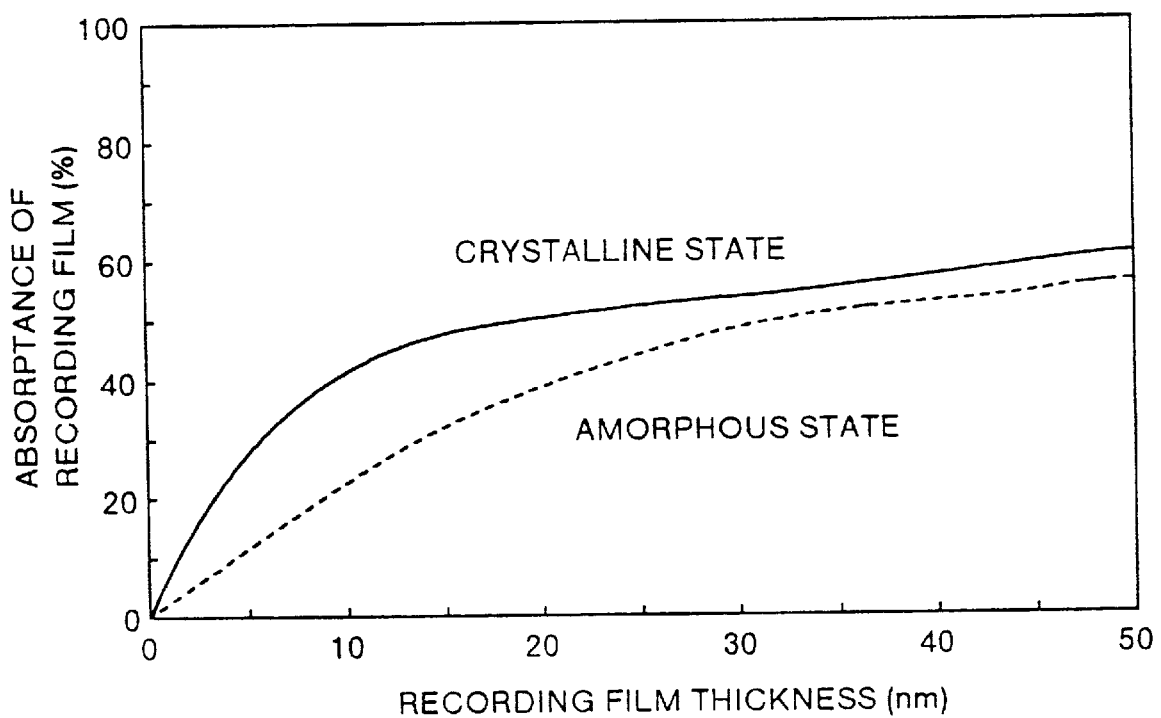
FIG. 22 is a diagram showing the relation between the recording film thickness and the recording film absorptance of an information recording medium of the eleventh embodiment including first reflective layers containing Co and second reflective layers containing Si.

FIG. 21 shows the relation between the recording film thickness and reflectance of a disk according to the present invention including reflective layers of Co and reflective layers of Si. In the disk including the Co/Si reflective layers, variation of the reflectance level in the crystalline state is small in the wide range, in recording film thickness, of at least 20 nm. Variation of the reflectance level in the amorphous state is also small in the range of at least 10 nm.

(First Reflective Layer Material other than Co)

Instead of Co used in each of the first reflective layers 5 and 5' in the present embodiment, a layer including a single element of Au, Ag, Cu, Al, Ni, Fe, Cr, Ti, Pd, Pt, W, Ta, Mo, Sb, Bi, Dy, Cd, Mn, Mg or V, an alloy containing them as its main component such as a Au alloy, Ag alloy, Cu alloy, Al alloy, Pd alloy, Pt alloy, Ni alloy, Mn alloy or a Sb—Bi compound, or an alloy between them may also be used. A multi-layer containing these layers may also be used. A composite layer containing them and another material such as an oxide may also be used. So long as the refractive index or attenuation factor is different from that of the second reflective layers, a layer including an alloy containing Si, Ge, Sn or In as its main component or a layer including an alloy between them and the above described elements may be used. A multi-layer containing these layers may also be used. A composite layer containing them and another material such as an oxide may also be used.

Among them, a material having a great thermal conductivity such as Cu, Al, Au, an Cu alloy, Al alloy or Au alloy makes the disk structure a rapid cooling structure and suppresses variation of reflectance caused by conducting the rewriting operation a large number of times. Furthermore, a material having a small thermal conductivity such as Sb—Bi or Dy facilitates thermal insulation and consequently has an advantage of improved recording sensitivity.

Furthermore, as compared with a simple substance of Au, a AU alloy such as Au—Ag, Au—Co or Au—Al has an advantage of increased adhesive strength and is favorable.

The relation among the first reflective layer thickness, refractive index and attenuation factor was examined. In the case where the attenuation factor was at least 2.5, the absorptance of the recording film in the crystalline state became larger than that in the amorphous state in the following range.

| Material | Refractive index | Absorptance | First reflective layer thickness (nm) |
|---|---|---|---|
| Al | 1.55 | 6.3 | 0 to 4 |
| Au | 0.15 | 4.74 | 0 to 6 |
| Co | 3.1 | 4.53 | 0 to 15 |
| W | 3.54 | 2.76 | 0 to 28 |
| Ta | 1.34 | 3.64 | 0 to 13 |

Denoting the refractive index by $n_f$, absorptance by $k_f$, and the first reflective layer thickness by $d_f$, it was found that a film thickness satisfying the relation $$0 \leq d_f \leq 30/(k_f - n_f/2 - 1) + 5$$

was more desirable because absorptance control became possible. In the case of Mo, W, Ti and Fe, the range of selectable film thickness is wide. Secondly, Co, Sb, Ni and Ta have a wide film thickness range.

It is desirable that the material of the first reflective layer used instead of Co occupies at least 80% of all atoms of the first reflective layer. When impurities other than the above described materials reached 20 at % or more, degradation of rewriting characteristics was observed.

(Second Reflective Layer Material other than Si)

When a Si—Ge mixed material was used as the material of the second reflective layer instead of Si used in the second reflective layer 6 of the present embodiment, the light absorptance of the recording mark portion can be made less than the light absorptance of portions other than the recording mark. Therefore, erasing residue caused by light absorptance difference can be prevented, and the number of possible rewriting operations is not reduced. As for the Ge content, the number of possible rewriting operations does not readily reduce when the Ge content is in the range of 10 to 80 atomic %.

Furthermore, if Au, Ag, Cu, Al, Ni, Fe, Co, Cr, Ti, Pd, Pt, W, Ta, MO, Sb, Bi, Dy, Cd, Mn, Mg, V, Zn, Ga, Tl, Pb, C, B or S is added to Si, the transmittance of the reflective layer is decreased and the absorptance of the reflective layer is increased, the sensitivity lowering being thus prevented. As for the additive element content in this case, the reflectance level variation which might be caused when rewriting operation has been conducted a large number of times does not readily occur if the additive element content is in the range of 1 to 25 at %.

Subsequently, when a Si—N, Si—Sn or Si—In mixed material, or a mixed material including two kinds among these mixed materials was used, a similar result was obtained. These reflective layer materials do not lower the number of possible rewriting operations as compared with conventional reflective layer materials, not only when they are used as reflective layer materials in the case where the phase change film of the present invention is employed but also when they are used as reflective layer materials in the case where another phase change film is employed. As for the content of the element added to Si, the number of possible rewriting operations does not readily reduce when the content of the element added to Si is in the range of 3 to 50 atomic %.

Furthermore, a layer including a mixed material containing Si or Ge other than the above described materials may also be used. A layer including a material having a large refractive index and a small attenuation factor may also be used. A multi-layer including these phases may also be used. A composite layer including another material such as these oxides may also be used. Ge may also be used. Besides, various nitrides, sulfides, and selenides may also be used.

It is desirable that the material of the second reflective layer used instead of Si occupies at least 90% of all atoms of the second reflective layer. When impurities other than the above described materials reached 10 atomic % or more, degradation of rewriting characteristics was observed.

For controlling the absorptance, it was found that the refractive index n and the attenuation factor k of the reflective layer material had to be:

preferably $n \geq 2$ more preferably $n \geq 2$ and $2 \geq k$.

Furthermore, a multi-layer including those layers may also be used. A composite layer including them and another material, such as an oxide like $SiO_2$ may also be used. In this case, it is more desirable that the first reflective layer includes a material having an attenuation factor k of at least 2.5 and the second reflective layer includes a material having an attenuation factor k of 2 or less.

On the other hand, in the case where the first reflective layer is 50 nm or less in thickness, a layer including a material other than the above described material, such as a single element of Au, Ag, Cu, Al, Ni, Fe, Cr, Ti, Pd, Pt, W, Ta, Mo, Sb, Bi, Dy, Cd, Mn, Mg or V, an alloy containing them as its main component such as a Au alloy, Ag alloy, Cu alloy, Al alloy, Pd alloy or Pt alloy, or an alloy between them may also be used. If the total film thickness of the first reflective layer and the second reflective layer is at least 50 nm, the strength is great and consequently degradation of the recording characteristics in rewriting operation is not readily caused. A total film thickness of at least 100 nm is more desirable.

(Combination of First Reflective Layer Material and Second Reflective Layer Material)

As for the first reflective layer material and the second reflective layer material, materials described with reference to the present embodiment can be used. It was found that effecting selection out of combinations of them resulted in improved rewriting characteristics. As for a preferred combination, the second reflective layer should contain at least one out of Si, Ge, Si—Ge, Si—N, Si—O and Si—Au mixed materials, or it should have a composition close thereto, and the first reflective layer should contain at least one out of Co, a Co alloy, Al, a Al alloy, Au, a Au alloy, Ag, a Ag alloy, Cu, a Cu alloy, Pt and a Pt alloy, or it should have a composition close thereto.

Comparing the case of the component materials of the first reflective layer and the second reflective layer in the present embodiment with the case of the component materials of the first reflective layer and the second reflective layer in the first embodiment, the recording film is located near the reflective layer having a high thermal conductivity and rapid cooling is effected after irradiation of laser light in the case of the present embodiment. Therefore, the present embodiment is desirable in that a recording mark having an accurate shape is formed. On the other hand, however, heat generated by absorption of light in the first reflective layer is returned to the recording film by thermal conduction. It weakens the effect of preventing the temperature from excessively rising, which is obtained by making the first reflective layer thin to trasnsmit light and making the light absorptance of the recording mark portion in the amorphous state having a low reflectance value lower than the light absorptance of the amorphous state portions surrounding it. In the case where information is rewritten by overwriting, therefore, the phenomenon that the recording mark shape becomes incorrect under the influence of the previous recording state is not readily caused.

(Relation Between Recording Film Component and Reflective Layer Material)

In the case where Co is used as the second reflective layer material, the composition of the phase change component included in the above described recording film components may be the same composition as the first embodiment has, i.e., $(Cr_4Te_5)_{10}(Ge_2Sb_2Te_5)_{90}$. However, if the composition obtained by adding Sb of 3 atomic % to the $Ge_2Sb_2Te_5$ composition, i.e., the composition of $(Cr_4Te_5)_{10}(Ge_{21}Sb_{25}Te_{54})_{90}$ was employed as in the present embodiment, crystallization speed could have an appropriate value and the recording characteristics were further improved.

In the case where a material having a large thermal conductivity value, such as Al, Au, Co or Cu, is used no matter whether the material is used for the first reflective layer or the second reflective layer, the composition of the phase change component could be adjusted in the same way by appropriately increasing the quantity of Sb from the $Ge_2Sb_2Te_5$ composition and making the crystallization speed slower. The quantity of Sb added to the $Ge_2Sb_2Te_5$ composition is approximately between 5 and 10 atomic % in the case of Au and Al, approximately betweeen 3 and 8 atomic % in the case of Cu, and is approximately between 2 and 5 atomic at % in the case of Co, although the ranges vary slightly depending upon other structures.

Matters which are not described with reference to the present embodiment are the same as those of the first embodiment.

Twelfth Embodiment
(Configuration and Fabrication Method)

A medium represented by changing only the reflective layers in the information recording medium of the eleventh embodiment was fabricated. On a polycarbonate substrate 1 having a diameter of 13 cm and a thickness of 1.2 mm and having an ISO-B format on its surface, a protective layer 2 including a $(ZnS)_{80}(SiO_2)_{20}$ film and having a film thickness of approximately 125 nm, a recording film 3 having a composition of $(Cr_4Te_5)_{10}(Ge_{21}Sb_{25}Te_{54})_{90}$ and having a film thickness of approximately 125 nm, an intermediate layer 4 including a $(ZnS)_{80}(SiO_2)_{20}$ film and having a film thickness of approximately 20 nm, and a first reflective layer 5 including a Mo film and having a film thickness of 15 nm, and a second reflective layer 6 including an Al film and having a film thickness of 10 nm were formed in order. The first disk member was thus obtained. Formation of these films was conducted by using a magnetron sputtering system similar to that described with reference to the first embodiment.

On the other hand, a second disk member having the same configuration as the first disk member was obtained by using completely the same method. The second reflective layers 6 and 6' respectively of the first and second disk members were stuck together by using a vinyl chloride-vinyl acetate hot melt bonding agent layer 7. The disk-shaped information recording medium was thus obtained.

Furthermore, initialization of the recording film and the subsequent information recording and reproducing method were made identical to those of the first embodiment.
(Material of First Reflective Layer other than Mo)

Instead of Mo used in the first reflective layers 5 and 5' in the present embodiment, a layer including a single element of Ni, Fe, Cr, Ti, Pd, Pt, W, Ta, Co, Sb, Bi, Dy, Cd, Mn, Mg or V, an alloy containing them as its main component, or an alloy between them may also be used. A multi-layer containing these layers may also be used. A composite layer containing them and another material such as an oxide may also be used. By using a material having an attenuation factor of 4 or less, the absorptance difference could be made small and the erasing residue in the rewriting operation could be reduced in the case where the absorptance in the amorphous state was larger than that in the crystalline state.

Among them, Mo, W, Ta, a Mo alloy, W alloy, and Ta alloy have an advantage of good rewriting characteristics, because they are low in reactivity and there is no fear that they may react with the second reflective layer material and the characteristics may vary.

The relation among the first reflective layer thickness, refractive index and attenuation factor was examined. In the case where the attenuation factor was 4 or less, the absorptance of the recording film in the crystalline state became larger than that in the amorphous state in the following range. Or in the opposite case as well, the difference became small.

| Material | Refractive index | Absorptance | First reflective layer thickness (nm) |
|---|---|---|---|
| Co | 3.1 | 3.9 | 0 to 15 |
| W | 3.54 | 2.76 | 0 to 28 |
| Ta | 1.34 | 3.64 | 0 to 13 |

Therefrom, it was found that setting the film thickness $d_f$ of the first reflective layer to the range of approximately 30 nm or less was desirable because the absorptance control could be conducted. It was found that setting the film thickness $d_f$ of the first reflective layer to the range of approximately 15 nm or less thinner than the above described value could further reduce the erasing residue in the rewriting operation.

At least one selected out of a group of compounds and mixtures including combinations of $Cr_4Te_5$, Cr—Te, Cr—Sb, Cr—Ge, Co—Sb, Co—Te, Co—Ge, Cu—Te, Cu—Sb, Mn—Te, Mn—Sb, V—Ge, Ni—Ge, Mo—Ge, W—Te, Ag—Te and Ag—Sb—Te may also be employed. Or a material having a composition close thereto may also be employed. These materials have an advantage of favorable rewriting characteristics because these materials have high melting points and there is no fear that these materials may react with the second reflective layer material and the characteristics may vary.
(Second Reflective Layer Material other than Al)

As for the material of the second reflective layer which can be used instead of Al used in the second reflective layer 6 of the present embodiment, a material having a great thermal conductivity, such as Cu, Al, Au, a Cu alloy, Al alloy or Au alloy, is desirable because it makes the disk structure a rapid cooling structure and suppresses variation of reflectance caused by conducting the rewriting operation a large number of times. As for the thermal conductivity in this case, at least 100 W/m·k is desirable because the number of times of rewriting operation is increased and at least 230 W/m·k is more desirable because the number of times of rewriting operation is doubled. Furthermore, as compared with a simple substance of Au, a Au alloy such as Au—Ag, Au—Co or Au—Al has an advantage of large adhesive strength and is favorable.

Besides, so long as a material has an attenuation factor larger than that of the second reflective layer, a layer including a single element of Ag, Ni, Fe, Cr, Ti, Pd, Pt, W, Ta, Mo, Sb, Bi, Dy, Cd, Mn, Mg or V, an alloy containing them as its main component such as a Ag alloy, Cu alloy, Al alloy, Pd alloy, Pt alloy, Ni alloy, Mn alloy, or a Sb—Bi compound, or an alloy between them may also be used. A multi-layer containing these layers may also be used. A composite layer containing them and another material such as an oxide may also be used. A layer including an alloy containing Si, Ge, Sn or In as its main component, or an alloy between them and the above described elements may also be used. A multi-layer including these layers may also be used. A composite layer including them and another material such as an oxide may also be used.
(Combination of First Reflective Layer Material and Second Reflective Layer Material)

As for the first reflective layer material and the second reflective layer material, materials described with reference to the present embodiment can be used. It was found that effecting selection out of combinations of them resulted in improved rewriting characteristics. As for a preferred combination, the second reflective layer should contain at least one out of W, Mo, Ta, a W alloy, Mo alloy and Ta alloy, or it should have a composition close thereto, and the first reflective layer should contain at least one out of Al, an Al alloy, Au, a Au alloy, Ag and a Ag alloy, or it should have a composition close thereto.
(Relation Between Recording Film Component and Reflective Layer Material)

In the case where Mo is used as the first reflective layer material, the composition of the phase change component included in the above described recording film components may be the same composition as the first embodiment has, i.e., $(Cr_4Te_5)_{10}(Ge_2Sb_2Te_5)_{90}$. However, if the composition obtained by further adding Sb of 3 atomic % to the Ge$_2$Sb$_2$Te$_5$ composition, i.e., the composition of (Cr$_4$Te$_5$)$_{10}$ (Ge$_{21}$Sb$_{25}$Te$_{54}$)$_{90}$ was employed as in the present embodiment, crystallization speed could have an appropriate value and the recording characteristics were further improved.

In the case where a material having a large thermal conductivity value, such as Al, Au, Co or Cu, is used no matter whether the material is used for the first reflective layer or the second reflective layer, the composition of the phase change component could be adjusted in the same way by appropriately increasing the quantity of Sb from the Ge$_2$Sb$_2$Te$_5$ composition and making the crystallization speed slower. The quantity of Sb added to the Ge$_2$Sb$_2$Te$_5$ composition is approximately between 5 and 10 atomic % in the case of Au and Al, approximately betweeen 3 and 8 atomic % in the case of Cu, and is approximately between 2 and 5 atomic % in the case of Mo and W, although the ranges vary slightly depending upon other structures.

Matters which are not described with reference to the present embodiment are the same as those of the first embodiment.

Thirteenth Embodiment

Figure 23:
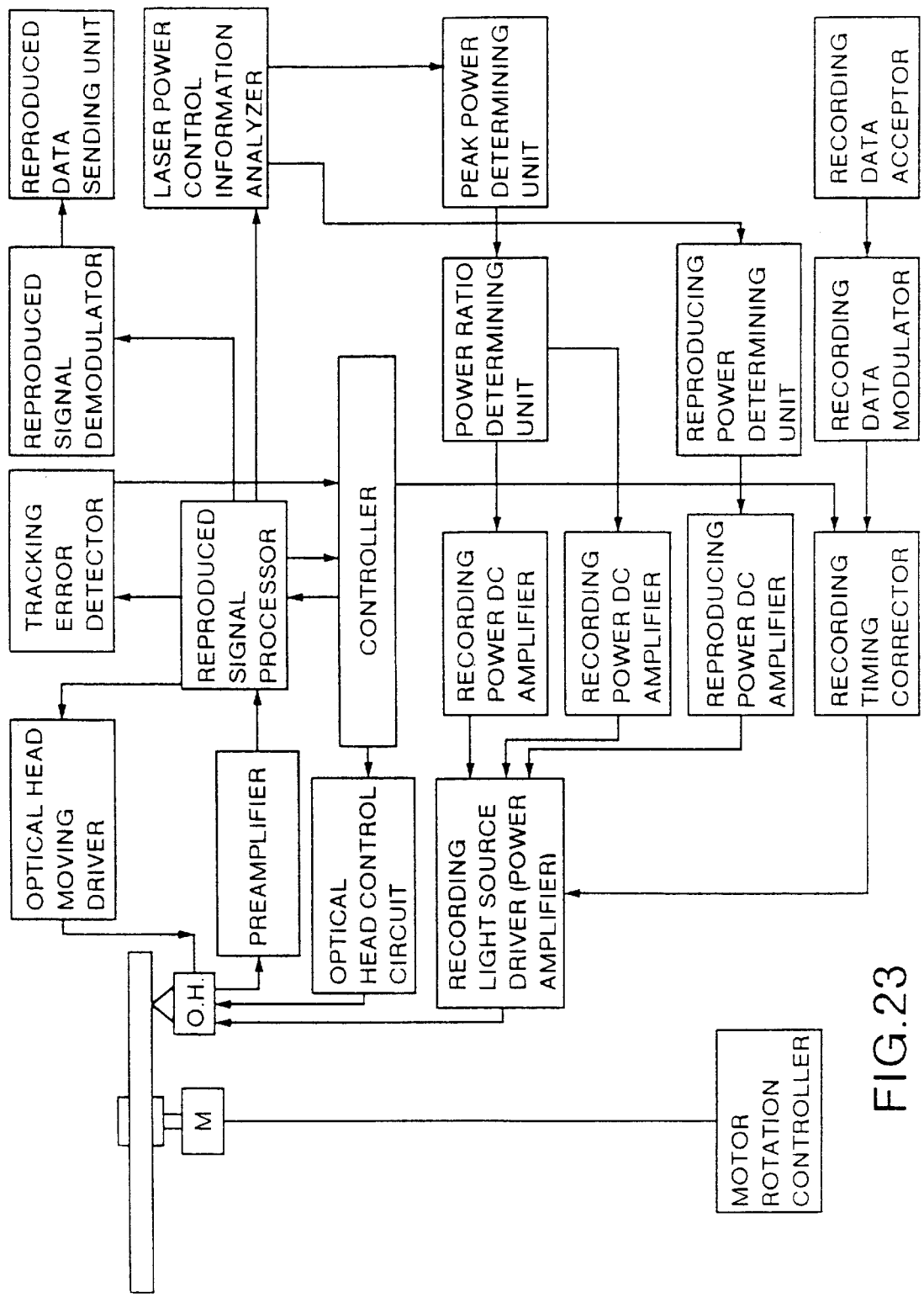
FIG. 23 is a block diagram of an information memory apparatus which is a thirteenth embodiment of the present invention.

FIG. 23 shows a block diagram of an optical memory apparatus. For the recording and reproducing operation, a disk is rotated while a motor denoted by M in FIG. 23 is being controlled by a motor rotation controller.

The disk has, as the recording layer or superresolution reading mask layer, an information recording thin film for recording and/or reproducing information in the form of an atom configuration change caused by irradiation of an energy beam. The information recording thin film is formed on the substrate directly or via a foundation layer. The disk has a reflective layer. A recording light source having a wavelength is provided. For that wavelength, the absorptance obtained when the recording layer or the mask layer of the medium is in the crystalline state is greater than or equal to the absorptance obtained when it is in the amorphous state.

Movement to a recording/reproducing position on the disk is conducted as described below. An instruction issued by the controller is received, and movement to the vicinity of a desired track is conducted by a pickup moving driver. An optical head denoted by O.H. in FIG. 23 includes a laser and an optical system. The laser has such a wavelength that the absorptance obtained when the recording layer or the mask layer of the medium is in the crystalline state is greater than or equal to the absorptance obtained when it is in the amorphous state. The optical head is divided into a fixed portion and a movable portion. The above described laser may be attached to the fixed portion. Subsequently, tracking and autofocusing are conducted by an optical head control circuit to focus laser light on the disk surface. A signal of returned light reflected by the disk is amplified by a preamplifier and processed by a reproduced signal processor. If there is a deviation from the desired track, a track jump is effected and movement to the desired track is conducted.

Control of laser power in recording (overwriting) and reproducing operation is effected by a laser power control information analyzer, a peak power determining unit, a power ration determining unit, and a reproducing power determining unit. Laser power determined by them is irradiated on the disk via each DC amplifier and laser driver. Control of recording timing is effected by a recording timing corrector via the controller.

Each data is converted to a signal modulated by a determined modulation scheme, by a recording data modulator via a recording data acceptor. In the reading operation, a signal obtained via a reproduced signal processor is demodulated by a reproduced signal demodulator and sent out by a reproduced data sending unit.

When the above described disk was used as any one of information recording media described with reference to the first to twelfth embodiments and the fourteenth to fifteenth embodiments, favorable results were obtained.

As heretofore described, by using the information recording medium of the present invention, it becomes possible to conduct the rewriting operation a larger number of times as compared with the conventional disk while maintaining favorable recording/reproducing characteristics or favorable superresolution reading characteristics.

By using the information recording/reproducing apparatus, favorable recording/reproducing characteristics or favorable superresolution reading characteristics can be obtained even after the rewriting operation has been conducted on the information recording medium of the present invention a larger number of times as compared with the conventional disk.

Fourteenth Embodiment
(Configuration and Fabrication Method)

An information recording medium represented by replacing respective layers and the substrate of the information recording medium described with reference to the first embodiment was fabricated as described below.

First of all, a polycarbonate substrate 1 having a diameter of 12 cm and a thickness of 0.6 mm was formed. The polycarbonate substrate 1 had a continuous groove on the surface thereof. By using the magnetron sputtering system similar to that of the first embodiment, a protective layer 2 including a (ZnS)$_{80}$(SiO$_2$)$_{20}$ film and having a film thickness of approximately 80 nm, a recording film 3 having a composition of (AgSbTe$_2$)$_{10}$(Ge$_2$Sb$_2$Te$_5$)$_{90}$ and having a film thickness of approximately 25 nm, an intermediate layer 4 including a (ZnS)$_{80}$(SiO$_2$)$_{20}$ film and having a layer thickness of approximately 20 nm, a first reflective layer 5 indluding Si film and having a layer thickness of 60 nm, and a second reflective layer 6 including a Al$_{97}$Ti$_3$ film and having a layer thickness of 100 nm were formed in order on the substrate 1. A first disk member was thus obtained.

On the other hand, a second disk member having the same configuration as that of the first disk member was obtained by using the completely same method. The second disk member has a protective layer 2' containing a (ZnS)$_{80}$(SiO$_2$)$_{20}$ film and having a layer thickness of approximately 60 nm, a recording film 3' having a composition of (AgSbTe$_2$)$_{10}$(Ge$_2$Sb$_2$Te$_5$)$_{90}$ and having a film thickness of approximately 25 nm, an intermediate layer 4' including a (ZnS)$_{80}$(SiO$_2$)$_{20}$ film and having a layer thickness of approximately 20 nm, a first reflective layer 5' indluding a Si film and having a layer thickness of 80 nm, and a second reflective layer 6' including a Al$_{97}$Ti$_3$ film and having a layer thickness of 100 nm were formed in order on the substrate 1' having a diameter of 12 cm and a thickness of 0.6 mm.

Thereafter, the second reflective layers 6 and 6' of the first and second disk members were stuck together by using a vinyl chloride-vinyl acetate hot melt bonding agent layer 7. The disk-shaped information recording medium as shown in FIG. 1 was thus obtained.

(Initial Crystallization)

The recording film 3 of the medium fabricated as described above was subjected to initial crystallization as described below. In the following explanation, only the recording film 3 will be described because completely the same holds true for the recording film 3' as well.

The medium was rotated at 6 m/sec. Laser light power of a semiconductor laser (having a wavelength of 680 nm) was kept at a level (approximately 1 mW) preventing recording operation. The laser light was condensed by a lens having a numerical aperture (NA) of 0.55 included in a recording head and applied to the recording film 3 via the substrate 1. Reflected light from the recording film 3 was detected and tracking was conducted so as to make always the center of the laser light spot coincident with the center of the groove for tracking. A recording head was driven while conducting automatic focusing so as to focus the laser light on the recording film 3.

First of all, continuous laser light having power of 10 mW was applied on the same recording track of the recording film 3 respectively twice for initial crystallization. Finally, continuous(DC) laser light having power of 5 mW was applied once. Irradiation time (light spot passage time) was approximately 0.1 $\mu$sec each time. By irradiation of laser beams having different power values as described above, initial crystallization can be sufficiently performed.

More preferably, laser light irradiation may be performed by using a semiconductor laser array, by using a plurality of beams obtained by dividing a laser beam from gas laser, or by using an optical beam supplied from a high-output gas laser or a semiconductor laser having an elliptical shape longer in the radial direction of the medium as the spot shape. In this case, it also becomes possible to complete initial crystallization by only rotating the medium a small number of times.

In the case where a plurality of laser light spots are used, disposing those laser light spots while displacing them each other little by little in the radial direction of the medium instead of disposing those laser light spots on the same recording track brings about some effects. For example, a wide area can be initialized by conducting irradiation a single time, and remaining unerased portions caused by incomplete erasing operation (hereafter referred to as erasing residue) can be reduced. The laser wavelength is not limited to 680 nm, but other wavelengths may also be used.

(Recording and Erasing)

Informtion was then recorded in the recording region of the recording film 3 completed in initial crystallization as heretofore described. At this time, the power of recording laser light was changed between an intermediate power level (5 mW) and a high power level (10 mW) while performing tracking and automatic focusing in the same way as the foregoing description. When the portion to be recorded was passed through, laser light power was lowered to a low power level (1 mW) of reproducing (reading) laser light. An amorphous portion or a nearly amorphous portion formed in the recording region by the recording laser light becomes a recording point.

The power ratio in the recording laser light between the high level and the intermediate level is especially desired to be in the range of 1:0.3 to 1:0.8. Other power levels may also be used respectively for short time intervals.

In such a recording method, directly recording new information on a portion having information already recorded causes rewriting yielding new information. Overwriting using a single circular light spot thus becomes possible.

In an alternative method, recorded information is erased once during one or more early revolutions of rewriting operation by irradiating contunuous light having power (of 4 mW, for example) close to the intermediate power level (5 mW) of the above described power-modulated recording laser light. Thereafter, recording is conducted in one succeeding revolution by irradiating laser light modulated in power according to the information signal, with a power level between the low power level (1 mW) of the reproducing (reading) laser light and the high power level (10 mW) of the recording laser light or with a power level between the intermediate power level (5 mW) and the high power level (10 mW) of the recording laser light. By thus erasing information and thereafter conducting recording, previously witten information is erased more completely, resulting in a high carrier to noise (C/N) ratio.

This method is effective for not only the recording film of the present invention but also other recording films.

This information recording medium is also effective for the case where recording or reproducing is conducted with a linear velocity other than 6 m/sec.

Even when recording and erasing operation was repeated at least $10^5$ times under the severe condition that the power of laser light was raised by 15% as compared with the optimum value, variation of reflectance could be reduced in the information recording medium of the present embodiment as compared with a disk of the conventional structure.

In the case where the intermediate layer 4 was omitted in this disk, an increase in variation of reflectance was caused by rewriting operations less in times than the above described number of times by the order of one digit. As compared with the case where the intermediate layer 4 was omitted in the disk of the conventional structure, however, variation of reflectance was reduced.

(Spectral Characteristics of Disk)

Two test pieces having the same configuration as the above described disk member changed in only substrate was fabricated and their spectral characteristics were examined. As the substrate, 2P glass having a thickness of 1 mm was used. A protective layer 2 including a $(ZnS)_{80}(SiO_2)_{20}$ film and having a film thickness of approximately 80 nm, a recording film 3 having a composition of $(AgSbTe_2)_{10}(Ge_2Sb_2Te_5)_{90}$ and having a film thickness of approximately 25 nm, an intermediate layer 4 including a $(ZnS)_{80}(SiO_2)_{20}$ film and having a film thickness of approximately 20 nm, and a first reflective layer 5 including a Si film and having a film thickness of 60 nm, and a second reflective layer 6 including a $Al_{97}Ti_3$ film and having a film thickness of 100 nm were formed in order. The first disk member was thus obtained.

One of the test pieces thus obtained was left as it was (test piece A). The other was subjected to heat processing at 300° C. for five minutes (test piece B). The test piece has spectral characteristics similar to those obtained by initial crystallization.

For the conventional structure as well, similar test pieces were fabricated. A test piece left as it was was referred to as test piece C. A test piece subfected to heat processing was referred to as test piece C.

Respective test pieces are exposed to laser light on the substrate side thereof and dependence of reflectance upon wavelength was measured for respective test pieces.

What is claimed is:

1. An information storage medium comprising:

a substrate;

a thin film formed on the substrate and having a reflectance changed by a phase change caused by irradiation of an energy beam irradiated via the substrate;

a first reflective layer and a second reflective layer on the thin film directly, or via an intermediate layer;

said thin film including one of $In_3SbTe_2$, $In_{35}Sb_{32}Te_{33}$, $In_{31}Sb_{26}Te_{43}$, and Ag—In—Sb—Te;

said first reflective layer and said second reflective layer being piled up in recited order from the thin film side, the first reflective layer comprising a material having an attenuation factor k of 2 or less and selected from the group consisting of Si—Ge, Si—Au, Si—Ag, Si—Cu, Si—Al, Si—Ni, Si—Fe, Si—Co, Si—Cr, Si—Ti, Si—Pd, Si—Pt, Si—W, Si—Ta, Si—Mo, Si—Sb, Si—Bi, Si—Dy, Si—Cd, Si—Mn, Si—Mg, Si—V, Si—Zn, Si—Ga, Si—Tl, Si—Pb, Si—B, Si—S, Si—Sn, Si—In or a mixture of Si—S and Si—In, and the second reflective layer comprising a material having an attenuation factor k of at least 3.

2. An information storage medium according to claim 1, wherein said first reflective layer is placed directly on said thin film.

3. An information storage medium according to claim 1, wherein a component occupying at least 90% of all atoms of said second reflective layer consists of at least one of Si—Ge, Si—Sn, Si—In and Si—Au mixed materials, or a component occupying at least 80% of all atoms of said first reflective layer consists of least one of Mo, a Mo alloy, Ta, a Ta alloy, W and a W alloy.

4. An information storage medium according to claim 1, wherein:
said thin film is formed as a recording layer or a superresolution reading mask layer on the substrate directly or via a foundation layer to record and/or reproduce information stored in the form of an atom configuration change caused by irradiation of an energy beam; and wherein
variation of reflectance of the recording film or superresolution reading mask layer in the amorphous state or variation of reflectance of the recording film or superresolution reading mask layer in the crystalline state is 10% or less in a reading wavelength range of 600 to 850 nm.

5. An information storage medium according to claim 1, wherein said thin film is formed as a recording layer or a superresolution resolution reading mask layer and an intermediate layer is provided between said recording layer or superresolution reading mask layer and said first reflective layer.

6. An information storage medium according to claim 1, which includes a protective layer between the substrate and the thin film and wherein said protective layer has a thickness in the range of 110 to 140 nm.

7. An information storage medium according to claim 1, wherein said thin film is formed as a recording layer or a superresolution reading mask layer having a phase change component and a high melting point component and wherein denoting a phase change component by L and a high melting point by H, at least 95% of all atoms of the recording layer or the superresolution reading mask layer have a composition represented as $(L)_{1-s}(H)_s$ where $0.05 \leq s \leq 0.20$, and said L contains said In, Te and Sb.

8. An information storage medium according to claim 7, wherein said thin film is Ag—In—Sb—Te—, and said H is one of Ag—Te, Ag—Sb—Te and $AgSbTe_2$.

9. An information storage medium according to claim 7, wherein said thin film is Ag—In—Sb—Te, and said L is one of $In_3SbTe_2$, $In_{35}Sb_{32}Te_{33}$ and $In_{31}Sb_{26}Te_{43}$ and $InSb_4Te_1$.

10. An information storage medium according to claim 1 wherein said thin film is
an information storage thin film serving as a recording layer or superresolution reading mask layer, said information storage thin film being formed on the substrate directly, or via a foundation layer, to record and/or reproduce information stored in the form of an atom configuration change caused by irradiation of an energy beam; and
at least 95% of all atoms of said recording layer or superresolution reading mask layer have a composition represented as $(L)_{1-s}(H)_s$ where $0.05 \leq s \leq 0.20$ and L denotes a phase change component and H denotes a high melting point component, and said L contains said In, Te and Sb.

11. An information recording medium according to claim 1, wherein a protective layer is disposed between the substrate and the thin film and said protective layer has a thickness in the range of 50 to 100 nm, and said first reflective layer consists of at least one of mixed materials in which at least 75% of all atoms comprises Si.

12. An information storage medium according the claim 1, wherein an intermediate layer is provided between said thin film and said first reflective layer, and a refractive index of said intermediate layer and refractive index of said first reflective layer have an average value between 2 and 4.

13. An information recording medium according to claim 1, wherein a component occupying at least 90% of all atoms of said first reflective layer consists of a Si mixed material, and a component occupying at least 80% of all atoms of said second reflective layer comprises at least one of single elements of Sb—Bi, Au, Ag, Cu, Al, Ni, Fe, Co, Cr, Ti, Pd, Pt, W, Ta, Mo, Sb, Bi, Dy, Cd, Mn, Mg and V, and a Au alloy, Ag alloy, Cu alloy, Al alloy, Pd alloy and Pt alloy.

14. An information recording medium according to claim 1, wherein a component occupying at least 90% of all atoms of said first reflective layer consists of at least one of Si—Au, Si—Ag, Si—Cu, Si—Al, Si—Ni, Si—Fe, Si—Co, Si—Cr, Si—Ti, Si—Pd, Si—Pt, Si—W, Si—Ta, Si—Mo, Si—Sb, Si—Bi, Si—Dy, Si—Cd, Si—Mn, Si—Mg, Si—V, Si—Zn, Si—Ga, Si—Tl, Si—Pb, Si—B and Si—S mixed materials, and a component occupying at least 80% of all atoms of said second reflective layer comprises Al—Ti , Al—Ag, Al—Cu, or Al—Cr.

15. An information recording medium according to claim 1, wherein a protective layer is formed between the substrate and the thin film and said protective layer has a thickness in the range of 50 to 100 nm, and said first reflective layer has a thickness in the range of 45 to 90 nm.

16. An information recording medium according to claim 1, wherein a protective layer is formed between the substrate and the thin film and said protective layer has a thickness in the range of 50 to 100 nm, said first reflective layer has a thickness in the range of 45 to 90 nm, and said second reflective layer has a thickness of 200 nm or less.

17. An information storage medium according to claim 1 wherein said thin film is
an information storage thin film serving as a recording layer or superresolution reading mask layer, said information storage thin film being formed on the substrate directly, or via a foundation layer, to record and/or reproduce information stored in the form of an atom configuration change caused by irradiation of an energy beam; and
wherein reflectance of said information recording medium has a minimum value in the wavelength range of 550 to 800 nm in an as—deposited state or a crystalline state, or a maximum value being located at a wavelength in the range of 150 to 350 nm from a wavelength of a minimum value.

18. An information storage medium according to claim 1 wherein said thin film is an information storage thin film serving as a recording layer or superresolution reading mask layer, said information storage thin film being formed on the substrate directly, or via a foundation layer, to record and/or reproduce information stored in the form of an atom configuration change caused by irradiation of an energy beam; and wherein when representing a reflectance change of said information recording medium in the range of 400 to 850 nm by a difference between a maximum value and a minimum value, a reflectance difference in an as-deposited state is at least 20% and a reflectance difference in a crystalline state is at least 6.7%.

19. An information storage medium according to claim 1 wherein said thin film is an information storage thin film serving as a recording layer or superresolution reading mask layer, said information storage thin film being formed on the substrate directly, or via a foundation layer, to record and/or reproduce information stored in the form of an atom configuration change caused by irradiation of an energy beam; and wherein reflectance of said information recording medium with respect to light applied from an intermediate layer or a first reflective layer to an opposite of a substrate has a relative maximal value or a relative minimal value in the wavelength range of 400 to 850 nm, or a reflectance difference of at least 13.3%.

20. An information storage medium according to claim 1, wherein said thin film is formed as a recording layer or a superresolution reading mask layer and wherein when an overwriting operation is conducted on the recording layer or superresolution reading mask layer, a region exposed to laser light having higher power becomes lower in reflectance than a region exposed to laser light having lower power.

21. An information storage medium according to claim 1, wherein said thin film serves as a recording layer.

22. An information storage medium according to claim 1, wherein said thin film serves as a superresolution reading mask layer.

23. An information storage medium according to claim 1, wherein said thin film includes Ag.

* * * * *

UNITED STATES PATENT AND TRADEMARK OFFICE
CERTIFICATE OF CORRECTION

PATENT NO. : 6,232,035 B1
DATED : May 15, 2001
INVENTOR(S) : A. Hirotsune et al.

It is certified that error appears in the above-identified patent and that said Letters Patent is hereby corrected as shown below:

<u>Title page,</u>
Please add the co-assignee -- [73] Hitachi Maxell, Ltd., Osaka (JP) --.

Signed and Sealed this

Eleventh Day of February, 2003

JAMES E. ROGAN
*Director of the United States Patent and Trademark Office*